United States Patent
Shibata et al.

(10) Patent No.: US 12,466,980 B2
(45) Date of Patent: Nov. 11, 2025

(54) OPTICAL LAMINATE AND DISPLAY DEVICE

(71) Applicant: FUJIFILM Corporation, Tokyo (JP)

(72) Inventors: Naoya Shibata, Kanagawa (JP); Naoya Nishimura, Kanagawa (JP); Shun Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 524 days.

(21) Appl. No.: 17/888,738

(22) Filed: Aug. 16, 2022

(65) Prior Publication Data

US 2022/0413188 A1 Dec. 29, 2022

Related U.S. Application Data

(63) Continuation of application No. PCT/JP2021/004375, filed on Feb. 5, 2021.

(30) Foreign Application Priority Data

Feb. 18, 2020 (JP) ................. 2020-024930

(51) Int. Cl.
*C09J 7/29* (2018.01)
*C09J 7/38* (2018.01)
(Continued)

(52) U.S. Cl.
CPC .................. *C09J 7/29* (2018.01); *C09J 7/381* (2018.01); *G02B 1/14* (2015.01); *G02B 5/003* (2013.01);
(Continued)

(58) Field of Classification Search
CPC ........ C09J 7/29; C09J 7/381; C09J 2203/326; C09J 2301/302; C09J 2301/416;
(Continued)

(56) References Cited

U.S. PATENT DOCUMENTS

2006/0127606 A1* 6/2006 Ogasawara ................ C09J 7/22
428/1.3
2007/0218217 A1 9/2007 Fernando et al.
(Continued)

FOREIGN PATENT DOCUMENTS

CN 108363133 A 8/2018
CN 110780482 A 2/2020
(Continued)

OTHER PUBLICATIONS

Office Action, issued by the State Intellectual Property Office of China on Dec. 4, 2023, in connection with Chinese Patent Application No. 202180015287.3.
(Continued)

*Primary Examiner* — Balram T Parbadia
(74) *Attorney, Agent, or Firm* — Edwards Neils LLC; Jean C. Edwards, Esq.

(57) ABSTRACT

Provided is an optical laminate having excellent resistance to the pressure from the surface and a display device including the same. The optical laminate includes a surface protective layer, a first pressure sensitive adhesive layer, a light absorption anisotropic layer, and a second pressure sensitive adhesive layer in this order, in which an indentation elastic modulus of the first pressure sensitive adhesive layer is greater than an indentation elastic modulus of the light absorption anisotropic layer, the light absorption anisotropic layer is a layer formed of a composition for forming a light absorption anisotropic layer containing a liquid crystal compound and a dichroic substance, and a thickness of the light absorption anisotropic layer is less than 5 μm.

20 Claims, 1 Drawing Sheet

(51) Int. Cl.
  *G02B 1/14* (2015.01)
  *G02B 5/00* (2006.01)
  *G02B 5/30* (2006.01)
  *H10K 59/80* (2023.01)

(52) U.S. Cl.
  CPC ....... *G02B 5/3016* (2013.01); *C09J 2203/326* (2013.01); *C09J 2301/302* (2020.08); *C09J 2301/416* (2020.08); *C09J 2429/00* (2013.01); *H10K 59/8791* (2023.02)

(58) Field of Classification Search
  CPC .............. C09J 2429/00; C09J 2203/318; C09J 2301/122; C09J 2301/312; C09J 2429/006; C09J 129/04; C09J 201/00; C09J 7/38; G02B 1/14; G02B 5/003; G02B 5/3016; G02B 5/3033; G02B 5/30; H10K 59/8791; G02F 1/1335; G02F 1/1337; G09F 9/00; H05B 33/02
  See application file for complete search history.

(56) References Cited

U.S. PATENT DOCUMENTS

| | | | | |
|---|---|---|---|---|
| 2007/0267133 | A1* | 11/2007 | Matano | C09J 133/02 528/44 |
| 2009/0087590 | A1* | 4/2009 | Aiki | C09K 19/3475 427/532 |
| 2015/0323703 | A1* | 11/2015 | Kaneko | C08K 5/15 349/96 |
| 2016/0154157 | A1* | 6/2016 | Cho | G02B 1/14 359/489.07 |
| 2018/0045872 | A1* | 2/2018 | Kitagawa | G02B 5/30 |
| 2018/0059300 | A1* | 3/2018 | Kim | G02B 1/14 |
| 2020/0355960 | A1 | 11/2020 | Mitobe et al. | |

FOREIGN PATENT DOCUMENTS

| | | |
|---|---|---|
| JP | 2007-101678 A | 4/2007 |
| JP | 2012-230181 A | 11/2012 |
| JP | 2020-019277 A | 2/2020 |
| WO | 2019/151334 A1 | 8/2019 |

OTHER PUBLICATIONS

Office Action, issued by the Japanese Patent Office on Nov. 21, 2023, in connection with Japanese Patent Application No. 2022-501799.

International Search Report issued in PCT/JP2021/004375 on Apr. 6, 2021.

Written Opinion issued in PCT/JP2021/004375 on Apr. 6, 2021.

International Preliminary Report on Patentability completed by WIPO on Aug. 23, 2022 in connection with International Patent Application No. PCT/JP2021/004375.

Office Action, issued by the Japanese Patent Office on Sep. 5, 2023, in connection with Japanese Patent Aplication No. 2022-501799.

* cited by examiner

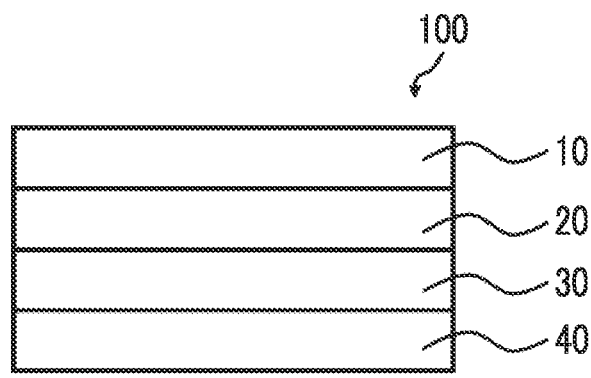

OPTICAL LAMINATE AND DISPLAY DEVICE

CROSS-REFERENCE TO RELATED APPLICATIONS

This application is a Continuation of PCT International Application No. PCT/JP2021/004375 filed on Feb. 5, 2021, which was published under PCT Article 21(2) in Japanese, and which claims priority under 35 U.S.C. § 119(a) to Japanese Patent Application No. 2020-024930 filed on Feb. 18, 2020. The above applications are hereby expressly incorporated by reference, in their entirety, into the present application.

BACKGROUND OF THE INVENTION

1. Field of the Invention

The present invention relates to an optical laminate and a display device.

2. Description of the Related Art

In the related art, a display device that includes an optical laminate having a polarizer (light absorption anisotropic layer) has been widely used as a display device typified by an organic electroluminescence (EL) display device.

In recent years, a display device that can be folded or wound has been developed, and an optical laminate used in such a display device is required to be thin. For example, as one of the methods of reducing the thickness of an optical laminate, a method of using an optical laminate having a polarizer (light absorption anisotropic layer) formed by applying a composition containing a dichroic substance and a liquid crystal compound has been known (WO2019/151334A).

SUMMARY OF THE INVENTION

The optical laminate may have a surface protective layer to protect the surface thereof. The surface protective layer is a layer disposed on the outermost surface of the optical laminate, and is bonded to the light absorption anisotropic layer via a pressure sensitive adhesive layer in many cases.

Here, the display device including the optical laminate may be operated by pressing a stylus pen or the like against the surface protective layer. In this case, a problem of degradation of display performance may occur due to deformation of the light absorption anisotropic layer caused by the pressure of the stylus pen. Therefore, an optical laminate having excellent resistance to the pressure from the surface is required.

As a result of examination on the optical laminate obtained by bonding a polarizer (light absorption anisotropic layer) as described in WO2019/151334A and a surface protective layer via a pressure sensitive adhesive layer, the present inventors found that the resistance to the pressure from the surface is insufficient in some cases, and thus there is a room for improvement.

Therefore, an object of the present invention is to provide an optical laminate having excellent resistance to the pressure from the surface and a display device including the same.

As a result of intensive examination conducted by the present inventors in order to solve the above-described problems, it was found that in an optical laminate including a surface protective layer, a first pressure sensitive adhesive layer, and a light absorption anisotropic layer in this order, in a case where the indentation elastic modulus of the first pressure sensitive adhesive layer is greater than the indentation elastic modulus of the light absorption anisotropic layer, an optical laminate having excellent resistance to the pressure from the surface can be obtained even in a case where the thickness of the light absorption anisotropic layer is less than 5 µm, which is thin, thereby completing the present invention.

That is, the present inventors found that the above-described problems can be solved by employing the following configurations.

[1] An optical laminate comprising in order: a surface protective layer; a first pressure sensitive adhesive layer; a light absorption anisotropic layer; and a second pressure sensitive adhesive layer, in which an indentation elastic modulus of the first pressure sensitive adhesive layer is greater than an indentation elastic modulus of the light absorption anisotropic layer, the light absorption anisotropic layer is a layer formed of a composition for forming a light absorption anisotropic layer containing a liquid crystal compound and a dichroic substance, and a thickness of the light absorption anisotropic layer is less than 5 µm.

[2] The optical laminate according to [1], in which the thickness of the light absorption anisotropic layer is less than 3 µm.

[3] The optical laminate according to [1] or [2], in which the first pressure sensitive adhesive layer contains a polyvinyl alcohol-based adhesive.

[4] The optical laminate according to [1] or [2], in which the first pressure sensitive adhesive layer contains an ultraviolet curable adhesive.

[5] The optical laminate according to any one of [1] to [4], in which a thickness of a layer disposed between the first pressure sensitive adhesive layer and the second pressure sensitive adhesive layer is 10 µm or less.

[6] The optical laminate according to any one of [1] to [5], in which a storage elastic modulus of the second pressure sensitive adhesive layer is 0.5 MPa or greater.

[7] The optical laminate according to any one of [1] to [6], in which a molar content of a radically polymerizable group in the composition for forming a light absorption anisotropic layer is 1.0 mmol/g or greater with respect to a total solid content of the composition for forming a light absorption anisotropic layer.

[8] The optical laminate according to any one of [1] to [7], further comprising: a photoalignment layer which contains a polymer having a repeating unit containing a radically polymerizable group, in which the photoalignment layer is disposed to be in contact with a surface of the light absorption anisotropic layer.

[9] The optical laminate according to any one of [1] to [8], in which an average visible light transmittance of the light absorption anisotropic layer is 45% or greater.

[10] A display device comprising: the optical laminate according to any one of [1] to [9].

According to the present invention, it is possible to provide an optical laminate having excellent resistance to the pressure from the surface and a display device including the same.

BRIEF DESCRIPTION OF THE DRAWINGS

FIG. 1 is a schematic cross-sectional view showing an example of a laminate of the present invention.

DESCRIPTION OF THE PREFERRED EMBODIMENTS

Hereinafter, the present invention will be described in detail.

The description of constituent elements described below may be made based on typical embodiments of the present invention, but the present invention is not limited to such embodiments.

In addition, in the present specification, a numerical range shown using "to" indicates a range including numerical values described before and after "to" as a lower limit and an upper limit.

Further, in the present specification, materials corresponding to respective components may be used alone or in combination of two or more kinds thereof. Here, in a case where two or more kinds of materials corresponding to respective components are used in combination, the content of the components indicates the total content of the combined materials unless otherwise specified.

Further, in the present specification, "(meth)acrylate" is a notation representing "acrylate" or "methacrylate", "(meth)acryl" is a notation representing "acryl" or "methacryl", and "(meth)acryloyl" is a notation representing "acryloyl" or "methacryloyl".

[Optical Laminate]

The optical laminate according to the embodiment of the present invention (hereinafter, also referred to as "laminate of the present invention") includes a surface protective layer, a first pressure sensitive adhesive layer, a light absorption anisotropic layer, and a second pressure sensitive adhesive layer in this order. Further, the indentation elastic modulus of the first pressure sensitive adhesive layer is greater than the indentation elastic modulus of the light absorption anisotropic layer. Further, the light absorption anisotropic layer is a layer formed of a composition for forming a light absorption anisotropic layer containing a liquid crystal compound and a dichroic substance. Further, the thickness of the light absorption anisotropic layer is less than 5 µm.

The laminate of the present invention has excellent resistance to the pressure from the surface. The details of the reason for this are not clear, but it is assumed as follows.

A display device including an optical laminate is operated by pressing a stylus pen or the like against a surface protective layer in some cases. In this case, a problem of degradation of display performance may occur due to deformation of a light absorption anisotropic layer caused by the pressure of the stylus pen.

For example, a method of improving the hardness of the surface protective layer can be considered as one of the methods for solving this problem, but the present inventors found that deformation of the light absorption anisotropic layer cannot be sufficiently suppressed only by improving the hardness of the surface protective layer and thus the degradation of the display performance cannot be sufficiently suppressed.

Therefore, as a result of repeated examination conducted by the present inventors, it was found that deformation of the light absorption anisotropic layer can be suppressed in a case where the indentation elastic modulus of the first pressure sensitive adhesive layer disposed between the surface protective layer and the light absorption anisotropic layer is greater than the indentation elastic modulus of the light absorption anisotropic layer.

The reason for this is considered to be that the elastic modulus of the first pressure sensitive adhesive layer greater than that of the light absorption anisotropic layer contributes to suppression of deformation of the light absorption anisotropic layer caused by transmission of the stress from the surface to the light absorption anisotropic layer.

First, the laminate of the present invention will be described with reference to the accompanying drawings.

FIG. 1 is a schematic cross-sectional view showing an example of the laminate according to the embodiment of the present invention.

A laminate 100 illustrated in FIG. 1 includes a surface protective layer 10, a first pressure sensitive adhesive layer 20, a light absorption anisotropic layer 30, and a second pressure sensitive adhesive layer 40 in this order.

Here, the indentation elastic modulus of the first pressure sensitive adhesive layer 20 is greater than the indentation elastic modulus of the light absorption anisotropic layer 30. Further, the thickness of the light absorption anisotropic layer 30 is less than 5 µm. Further, the light absorption anisotropic layer 30 is a layer formed of a composition for forming a light absorption anisotropic layer containing a liquid crystal compound and a dichroic substance.

The laminate 100 may have a photoalignment layer (not illustrated) to be in contact with the surface of the light absorption anisotropic layer 30 on a side opposite to the first pressure sensitive adhesive layer 20. That is, the photoalignment layer is disposed between the light absorption anisotropic layer 30 and the second pressure sensitive adhesive layer 40.

[Surface Protective Layer]

The laminate according to the embodiment of the present invention includes a surface protective layer. The laminate according to the embodiment of the present invention is used as a part of a display device, and in that case, it is preferable that a surface protective layer is provided on the most viewing side.

The surface protective layer may be a layer formed of only one layer or may be a layer in which two or more layers are laminated.

In the present invention, the layer disposed on a side of the first pressure sensitive adhesive layer opposite to the light absorption anisotropic layer corresponds to the surface protective layer, unless otherwise specified.

It is preferable that the surface protective layer has a high hardness and also preferable that the surface protective layer has a high recovery property. Further, a low-reflection layer that suppresses surface reflection that occurs at the air interface is also preferable.

The configuration of the transparent support and the surface coating layer is assumed as one of the preferred embodiments of the surface protective layer. Hereinafter, the transparent support and the surface coating layer will be described.

<Transparent Support>

Here, the term "transparent" in the present invention indicates that the average visible light transmittance is 60% or greater, preferably 80% or greater, and particularly preferably 90% or greater.

A plastic substrate is preferable as the transparent support.

Examples of the plastic constituting the plastic substrate include a polyolefin such as polyethylene, polypropylene, or a norbornene-based polymer, a cyclic olefin-based resin, polyvinyl alcohol, polyethylene terephthalate, polymethacrylic acid ester, polyacrylic acid ester, cellulose ester such as triacetyl cellulose (TAC), diacetyl cellulose, or cellulose acetate propionate, polyethylene naphthalate, polycarbonate, polysulfone, polyether sulfone, polyether ketone, polyphenylene sulfide, polyphenylene oxide, and polyimide. Among these, from the viewpoints of availability from the market and excellent transparency, cellulose ester, a cyclic olefin-based resin, polyethylene terephthalate, or polymethacrylic acid ester is particularly preferable. From the viewpoint of flexibility, polyimide is excellent. Polyimide has a high refractive index and thus may have a large refractive index gap, but it is also preferable that the refractive index is adjusted by a method of mixing silica particles or the like. The details of the polyimide are described in WO2018/062296A and WO2018/062190A.

It is preferable that the thickness of the transparent support is set to be small to the extent that the strength and the workability can be maintained from the viewpoint that the mass thereof enables the transparent support to be practically handled and sufficient transparency can be ensured.

The thickness of the transport support is preferably in a range of 5 to 300 μm and more preferably in a range of 5 to 100 μm.

Further, in a case where the laminate according to the embodiment of the present invention is used as a circularly polarizing plate (particularly in a case where the laminate is used as a circularly polarizing plate for mobile devices), the thickness of the transparent support is preferably in a range of 5 to 50 μm.

[Surface Coating Layer]

Examples of the surface coating layer includes at least one selected from the group consisting of an antireflection layer, an antiglare layer, a hard coat layer, a mixed layer, and a scratch resistant layer. Known layer materials are used for the antireflection layer, the antiglare layer, and the hard coat layer. In addition, these layers may be formed by laminating a plurality of layers.

The antireflection layer indicates a structure that is different from an antireflection plate of a so-called circularly polarizing plate and that reduces reflection by a structure using light interference. The antireflection layer may have a configuration consisting of only a low refractive index layer as the simplest configuration. In order to further reduce the reflectivity, it is preferable that an antireflection layer is formed by combining a high refractive index layer having a high refractive index and a low refractive index layer having a low refractive index. Examples of the configuration thereof include a configuration in which two layers of a high refractive index layer and a low refractive index layer are laminated in order from the lower side and a configuration in which three layers with different refractive indices are laminated in order of a medium refractive index layer (layer with a higher refractive index than that of the lower layer and with a lower refractive index than that of the high refractive index layer), a high refractive index layer, and a low refractive index layer. Further, a configuration in which a plurality of antireflection layers are laminated has been suggested. Among these, from the viewpoints of the durability, the optical characteristics, the cost, and the productivity, a configuration in which a medium refractive index layer, a high refractive index layer, and a low refractive index layer are sequentially laminated on a hard coat layer is preferable, and examples thereof include the configurations described in JP1996-122504A (JP-H08-122504A), JP1996-110401A (JP-H08-110401A), JP1998-300902A (JP-H-10-300902A), JP2002-243906A, JP2000-11706A, and the like. Further, an antireflection film having a three-layer configuration with excellent robustness with respect to fluctuations in film thickness is described in JP2008-262187A. In a case where the antireflection film having the above-described three-layer configuration is provided on the surface of an image display device, the average value of the reflectivity can be set to 0.5% or less, the reflected glare can be significantly reduced, and an image with an excellent stereoscopic effect can be obtained. In addition, other functions may be imparted to each layer, and examples thereof include an antifouling low refractive index layer, an antistatic high refractive index layer, an antistatic hard coat layer, and an antiglare hard coat layer (the layers described in JP1998-206603A (JP-H10-206603A), JP2002-243906A, JP2007-264113A, and the like).

In a case where the laminate according to the embodiment of the present invention is applied to a foldable organic EL display device, the description in JP2018-56069A can be referenced as a layer constituting the surface coating layer. Since cover glass cannot be used in the foldable organic EL display device, a surface protective layer is required in place of the cover glass. For example, paragraphs [0030] to [0040] of JP2018-56069A describe that a polyimide-based resin is preferable as a base material having a curvature radius of 3 mm or less (for example, 3 mm, 2 mm, or 1 mm) and flexibility such that the base material can be bent preferably 200000 times, more preferably 300000 times, and still more preferably 500000 times and that an organic-inorganic hybrid material obtained by mixing silica particles and a cage-like silsesquioxane compound with an ultraviolet-curable acrylic resin is preferable as a hard coat layer.

It is preferable that the surface coating layer includes a hard coat layer formed of a silsesquioxane compound having a structure described in JP2015-212353A, JP2017-008148A, and the like.

As the mixed layer, a layer having a function of imparting adhesiveness between layers positioned in the vertical direction, for example, the mixed layer described in WO2020/021931A can be used.

As the scratch resistant layer, a layer that suppresses scratches on the surface of the laminate, for example, the scratch resistant layer described in WO2020/021931A can be used.

The thickness of the surface protective layer is not particularly limited, but is preferably in a range of 20 to 100 μm, more preferably in a range of 30 to 80 μm, and still more preferably in a range of 35 to 65 μm from the viewpoint that the effects of the present invention are more excellent. Here, the thickness of the surface protective layer denotes the total thickness of each layer in a case where the surface protective layer is formed of a plurality of layers.

Here, the thickness of each layer in the laminate according to the embodiment of the present invention is a value calculated based on an image obtained by observing a cross section of the laminate with a scanning electron microscope (SEM) and denotes an arithmetic average value of the thicknesses at optional five points in each layer.

[First Pressure Sensitive Adhesive Layer]

The laminate according to the embodiment of the present invention includes a first pressure sensitive adhesive layer. In the present specification, the pressure sensitive adhesive layer denotes an adhesive layer formed of an adhesive or a pressure sensitive adhesive layer formed of a pressure sensitive adhesive.

From the viewpoint that the effects of the present invention are more excellent, it is preferable that the first pressure sensitive adhesive layer is an adhesive layer.

Further, in a case where two or more pressure sensitive adhesive layers are provided between the surface protective layer described above and the light absorption anisotropic layer, the first pressure sensitive adhesive layer is a pressure sensitive adhesive layer closest to the light absorption anisotropic layer among the two or more pressure sensitive adhesive layers.

The adhesive constituting the adhesive layer is not particularly limited, but a polyvinyl alcohol (PVA)-based adhesive or a curable adhesive is preferable from the viewpoint that the effects of the present invention are more excellent. From the viewpoint of the durability of the dichroic coloring agent, a polyvinyl alcohol (PVA)-based adhesive having low oxygen permeability is more preferable.

As the curable adhesive, an active energy ray-curable adhesive is preferable, and an ultraviolet (UV) curable adhesive is more preferable.

Examples of the UV curable adhesive include a radical polymerization curable adhesive and a cationic polymerization curable adhesive.

Examples of the radical polymerization curable adhesive include a (meth)acrylate-based adhesive. Examples of the curable component in the (meth)acrylate-based adhesive include a compound containing a (meth)acryloyl group and a compound containing a vinyl group.

Further, examples of the cationic polymerization curable adhesive include a compound containing an epoxy group or an oxetanyl group. The compound containing an epoxy group is not particularly limited as long as the compound contains at least two epoxy groups in a molecule, and various generally known curable epoxy compounds can be used. Preferred examples of the epoxy compound include a compound (aromatic epoxy compound) containing at least two epoxy groups and at least one aromatic ring in a molecule and a compound (alicyclic epoxy compound) containing at least two epoxy groups in a molecule, in which at least one of the epoxy groups is formed between two adjacent carbon atoms constituting an alicyclic ring.

Examples of the pressure sensitive adhesive constituting the pressure sensitive adhesive layer include a rubber-based pressure sensitive adhesive, an acrylic pressure sensitive adhesive, a silicone-based pressure sensitive adhesive, a urethane-based pressure sensitive adhesive, a vinyl alkyl ether-based pressure sensitive adhesive, a polyvinyl alcohol-based pressure sensitive adhesive, a polyvinylpyrrolidone-based pressure sensitive adhesive, a polyacrylamide-based pressure sensitive adhesive, and a cellulose-based pressure sensitive adhesive. Among these, an acrylic pressure sensitive adhesive is preferable from the viewpoints of the transparency, the weather resistance, the heat resistance, and the like.

The thickness of the first pressure sensitive adhesive layer is not particularly limited, but is preferably in a range of 0.01 to 30 µm, more preferably in a range of 0.02 to 20 µm, and still more preferably in a range of 0.05 to 10 µm from the viewpoint that the effects of the present invention are more excellent.

The indentation elastic modulus of the first pressure sensitive adhesive layer is not particularly limited as long as the indentation elastic modulus thereof is greater than the indentation elastic modulus of the light absorption anisotropic layer, but is preferably in a range of 2 to 15 GPa, more preferably in a range of 3 to 10 GPa, and still more preferably in a range of 4 to 10 GPa from the viewpoint that the effects of the present invention are more excellent.

In the present invention, the indentation elastic modulus of each layer denotes an elastic modulus measured by a nanoindentation method.

The elastic modulus can be measured by the nanoindentation method, for example, using a nanoindenter (trade name, "Triboindenter TI-950", manufactured by Hysitron, Inc.). The measurement is performed by setting the measurement mode as a single indentation measurement mode, a measurement temperature to 25° C., an indentation load of the indenter on the object to be measured to 50 µN, the indentation speed of the indenter to 5 µm/sec, and the withdrawal speed of the indenter from the object to be measured to 5 µm/sec using a cube corner indenter as an indenter to be used. The elastic modulus based on the nanoindentation method is derived by the Oliver-Pharr method using the device used. The specific derivation method is as described in, for example, Handbook of Micro/nano Tribology (Second Edition) edited by Bharat Bhushan, CRCPress (ISBN0-8493-8402-8).

[Light Absorption Anisotropic Layer]

The laminate according to the embodiment of the present invention includes a light absorption anisotropic layer.

Here, the light absorption anisotropic layer is a light absorption anisotropic layer formed of a composition for forming a light absorption anisotropic layer (hereinafter, also referred to as "liquid crystal composition") containing a liquid crystal compound and a dichroic substance. From the viewpoint that the effects of the present invention are more excellent, it is preferable that the light absorption anisotropic layer does not contain iodine.

<Composition for Forming Light Absorption Anisotropic Layer (Liquid Crystal Composition)>

Hereinafter, components contained in a liquid crystal composition will be described.

(Liquid Crystal Compound)

The liquid crystal composition contains a liquid crystal compound. Since the liquid crystal composition contains a liquid crystal compound, the dichroic substances can be aligned with a high degree of alignment while the precipitation of the dichroic substances is suppressed.

The liquid crystal compound is a liquid crystal compound that does not exhibit dichroism.

As such a liquid crystal compound, both a low-molecular-weight liquid crystal compound and a polymer liquid crystal compound can be used. Here, the "low-molecular-weight liquid crystal compound" indicates a liquid crystal compound having no repeating units in the chemical structure. Here, "polymer liquid crystal compound" is a liquid crystal compound having a repeating unit in the chemical structure.

Examples of the polymer liquid crystal compound include thermotropic liquid crystal polymers described in JP2011-237513A. Further, from the viewpoint that the hardness (particularly, the bending resistance) of the light absorption anisotropic layer has excellent hardness, it is preferable that the polymer liquid crystal compound contains a crosslinkable group (polymerizable group) at the terminal. Examples of the crosslinkable group include the polymerizable groups described in paragraphs [0040] to [0050] of JP2010-244038A. Among these, from the viewpoint of improving the reactivity and the synthetic suitability, an acryloyl group, a methacryloyl group, an epoxy group, an oxetanyl group, and a styryl group are preferable, and an acryloyl group and a methacryloyl group are more preferable.

Examples of the low-molecular-weight liquid crystal compound include liquid crystal compounds described in JP2013-228706A. It is preferable that the low-molecular-weight liquid crystal compound contains a crosslinkable group (polymerizable group) at the terminal. Specific examples of the crosslinkable group are as described above.

The content of the liquid crystal compound is preferably in a range of 25 to 2000 parts by mass, more preferably in a range of 33 to 1000 parts by mass, and still more preferably in a range of 50 to 500 parts by mass with respect to 100 parts by mass which is the content of the dichroic substances in the liquid crystal composition. In a case where the content of the liquid crystal compound is in the above-described range, the degree of alignment of the light absorption anisotropic layer is further improved.

The liquid crystal composition may contain only one or two or more kinds of liquid crystal compounds. In a case where the liquid crystal composition contains two or more kinds of liquid crystal compounds, the content of the liquid crystal compounds indicates the total content of the liquid crystal compounds.

From the viewpoint that the effects of the present invention are more excellent, it is preferable that the liquid crystal compound includes a polymer liquid crystal compound having a repeating unit represented by Formula (1L) (hereinafter, also referred to as "repeating unit (1L)").

(1L)

In Formula (1L), P1 represents the main chain of the repeating unit. L1 represents a single bond or a divalent linking group, SP1 represents a spacer group, M1 represents a mesogen group, and T1 represents a terminal group.

Specific examples of the main chain of the repeating unit represented by P1 include groups represented by Formulae (P1-A) to (P1-D). Among these, from the viewpoints of diversity and handleability of a monomer serving as a raw material, a group represented by Formula (P1-A) is preferable.

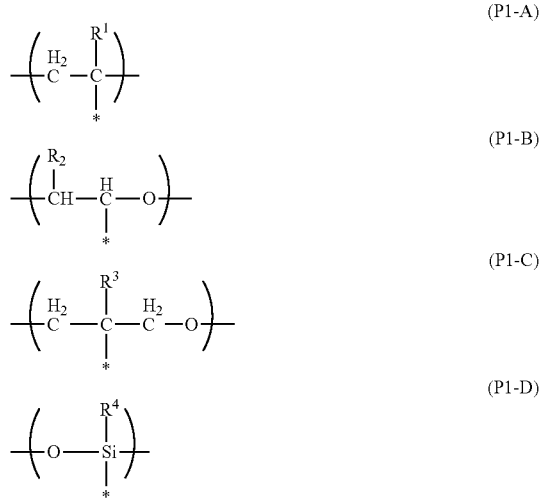

In Formulae (P1-A) to (P1-D), "*" represents a bonding position with respect to L1 in Formula (1L). In Formulae (P1-A) to (P1-D), $R^1$, $R^2$, $R^3$, and R each independently represent a hydrogen atom, a halogen atom, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^4(OR^3)_2$—. In the formula, $R^4$ has the same definition as that for $R^4$ in (P1-D), and a plurality of $R^5$'s each independently represent a hydrogen atom or an alkyl group having 1 to 10 carbon atoms.

L1 represents a single bond or a divalent linking group.
Examples of the divalent linking group represented by L1 include —C(O)O—, —OC(O)—, —O—, —S—, —C(O)NR$^3$—, —NR$^3$C(O)—, —SO$_2$—, and —NR$^3$R$^4$—. In the formulae, $R^3$ and $R^4$ each independently represent a hydrogen atom or an alkyl group having 1 to 6 carbon atoms which may have a substituent W (described below).

In a case where P1 represents a group represented by Formula (P1-A), from the viewpoint that the effects of the present invention are more excellent, it is preferable that L1 represents a group represented by —C(O)O—.

In a case where P1 represents a group represented by any of Formulae (P1-B) to (P1-D), from the viewpoint that the effects of the present invention are more excellent, it is preferable that L1 represents a single bond.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

Here, as the oxyethylene structure represented by SP1, a group represented by *—(CH$_2$—CH$_2$O)$_{n1}$—* is preferable. In the formula, n1 represents an integer of 1 to 20, and "*" represents a bonding position with respect to L1 or M1 in Formula (1L). From the viewpoint that the effects of the present invention are more excellent, n1 represents preferably an integer of 2 to 10, more preferably an integer of 2 to 4, and most preferably 3.

Further, from the viewpoint that the effects of the present invention are more excellent, a group represented by *—(CH(CH$_3$)—CH$_2$O)$_2$—* is preferable as the oxypropylene structure represented by SP1. In the formula, n2 represents an integer of 1 to 3, and "*" represents a bonding position with respect to L1 or M1.

Further, from the viewpoint that the effects of the present invention are more excellent, a group represented by *—(Si(CH$_3$)$_2$—O)$_{n3}$—* is preferable as the polysiloxane structure represented by SP1. In the formula, n3 represents an integer of 6 to 10, and "*" represents a bonding position with respect to L1 or M1.

Further, from the viewpoint that the effects of the present invention are more excellent, a group represented by *—(CF$_2$—CF$_2$)$_{n4}$—* is preferable as the alkylene fluoride structure represented by SP1. In the formula, n4 represents an integer of 6 to 10, and "*" represents a bonding position with respect to L1 or M1.

The mesogen group represented by M1 is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited and for example, particularly description on pages 7 to 16 of "FlussigeKristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystals Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint that the effects of the present invention are more excellent, the mesogen group contains preferably an aromatic hydrocarbon group, more preferably 2 to 4 aromatic hydrocarbon groups, and still more preferably 3 aromatic hydrocarbon groups.

From the viewpoints of exhibiting the liquid crystallinity, adjusting the liquid crystal phase transition temperature, and the availability of raw materials and synthetic suitability and from the viewpoint that the effects of the present invention are more excellent, as the mesogen group, a group represented by Formula (M1-A) or Formula (M1-B) is preferable, and a group represented by Formula (M1-B) is more preferable.

$$*-(A1)_{a1}-* \quad (M1-A)$$

$$*-(A2-LA1)_{a2}-A3-* \quad (M1-B)$$

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, an alkoxy group, or a substituent W.

It is preferable that the divalent group represented by A1 is a 4- to 6-membered ring. Further, the divalent group represented by A1 may be a monocycle or a fused ring.

Further, "*" represents a bonding position with respect to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable, and a phenylene group is more preferable.

The divalent heterocyclic group represented by A1 may be any of aromatic or non-aromatic, but a divalent aromatic heterocyclic group is preferable as the divalent heterocyclic group from the viewpoint of further improving the degree of alignment.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 represents 2 or greater, a plurality of A1's may be the same as or different from each other.

In Formula (M1-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (M1-A), and thus description thereof will not be repeated.

In Formula (M1-B), a2 represents an integer of 1 to 10. In a case where a2 represents 2 or greater, a plurality of A2's may be the same as or different from each other, a plurality of A3's may be the same as or different from each other, and a plurality of LA1's may be the same as or different from each other. From the viewpoint that the effects of the present invention are more excellent, a2 represents preferably an integer of 2 or greater and more preferably 2.

In Formula (M1-B), in a case where a2 represents 1, LA1 represents a divalent linking group. In a case where a2 represents 2 or greater, a plurality of LA1's each independently represent a single bond or a divalent linking group, and at least one of the plurality of LA1's is a divalent linking group. In a case where a2 represents 2, from the viewpoint that the effects of the present invention are more excellent, it is preferable that one of the two LA1's represents a divalent linking group and the other represents a single bond.

In Formula (M1-B), examples of the divalent linking group represented by LA1 include —O—, —(CH$_2$)$_g$—, —(CF$_2$)$_r$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z) (Z')—, —C(Z)=C(Z')—C(O)—S—, —S—C(O)—C(Z)=C(Z')—, —C(Z N=N=C(Z')— (L, Z', and Z" each independently represent a hydrogen atom, an alkyl group having 1 to 4 carbon atoms, a cycloalkyl group, an aryl group, a cyano group, or a halogen atom), —C=C—, —N=N—, —S—, —S(O)—, —S(OXO)—, —(O)S(O)O—, —O(O)S(O)O—, —SC(O)—, and —C(O) S—. Among these, from the viewpoint that the effects of the present invention are more excellent, —C(O)O— is preferable. LA1 may represent a group obtained by combining two or more of these groups.

Specific examples of M1 include the following structures. In the following specific examples, "Ac" represents an acetyl group.

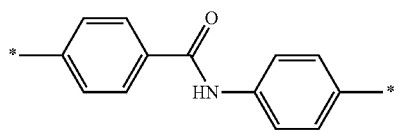
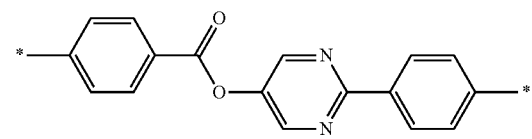
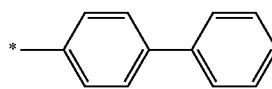
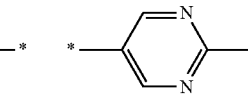
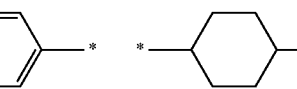
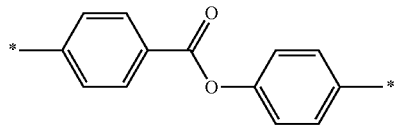
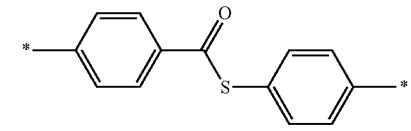
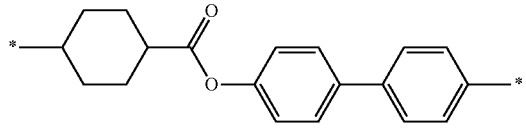
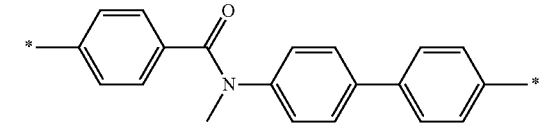
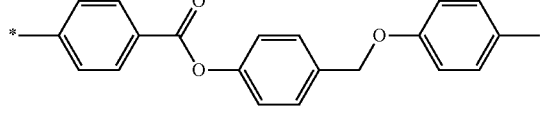
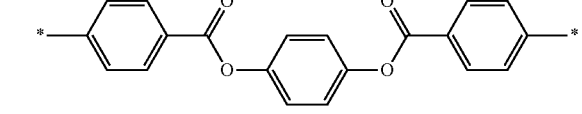
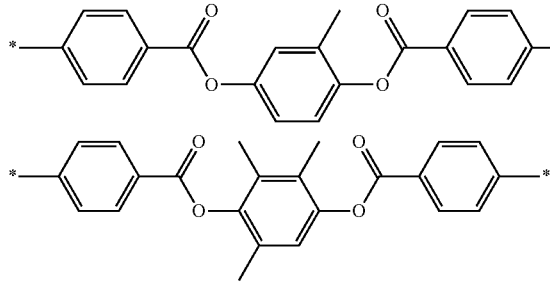
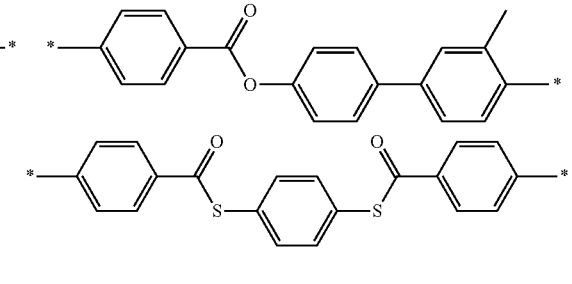
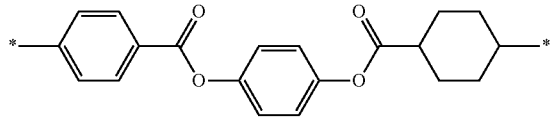
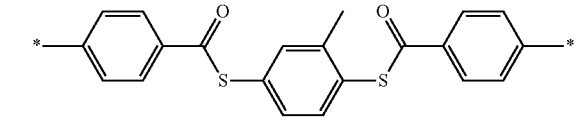
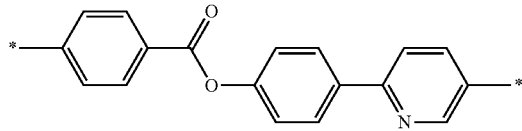
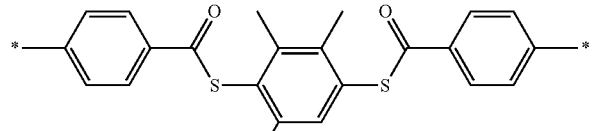
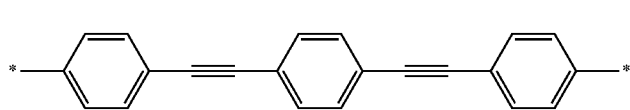
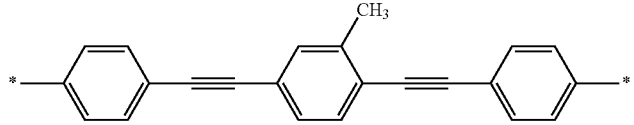
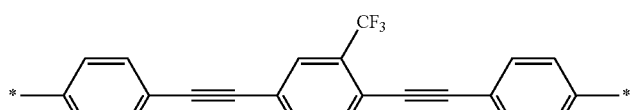
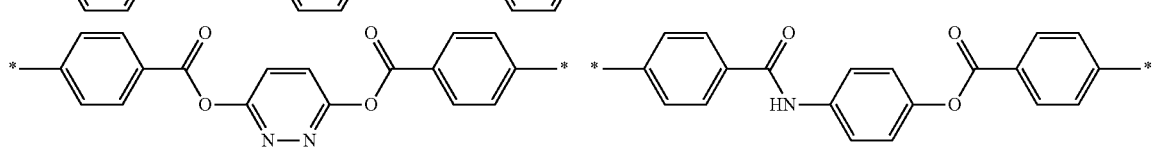

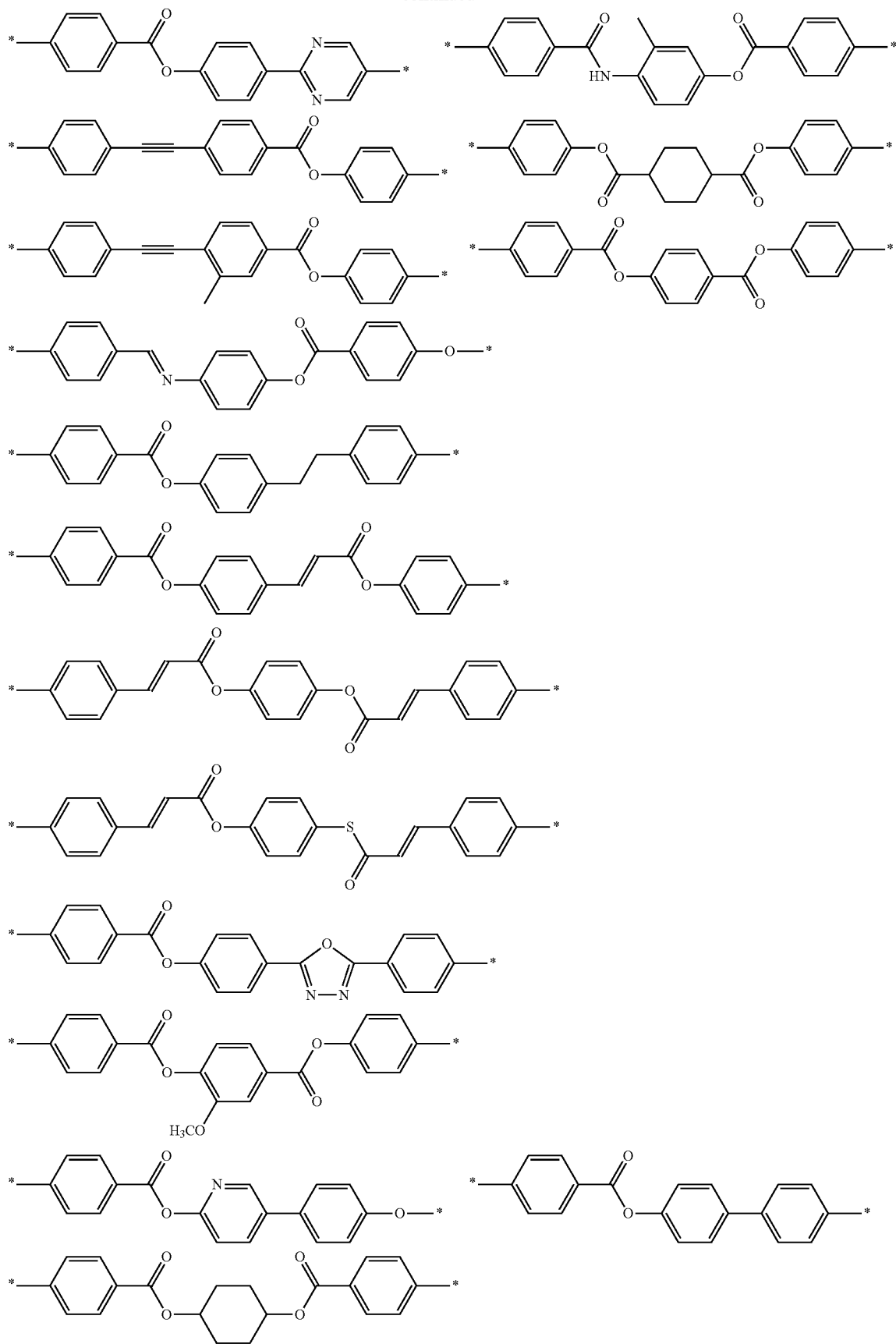

-continued
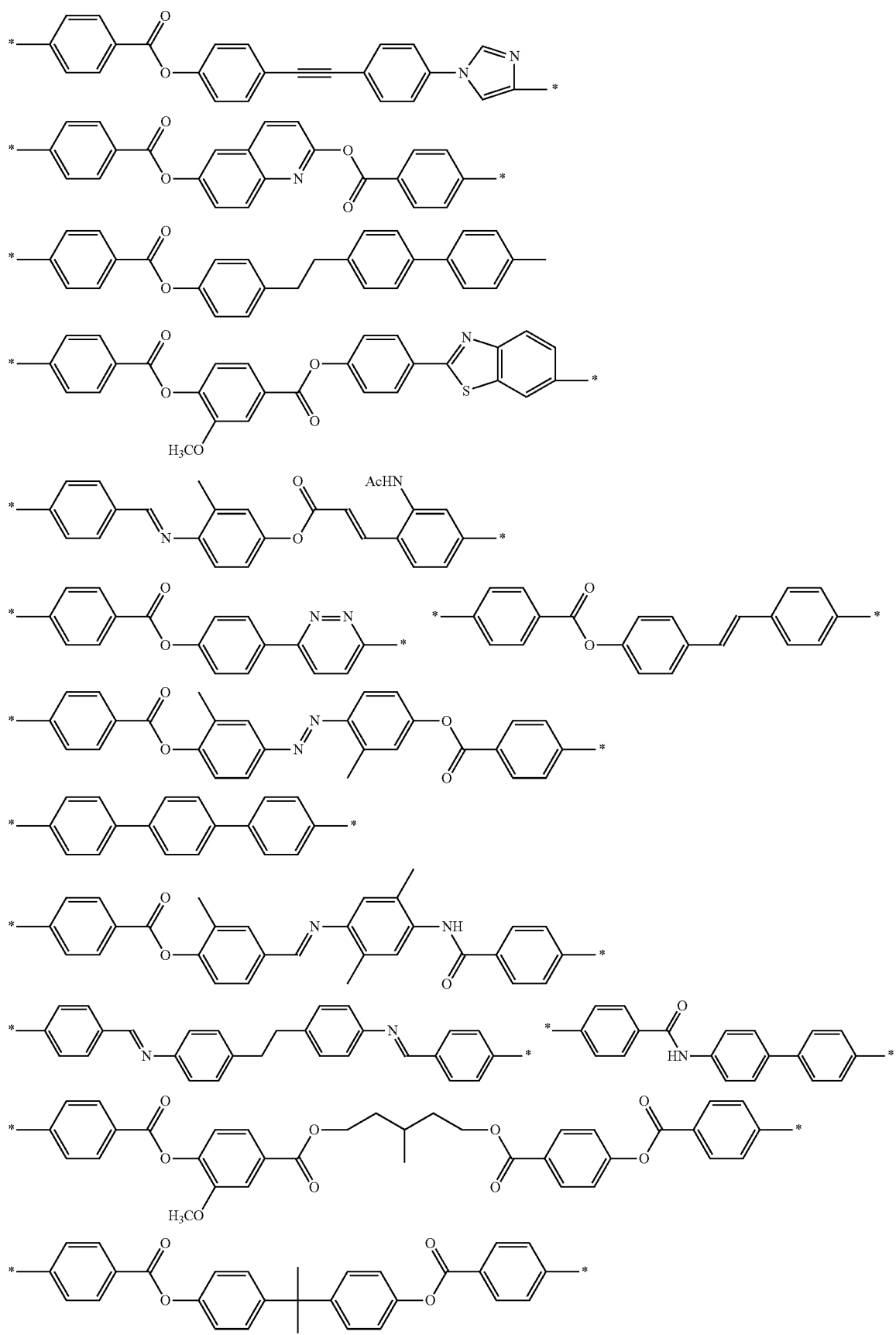

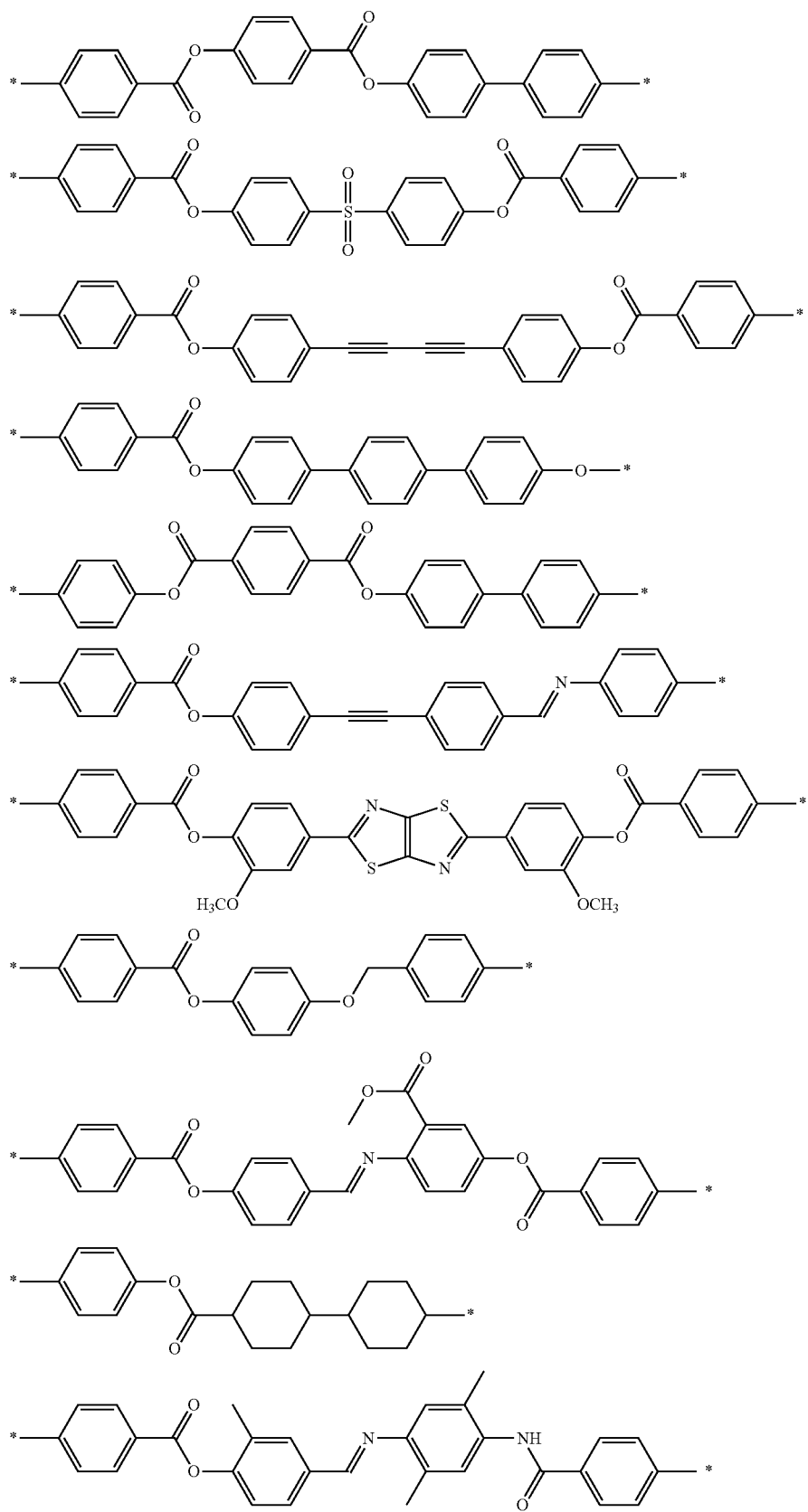

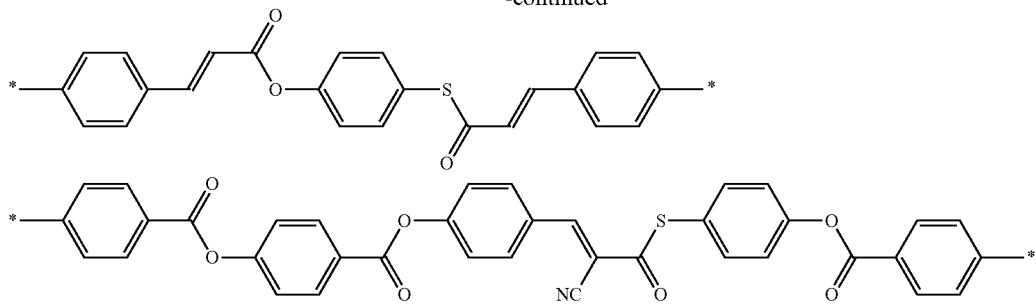

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group, specific examples of the linking group are the same as those for L1 and SP1 described above, and A represents a (meth)acryloyloxy group).

From the viewpoint that the effects of the present invention are more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the above-described crosslinkable groups.

From the viewpoint that the effects of the present invention are more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the degree of alignment of the light absorption anisotropic layer is further improved. Here, the "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

From the viewpoint that the effects of the present invention are more excellent, the content of the repeating unit (1L) is preferably in a range of 20% to 100% by mass with respect to 100% by mass of all the repeating units of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (1L). Among these, from the viewpoint that the effects of the present invention are more excellent, the polymer liquid crystal compound may have two kinds of the repeating units (1L).

In a case where the polymer liquid crystal compound has two kinds of the repeating units (1L), from the viewpoint that the effects of the present invention are more excellent, it is preferable that the terminal group represented by T1 in one (repeating unit A) is an alkoxy group and the terminal group represented by T1 in the other (repeating unit B) is a group other than the alkoxy group.

From the viewpoint that the effects of the present invention are more excellent, as the terminal group represented by T1 in the repeating unit B, an alkoxycarbonyl group, a cyano group, or a (meth)acryloyloxy group-containing group is preferable, and an alkoxycarbonyl group or a cyano group is more preferable.

From the viewpoint that the effects of the present invention are more excellent, the ratio (A/B) of the content of the repeating unit A in the polymer liquid crystal compound to the content of the repeating unit B in the polymer liquid crystal compound is preferably in a range of 50/50 to 95/5, more preferably in a range of 60/40 to 93/7, and still more preferably in a range of 70/30 to 90/10.

Further, the polymer liquid crystal compound may have the repeating unit (1L) and a repeating unit containing no mesogen group. Examples of the repeating unit containing no mesogen group include a repeating unit in which M1 in Formula (1L) represents a single bond.

In a case where the polymer liquid crystal compound has a repeating unit containing no mesogen group, the content of such a repeating unit is preferably greater than 0% by mass and 20% by mass or less with respect to 100% by mass of all the repeating units of the polymer liquid crystal compound.

(Weight-Average Molecular Weight)

From the viewpoint that the effects of the present invention are more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described range, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and more preferably 2000 or greater and less than 10000.

Here, the weight-average molecular weight and the number average molecular weight in the present invention are values measured according to gel permeation chromatography (GPC).

Solvent (eluent): N-methylpyrrolidone
Equipment name: TOSOH HLC-8220GPC
Column: Connect and use three of TOSOH TSKgel Super AWM-H (6 mm×15 cm)
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

The substituent W in the present specification will be described.

Examples of the substituent W include an alkyl group (preferably an alkyl group having 1 to 20 carbon atoms, more preferably an alkyl group having 1 to 12 carbon atoms, and particularly preferably an alkyl group having 1 to 8 carbon atoms, and examples thereof a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and examples thereof include a vinyl group, an allyl group, a 2-butenyl group, and a 3-pentenyl group), an alkynyl group (preferably an alkynyl group having 2 to 20 carbon atoms, more preferably an alkynyl group 2 to 12 carbon atoms, and particularly preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and particularly preferably an aryl group having 6 to 12 carbon atoms, and examples thereof include a phenyl group, a 2,6-diethylphenyl group, a 3,5-ditrifluoromethylphenyl group, a styryl group, a naphthyl group, and a biphenyl group), a substituted or unsubstituted amino group (preferably an amino group having 0 to 20 carbon atoms, more preferably an amino group having 0 to 10 carbon atoms, and particularly preferably an amino group having 0 to 6 carbon atoms, and examples thereof include an unsubstituted amino group, a methylamino group, a dimethylamino group, a diethylamino group, and an anilino group), an alkoxy group (preferably an alkoxy group having 1 to 20 carbon atoms and more preferably an alkoxy group having 1 to 15 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and particularly preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and particularly preferably an acyloxy group having 2 to 6 carbon atoms, and examples thereof include an acetoxy group, a benzoyloxy group, an acryloyl group, and a methacryloyl group), an acylamino group (preferably an acylamino group having 2 to 20 carbon atoms, more preferably an acylamino group having 2 to 10 carbon atoms, and particularly preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and particularly preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and particularly preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and particularly preferably a sulfonylamino group having 1 to 6 carbon atoms, and examples thereof include a methanesulfonylamino group and a benzenesulfonylamino group), a sulfamoyl group (preferably an unsubstituted sulfamoyl group having 0 to 20 carbon atoms, more preferably a sulfamoyl group having 0 to 10 carbon atoms, and particularly preferably a sulfamoyl group having 0 to 6 carbon atoms, and examples thereof include a sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and particularly preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and particularly preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and particularly preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and particularly preferably a sulfonyl group having 1 to 6 carbon atoms, and examples thereof include a mesyl group and a tosyl group), a sulfinyl group (preferably a sulfinyl group having 1 to 20 carbon atoms, more preferably a sulfinyl group having 1 to 10 carbon atoms, and particularly preferably a sulfinyl group having 1 to 6 carbon atoms, and examples thereof include a methanesulfinyl group and a benzenesulfinyl group), a ureido group (preferably a ureido group having 1 to 20 carbon atoms, more preferably a ureido group having 1 to 10 carbon atoms, and particularly preferably a ureido group having 1 to 6 carbon atoms, and examples thereof include an unsubstituted ureido group, a methylureido group, and a phenylureido group), a phosphoric acid amide group (preferably a phosphoric acid amide group having 1 to 20 carbon atoms, more preferably a phosphoric acid amide group having 1 to 10 carbon atoms, and particularly preferably a phosphoric acid amide group having 1 to 6 carbon atoms, and examples thereof include a diethylphosphoric acid amide group and a phenylphosphoric acid amide group), a hydroxy group, a mercapto group, a halogen atom (such as a fluorine atom, a chlorine atom, a bromine atom, and an iodine atom), a cyano group, a nitro group, a hydroxamic acid group, a sulfino group, a hydrazino group, an imino group, an azo group, a heterocyclic group (preferably a heterocyclic group having 1 to 30 carbon atoms and more preferably a heterocyclic group having 1 to 12 carbon atoms, and examples thereof include a heterocyclic group having a heteroatom such as a nitrogen atom, an oxygen atom, or a sulfur atom, and examples of the heterocyclic group having a heteroatom include an epoxy group, an oxetanyl group, an imidazolyl group, a pyridyl group, a quinolyl group, a furyl group, a piperidyl group, a morpholino group, a maleimide group, a benzoxazolyl group, a benzimidazolyl group, and a benzothiazolyl group), a silyl group (preferably a silyl group having 3 to 40 carbon atoms, more preferably a silyl group having 3 to 30 carbon atoms, and particularly preferably a silyl group having 3 to 24 carbon atoms, and examples thereof include a trimethylsilyl group and a triphenylsilyl group), a carboxy group, a sulfonic acid group, and a phosphoric acid group.

From the viewpoint that the effects of the present invention are more excellent, the liquid crystal compound in the present invention may contain a low-molecular-weight liquid crystal compound represented by the following formula (LC).

$$Q1\text{-}SPL1\text{-}ML\text{-}SPL2\text{-}Q2 \tag{LC}$$

In Formula (LC), Q1 and Q2 each independently represent a crosslinkable group or a terminal group. SPL1 and SPL2 each independently represent a spacer group, ML represents a mesogen group, and at least one of Q1 or Q2 represents a crosslinkable group (polymerizable group).

SPL1 and SPL2 each independently represent the same structure as the structure of SP1 in Formula (1L), and thus the description thereof will not be repeated.

ML represents the same structure as the structure of M1 in Formula (I L), and thus the description thereof will not be repeated.

Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), or any of crosslinkable groups represented by Formula (P-1) to (P-30).

 (P-1)

 (P-2)

 (P-3)

 (P-4)

 (P-5)

 (P-6)

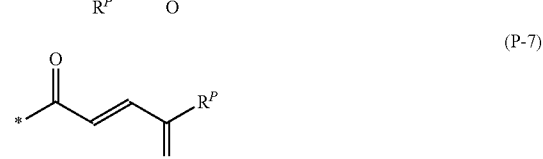 (P-7)

 (P-8)

 (P-9)

 (P-10)

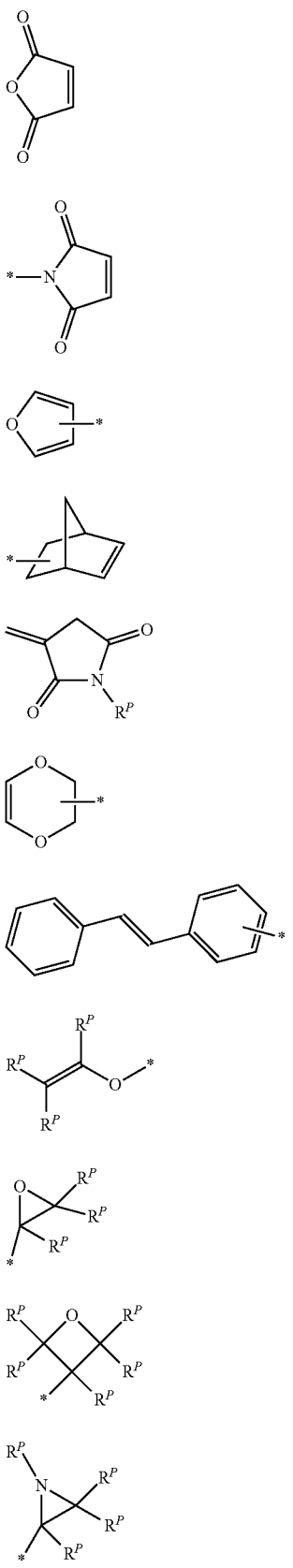
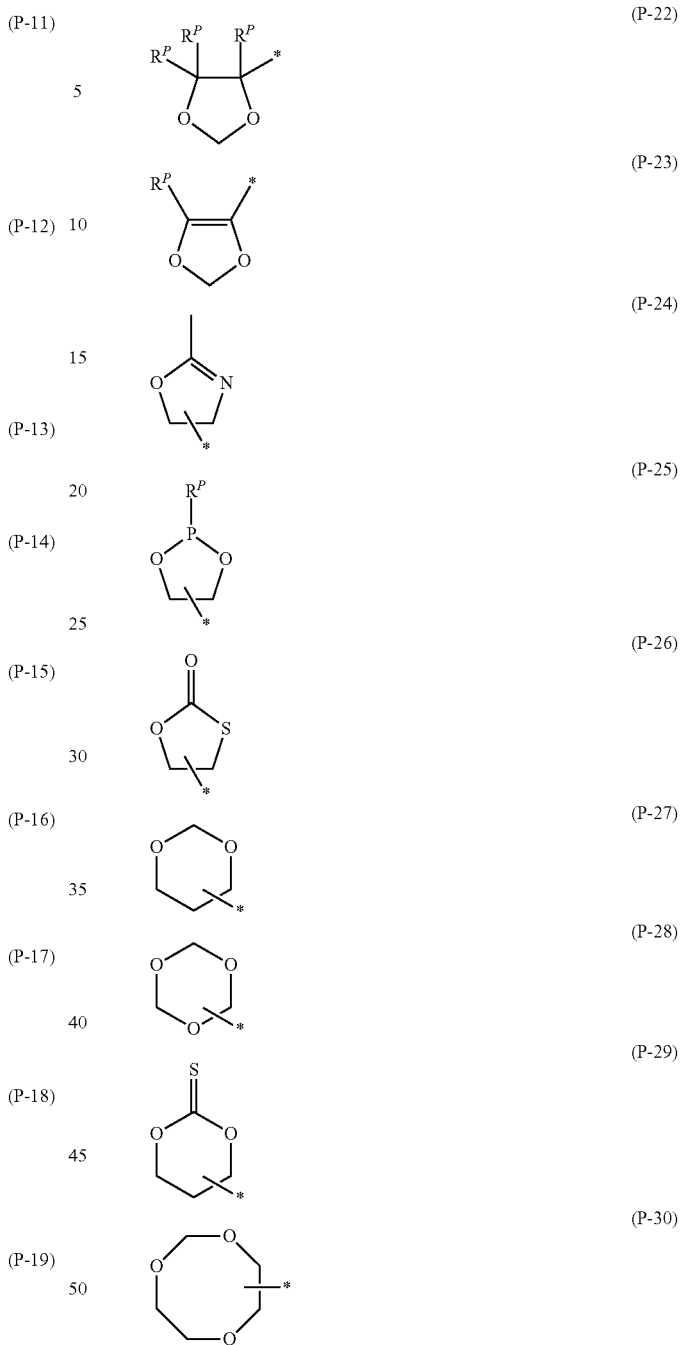

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an aryl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and a plurality of $R^P$'s may be the same as or different from each other.

Preferred examples of the crosslinkable group include a radically polymerizable group and a cationically polymerizable group. In addition, a vinyl group represented by Formula (P-1), a butadiene group represented by (P-2), a (meth)acryloyloxy group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), and a maleimide group represented by Formula (P-12) are preferable as the radically polymerizable group, and a vinyl ether group represented by Formula (P-18), an epoxy group represented by Formula (P-19), and an oxetanyl group represented by Formula (P-20) are preferable as the cationically polymerizable group. Among these, a (meth)acryloyloxy group which is a radically polymerizable group is particularly preferable.

Specific examples of the low-molecular-weight liquid crystal compound include the following structures, but the low-molecular-weight liquid crystal compound is not limited thereto.

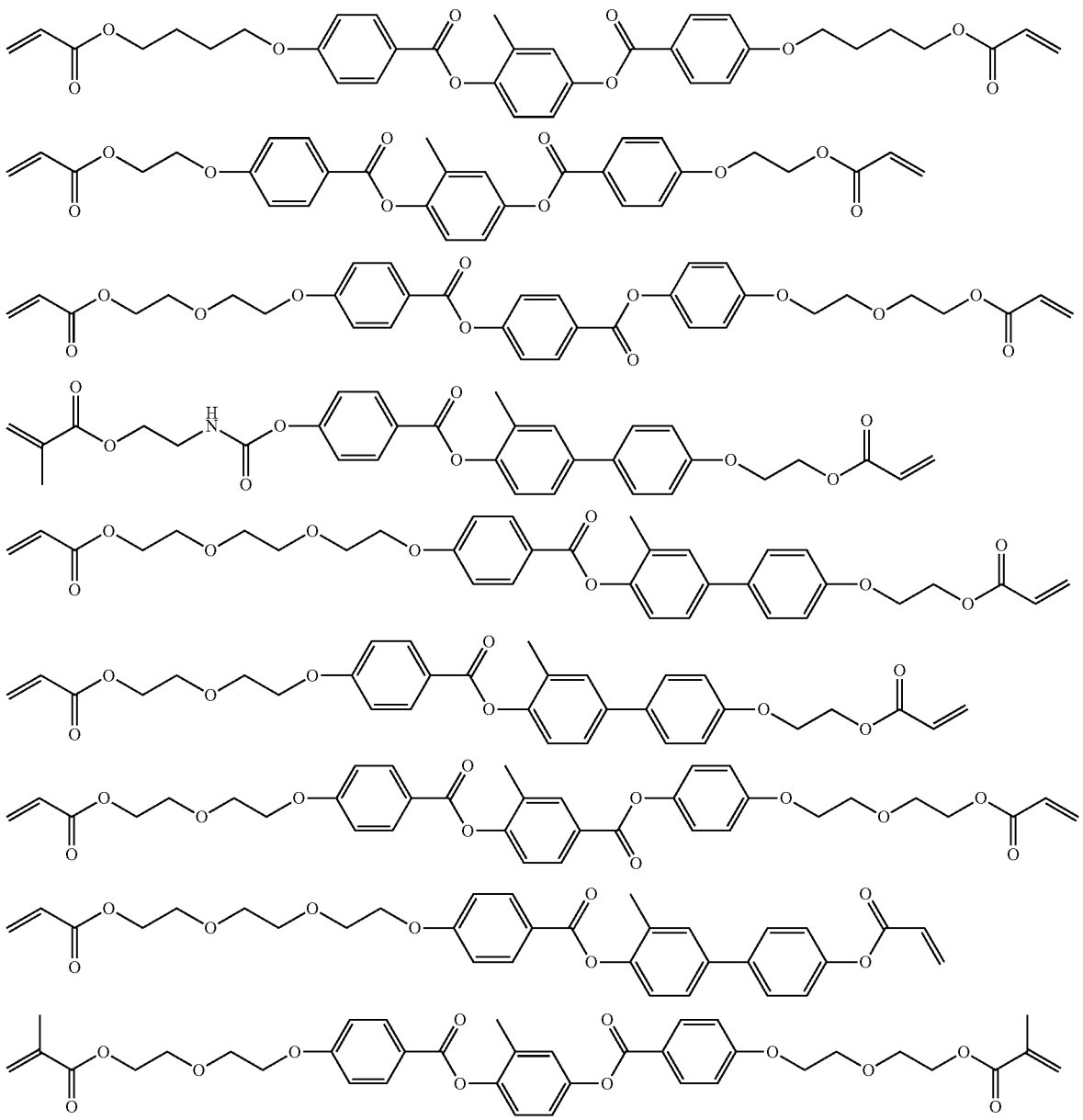

-continued
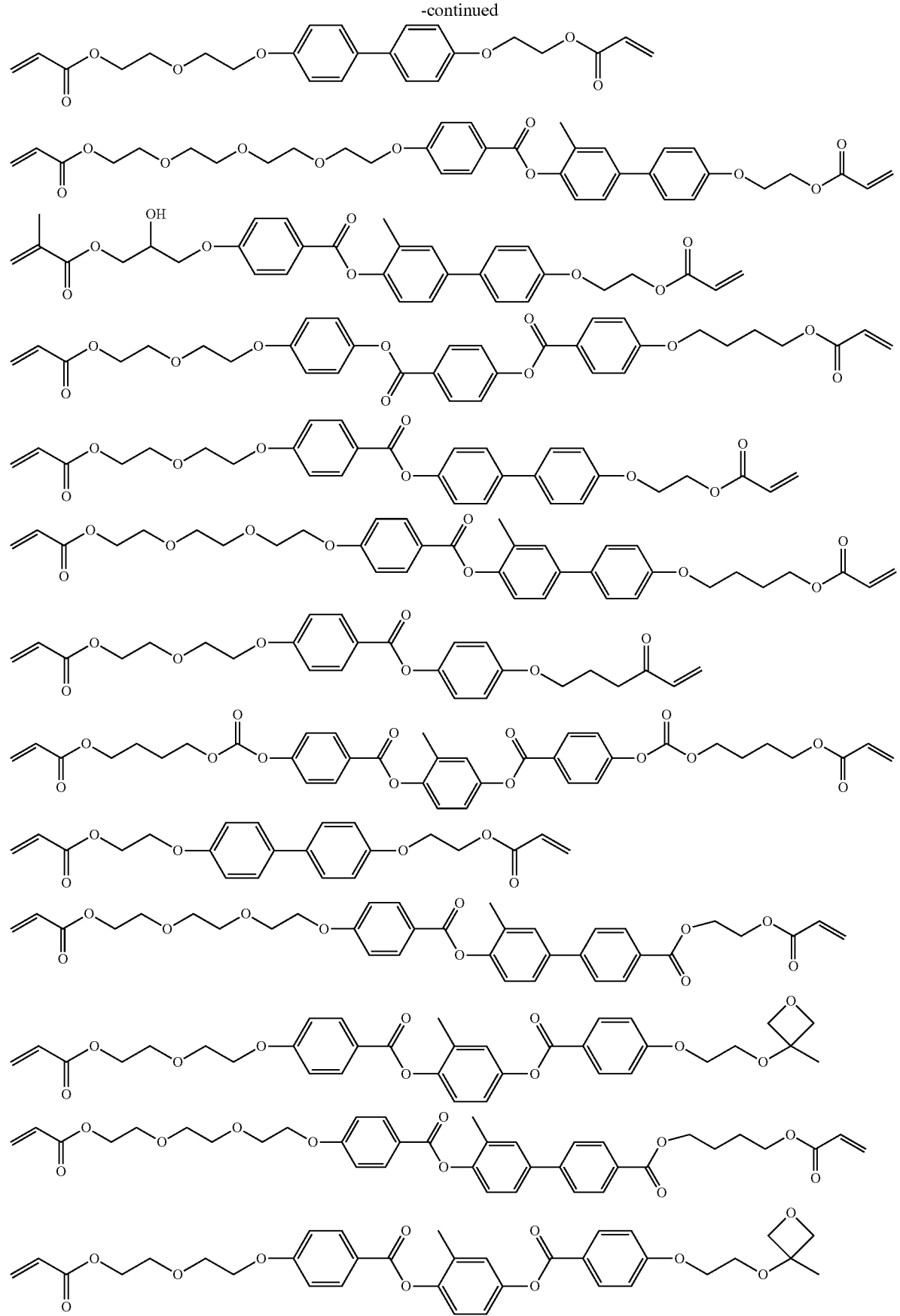

-continued

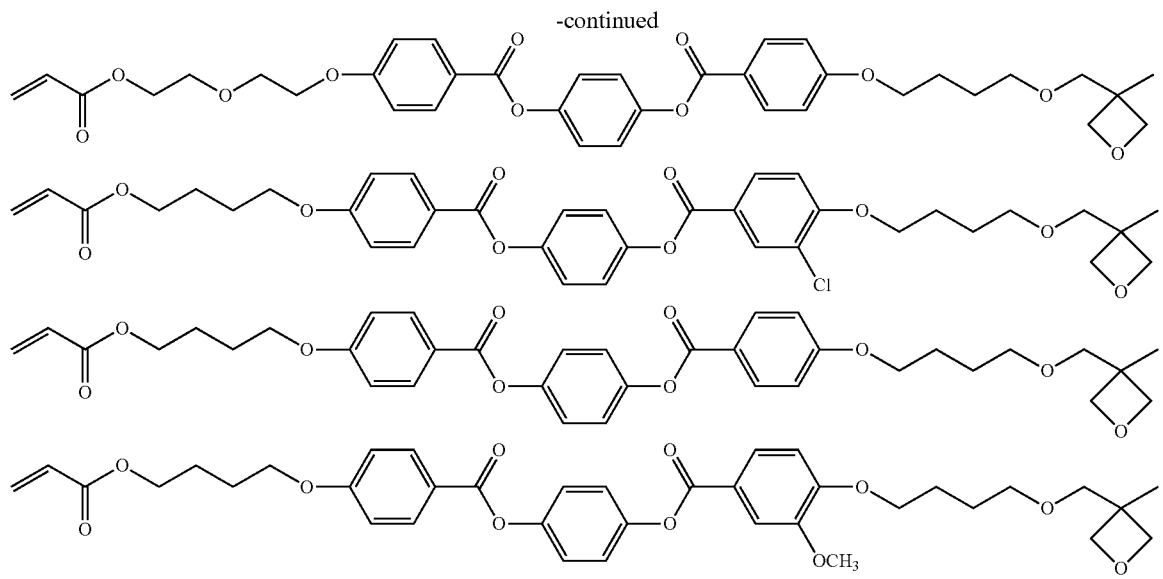

The low-molecular-weight liquid crystal compound may exhibit nematic or smectic liquid crystallinity. The temperature at which the liquid crystallinity is exhibited is preferably in a range of room temperature (23° C.) to 300° C. and from the viewpoints of the handleability and the manufacturing suitability, more preferably in a range of 40° C. to 250° C.

(Dichroic Substance)

The liquid crystal composition contains a dichroic substance. In the present invention, the dichroic substance denotes a coloring agent having different absorbances depending on the direction. The degree of alignment of the liquid crystal layer is improved by allowing the liquid crystal composition to contain a dichroic substance.

The dichroic substance is not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

The dichroic substance may contain a crosslinkable group (polymerizable group).

Specific examples of the crosslinkable group include a (meth)acryloyl group, an epoxy group, an oxetanyl group, and a styryl group. Among these, a (meth)acryloyl group is preferable.

From the viewpoint of further increasing the degree of alignment of the light absorption anisotropic layer to be formed and further improving the heat resistance, the content of the dichroic substance is preferably in a range of 1% to 80% by mass, more preferably in a range of 2% to 70% by mass, and still more preferably in a range of 3% to 60% by mass with respect to 100% by mass of the solid content in the liquid crystal composition.

Preferred examples of the aspect of the dichroic substance include a first dichroic substance, a second dichroic substance, and a third dichroic substance described below. Further, the dichroic substance may be used alone or in combination of two or more kinds thereof.

First Dichroic Substance

The first dichroic substance is a dichroic substance having a maximum absorption wavelength in a wavelength range of 560 nm or greater and 700 nm or less (more preferably in a range of 560 to 650 nm and particularly preferably in a range of 560 to 640 nm).

The maximum absorption wavelength (nm) of the dichoric substance in the present specification is acquired from an ultraviolet visible spectrum in a wavelength range of 380 to 800 nm measured by a spectrophotometer using a solution prepared by dissolving the dichroic substance in a good solvent.

It is preferable that the first dichroic substance is a compound represented by Formula (1).

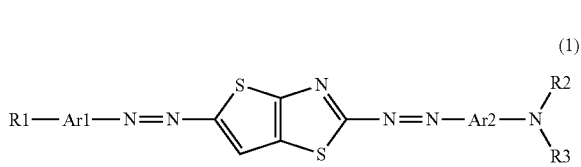

(1)

In Formula (1), Ar1 and Ar2 each independently represent a phenylene group which may have a substituent or a naphthylene group which may have a substituent. Among these, from the viewpoint that the effects of the present invention are more excellent, a phenylene group is preferable.

In Formula (1), R1 represents a hydrogen atom, an alkyl group, an alkoxy group, an alkylthio group, an alkylsulfonyl group, an alkylcarbonyl group, an alkyloxycarbonyl group, an acyloxy group, an alkylcarbonate group, an alkylamino group, an acylamino group, an alkylcarbonylamino group, an alkoxycarbonylamino group, an alkylsulfonylamino group, an alkylsulfamoyl group, an alkylcarbamoyl group, an alkylsulfinyl group, an alkylureido group, an alkylphosphoric acid amide group, an alkylamino group, or an alkylsilyl group, which may have a substituent.

Here, examples of the alkyl group having a substituent as R1 include a group in which the carbon atoms of the alkyl group are substituted with —O—, —CO—, —C(O)—O—, —O—C(O)—, —Si(CH$_3$)$_2$—O—Si(CH$_3$)$_2$—, —N(R')—, —N(R1')—CO—, —CO—N(R1')—, —N(R1')—C(O)—O—, —O—C(O)—N(R1')—, —N(R1')—C(O)—N(R')—, —CH═CH—, —C═C—, —N═N—, —C(R1')═CH—C(O)—, or —O—C(O)—O—. One or more carbon atoms or two or more carbon atoms of the alkyl group may be substituted with the above-described group.

The number of carbon atoms in the alkyl group as R1 is preferably in a range of 1 to 20, more preferably in a range of 2 to 18, still more preferably in a range of 4 to 14, and particularly preferably in a range of 8 to 12.

The alkyl group as R1 may have a linear, branched, or cyclic structure, but from the viewpoint that the effects of the present invention are more excellent, a linear structure or a branched structure is preferable, and a linear structure is more preferable.

In a case where R1 represents a group other than a hydrogen atom, the hydrogen atom in each group may be substituted with a halogen atom, a nitro group, a cyano group, —N(R1')$_2$, an amino group, —C(R1')═C(R1')—NO$_2$, —C(R1')═C(R1')—CN, or —C(R1')═C(CN)$_2$. One or more hydrogen atoms or two or more hydrogen atoms of each group may be substituted with the above-described group.

R1' represents a hydrogen atom or a linear or branched alkyl group having 1 to 6 carbon atoms. In a case where a plurality of (R1')'s are present in each group, these may be the same as or different from one another.

In Formula (1), R2 and R3 each independently represent a hydrogen atom, an alkyl group, an alkenyl group, an alkoxy group, an acyl group, an alkyloxycarbonyl group, an alkylamide group, an alkylsulfonyl group, an aryl group, an arylcarbonyl group, an arylsulfonyl group, an aryloxycarbonyl group, or an arylamide group, which may have a substituent.

Examples of the alkyl group having a substituent as R2 and R3 include a group in which the carbon atoms of the alkyl group are substituted with —O—, —S—, —C(O)—, —C(O)—O—, —O—C(O)—, —C(O)—S—, —S—C(O)—, —Si(CH$_3$)$_2$—O—Si(CH$_3$)$_2$—, —NR2'—, —NR2'—CO—, —CO—NR2'-, —NR2'-C(O)—O—, —O—C(O)—NR2'-, —NR2'-C(O)—NR2'-, —CH═CH—, —C═C—, —N═N—, —C(R2')═CH—C(O)—, or —O—C(O)—O—. One or more carbon atoms or two or more carbon atoms of the alkyl group may be substituted with the above-described group.

The number of carbon atoms of the alkyl group as R2 and R3 is preferably in a range of 1 to 20, more preferably in a range of 1 to 16, still more preferably 1 to 8, and particularly preferably 1 to 4.

The alkyl group as R2 and R3 may have a linear, branched, or cyclic structure, but from the viewpoint that the effects of the present invention are more excellent, a linear structure or a branched structure is preferable, and a linear structure is more preferable.

In a case where R2 and R3 represent a group other than a hydrogen atom, the hydrogen atom of each group may be substituted with a halogen atom, a nitro group, a cyano group, a —OH group, —N(R2')$_2$, an amino group, —C(R2')═C(R2')—NO$_2$, —C(R2') C(R2')-CN, or —C(R2')(CN)$_2$. One or more hydrogen atoms or two or more hydrogen atoms of each group may be substituted with the above-described group.

R2' represents a hydrogen atom or a linear or branched alkyl group having 1 to 6 carbon atoms. In a case where a plurality of (R2')'s are present in each group, these may be the same as or different from one another.

R2 and R3 may be bonded to each other to form a ring, or R2 or R3 may be bonded to Ar2 to form a ring.

From the viewpoint that the effects of the present invention are more excellent, it is preferable that R1 represents an electron-withdrawing group and that R2 and R3 represent a group with a low electron-donating property.

Specific examples of the group in which R1 represents an electron-withdrawing group include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureido group, and an alkyl group in which carbon atoms are substituted with —C(O)—O— and —O—, as R1. As the alkyl group in which carbon atoms are substituted with —C(O)—O— and —O—, a group represented by R11-C(O)—O—R12-O— is preferable. R11 represents a linear or branched alkyl group having 1 to 6 carbon atoms (preferably 1 to 3 carbon atoms), and R12 represents a linear or branched alkylene group having 1 to 20 carbon atoms (preferably 2 to 18 carbon atoms).

Specific examples of the group in which R2 and R3 represent a group having a low electron-donating property include groups having the following structures. In addition, the groups having the following structures are shown in the form having a nitrogen atom to which R2 and R3 are bonded in Formula (1).

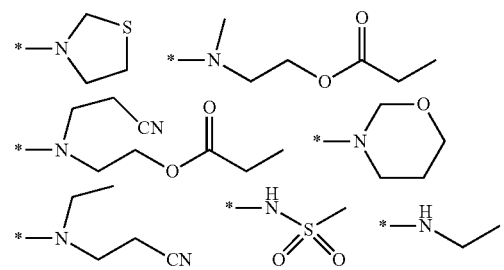

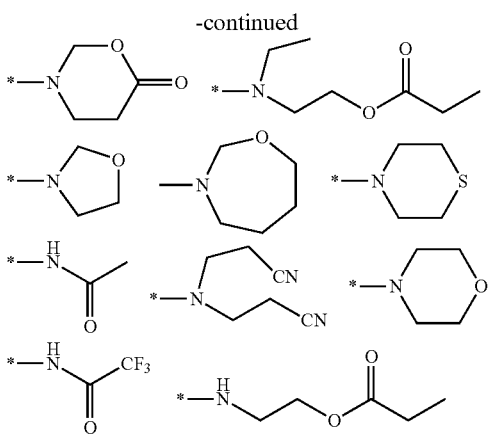
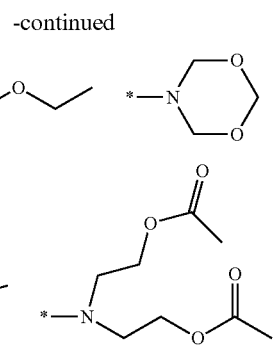
Specific examples of the first dichroic substance are shown below, but the present invention is not limited thereto.
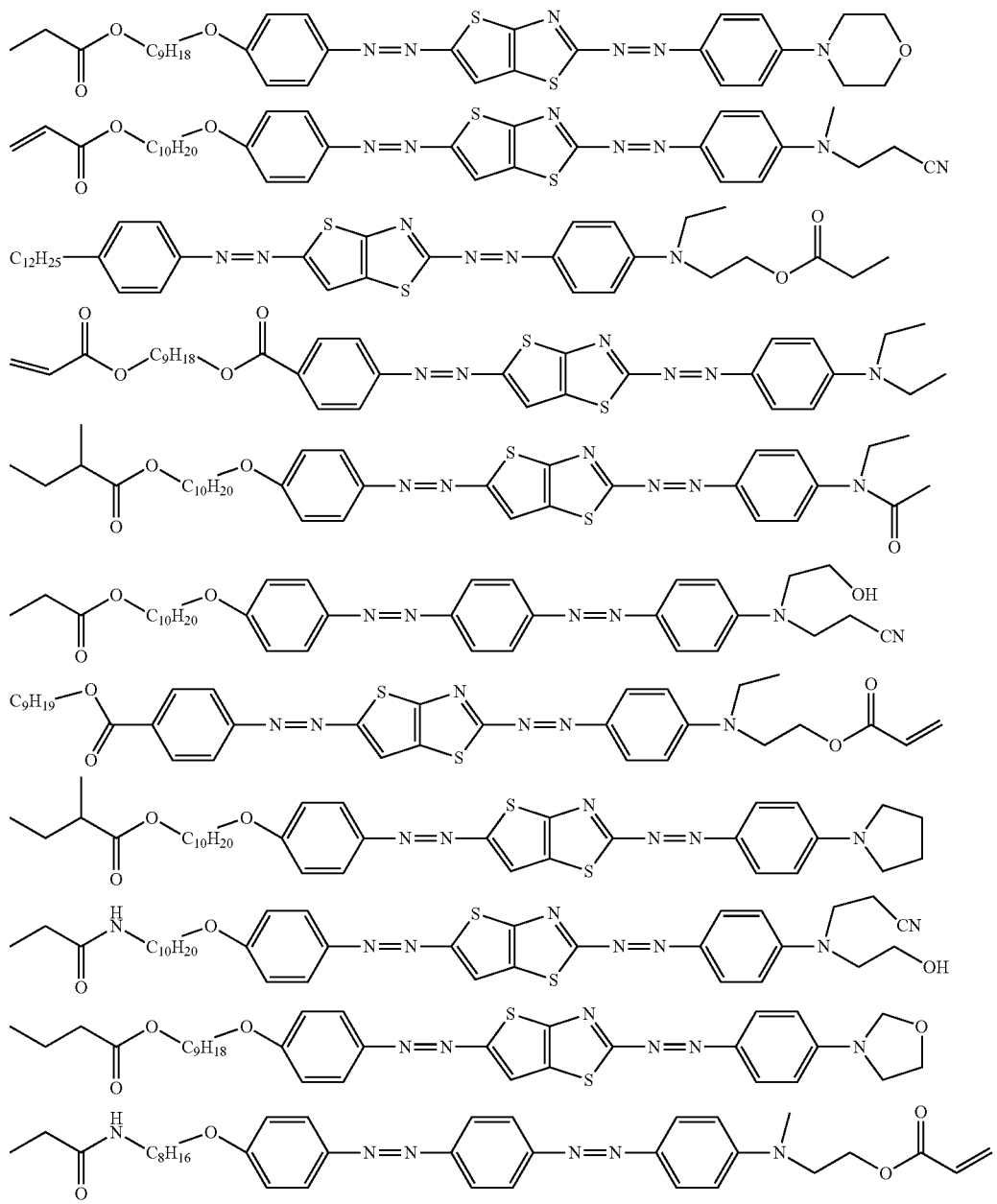

-continued
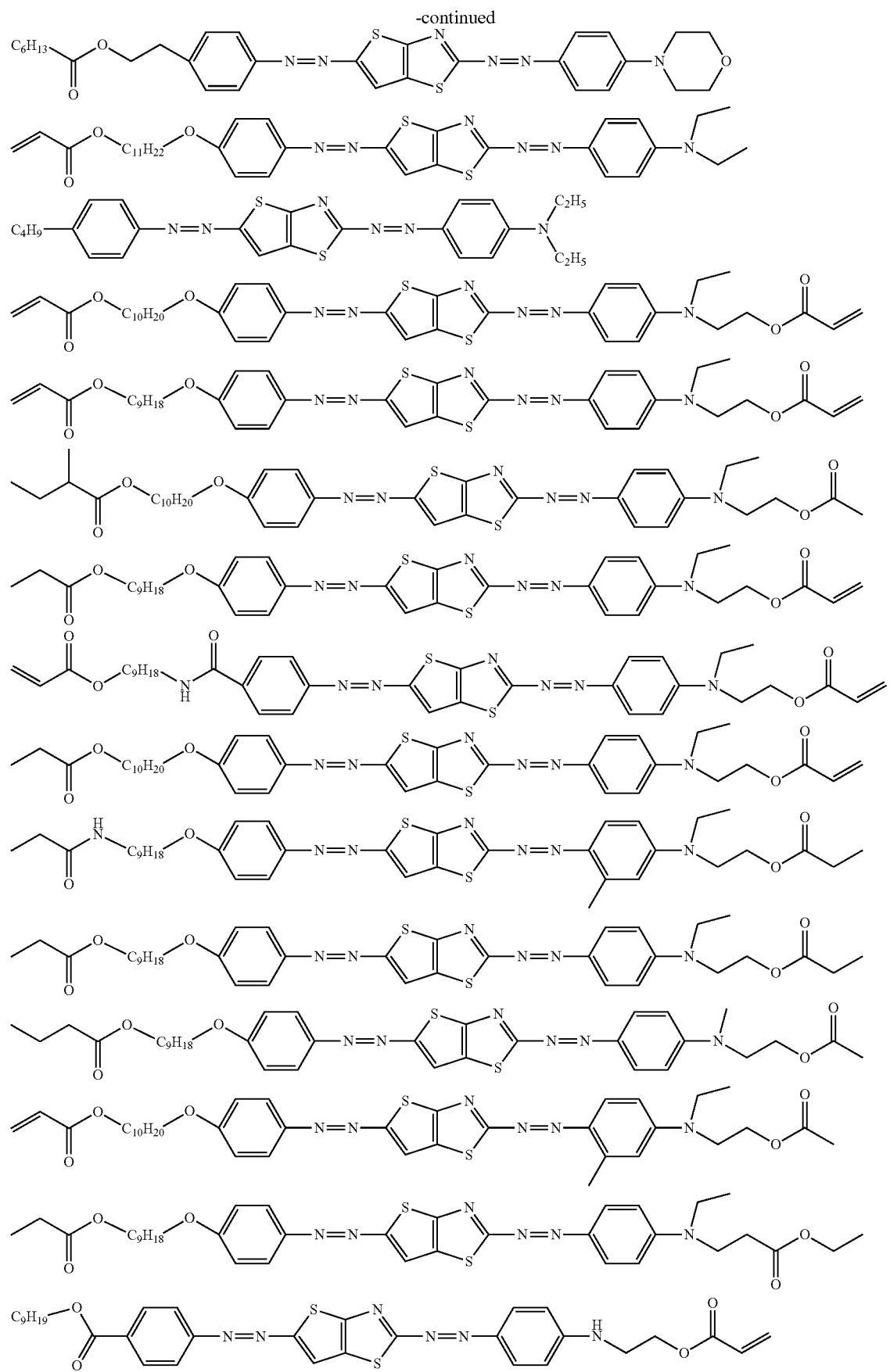

-continued

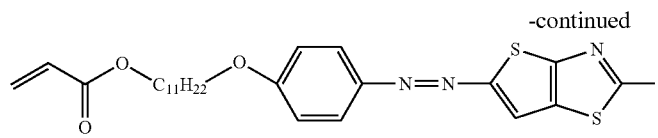

Second Dichroic Substance

The second dichroic substance is a dichroic substance having a maximum absorption wavelength in a wavelength range of 455 nm or greater and less than 560 nm (more preferably in a range of 455 to 555 nm and particularly preferably in a range of 455 to 550 nm).

In particular, the tint of the light absorption anisotropic layer can be more easily adjusted in a case where the first dichroic substance having a maximum absorption wavelength of 560 to 700 nm and the second dichroic substance having a maximum absorption wavelength of 455 nm or greater and less than 560 nm are used.

It is preferable that the second dichroic substance is a compound represented by Formula (2).

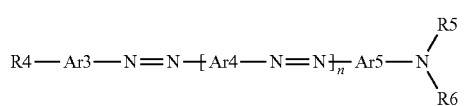

In Formula (2), n represents 1 or 2 and preferably 1 from the viewpoint that the effects of the present invention are more excellent.

In Formula (2), Ar3, Ar4, and Ar5 each independently represent a phenylene group which may have a substituent, a naphthylene group which may have a substituent, or a heterocyclic group which may have a substituent and preferably a phenylene group which may have a substituent from the viewpoint that the effects of the present invention are more excellent.

The heterocyclic group may be aromatic or non-aromatic.

The atoms other than carbon constituting the aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

In Formula (2), R4 has the same definition as that for R1 in Formula (1).

In Formula (2), R5 and R6 each have the same definition as that for R2 and R3 in Formula (1).

From the viewpoint of the durability, it is preferable that R4 represents an electron-withdrawing group and R5 and R6 represent a group having a low electron-donating property.

Among such groups, specific examples of the electron-withdrawing group as R4 are the same as the specific examples of the electron-withdrawing group as R1, and specific examples of the group having a low electron-donating property as R5 and R6 are the same as the specific examples of the group having a low electron-donating property as R2 and R3.

In particular, it is preferable that at least one of R5 or R6 represents a methyl group or an ethyl group, more preferable that at least one of R5 or R6 represents a methyl group from the viewpoint that the effects of the present invention are more excellent, and particularly preferable that only one of R5 or R6 represents a methyl group.

Specific examples of the second dichroic substance are described below, but the present invention is not limited thereto.

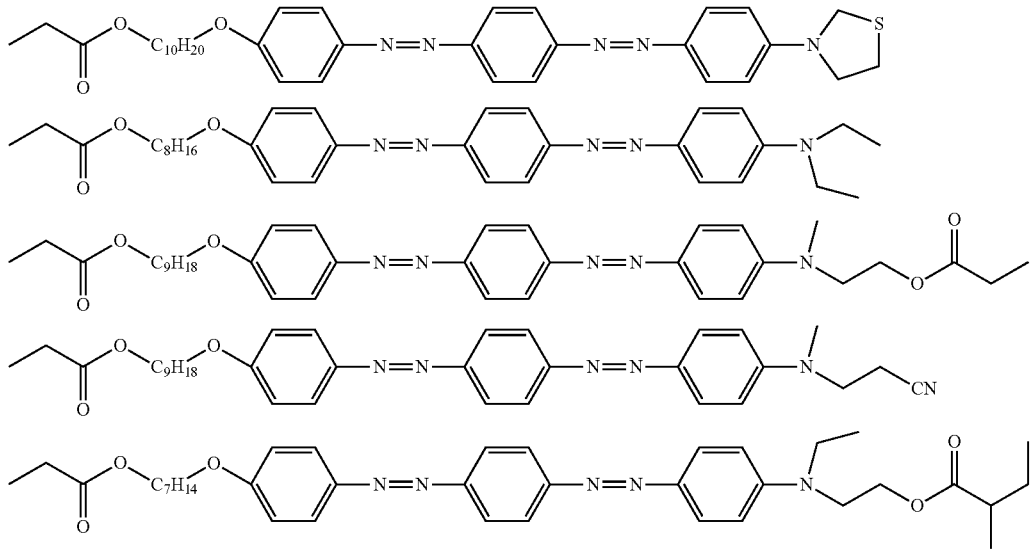

-continued
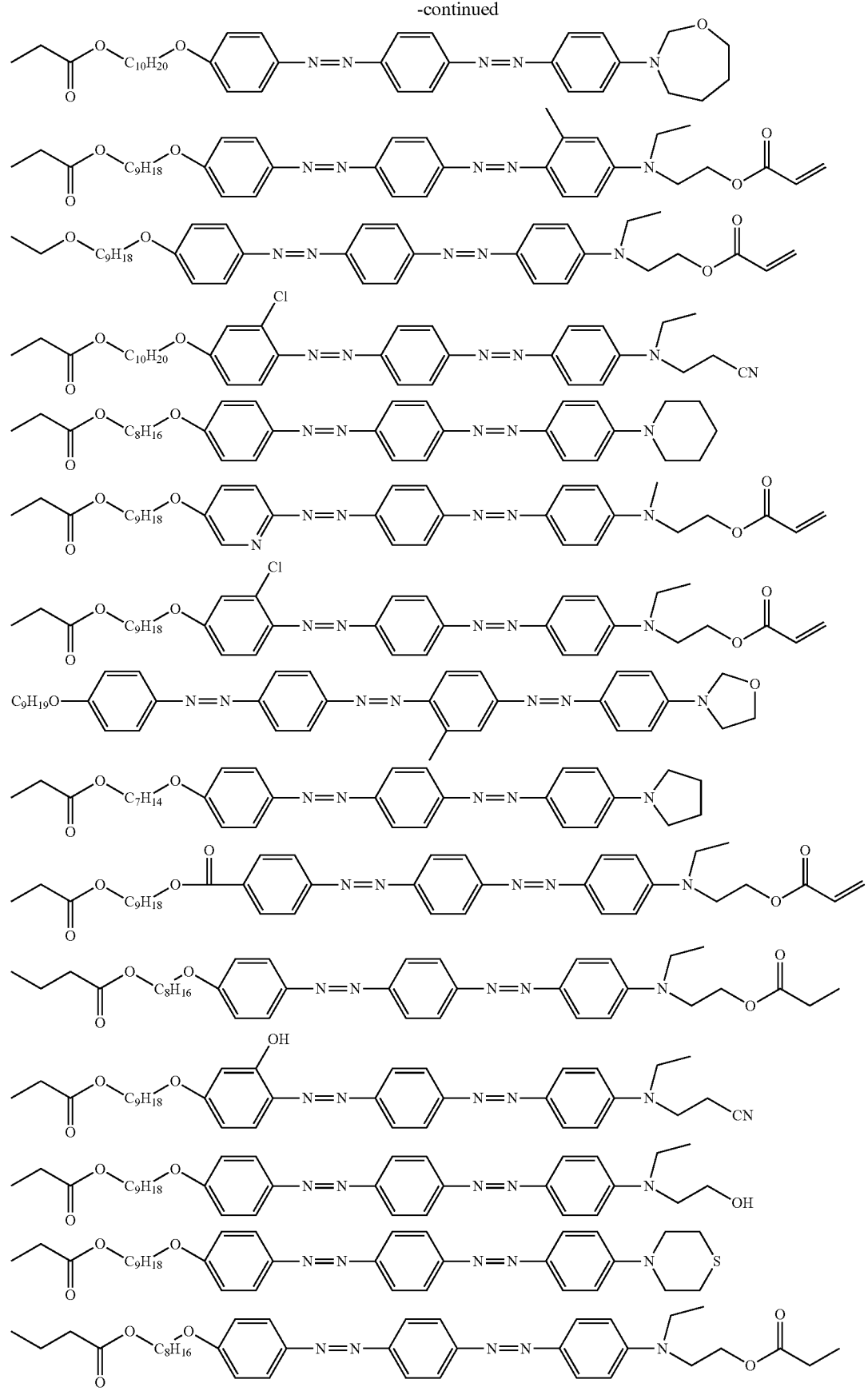

-continued
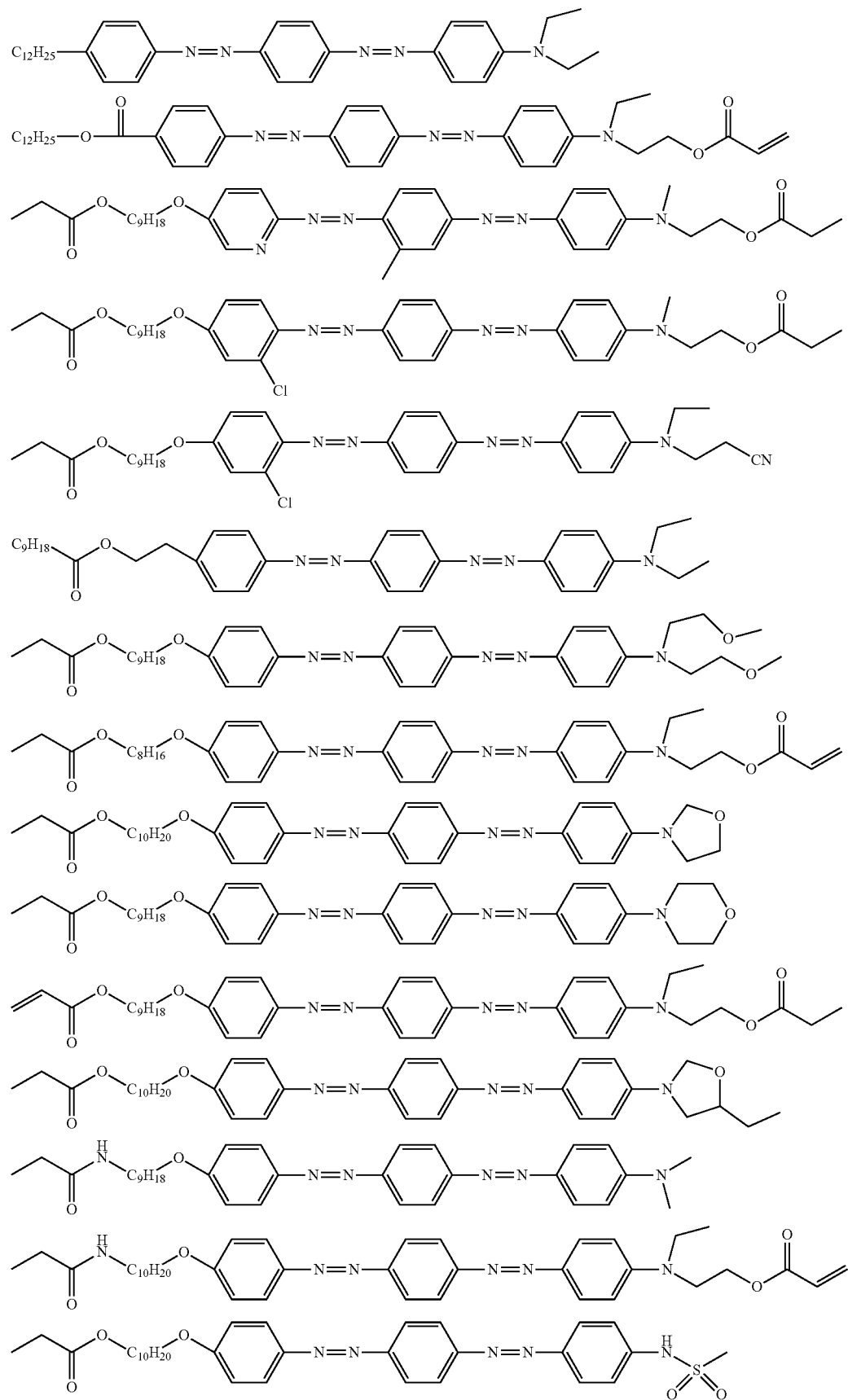

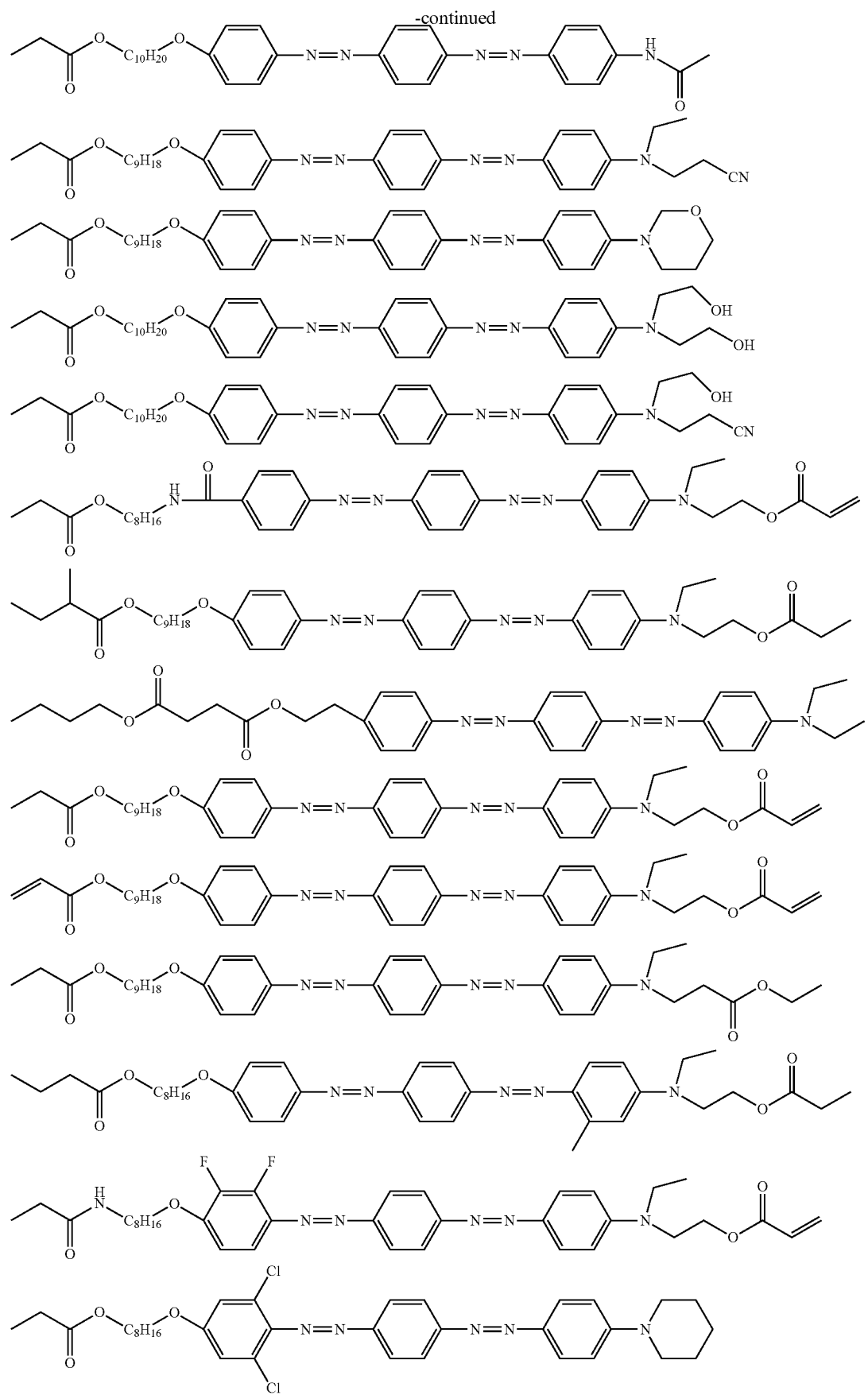

-continued

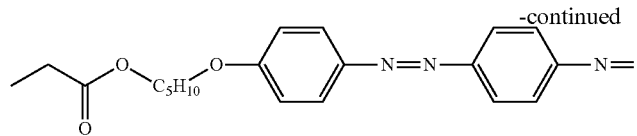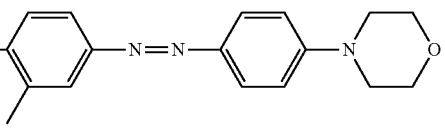

Third Dichroic Substance

The third dichroic substance is a dichroic substance having a maximum absorption wavelength in a wavelength range of 380 nm or greater and less than 455 nm (more preferably in a range of 385 to 454 nm).

The third dichroic substance is a dichroic substance other than the first dichroic substance and the second dichroic substance. Specifically, the chemical structure of the third dichroic substance is different from the chemical structures of the first dichroic substance and the second dichroic substance.

Specific examples of the third dichroic substance include compounds other than the first dichroic substance and the second dichroic substance among compounds exemplified as the compounds represented by Formula (1) described in WO2017/195833A.

The molar content of the radically polymerizable group in the liquid crystal composition is preferably 0.5 mmol/g or greater, more preferably 1.0 mmol/g or greater, and still more preferably 1.5 mmol/g or greater with respect to the total solid content of the liquid crystal composition. In a case where the molar content is 1.0 mmol/g or greater, the effects of the present invention are more excellent because the deformation of the film is suppressed.

The upper limit of the molar content thereof is not particularly limited, but is 3.0 mmol/g or less in many cases.

Here, the molar content of the radically polymerizable group denotes the ratio of the total molar amount (mol) of the radically polymerizable group contained in the liquid crystal composition to 1 g of the solid content of the liquid crystal composition. The molar content thereof can be calculated from the content (% by mass), the molecular weight, and the chemical structure of the compound containing a radically polymerizable group contained in the liquid crystal composition.

Further, specific examples of the radically polymerizable group include a vinyl group, a butadiene group, a (meth) acryloyloxy group, a (meth)acrylamide group, a vinyl acetate group, a fumaric acid ester group, a styryl group, a vinylpyrrolidone group, maleic acid anhydride, and a maleimide group. It is preferable that the radically polymerizable group is contained in at least one of the liquid crystal compound or the dichroic substance.

<Solvent>

From the viewpoints of workability and the like, it is preferable that the liquid crystal composition contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, tetrahydropyran, dioxolane, tetrahydrofurfuryl alcohol, and cyclopentyl methyl ether), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane (chloroform), dichloroethane, dichlorobenzene, and chlorotoluene), esters (such as methyl acetate, ethyl acetate, butyl acetate, and diethyl carbonate), alcohols (such as ethanol, isopropanol, butanol, and cyclohexanol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrolidone, N-ethylpyrrolidone, and 1,3-dimethyl-2-imidazolidinone), and heterocyclic compounds (such as pyridine), and water. These solvents may be used alone or in combination of two or more kinds thereof.

Among these solvents, it is preferable to use an organic solvent and more preferable to use halogenated carbons or ketones from the viewpoint that the effects of the present invention are more excellent.

In a case where the liquid crystal composition contains a solvent, the content of the solvent is preferably in a range of 70% to 99.5% by mass, more preferably in a range of 80% to 99% by mass, and particularly preferably in a range of 85% to 98% by mass with respect to the total mass of the liquid crystal composition from the viewpoint that the effects of the present invention are more excellent.

<Interface Improver>

It is preferable that the liquid crystal composition contains an interface improver (surfactant). In a case where the liquid crystal composition contains an interface improver, the smoothness of the coated surface is improved, the degree of alignment is improved, and cissing and unevenness are suppressed so that the in-plane uniformity is expected to be improved.

As the interface improver, interface improvers that allow liquid crystal compounds to be horizontally aligned are preferable, and compounds (horizontal alignment agents) described in paragraphs [0253] to [0293] of JP2011-237513A can be used. Further, fluorine (meth)acrylate-based polymers described in [0018] to [0043] of JP2007-272185A can also be used. Compounds other than the compounds described above may be used as the interface improver.

In a case where the liquid crystal composition contains an interface improver, the content of the interface improver in the liquid crystal composition is preferably in a range of 0.1% to 2.0% by mass and more preferably in a range of 0.1% to 1.0% by mass with respect to the total solid content of the liquid crystal composition.

In a case where the light absorption anisotropic layer contains an interface improver, it is preferable that the content of the interface improver with respect to the total mass of the light absorption anisotropic layer is the same as the content of the interface improver with respect to the total solid content of the liquid crystal composition.

<Polymerization Initiator>

From the viewpoint that the effects of the present invention are more excellent, it is preferable that the liquid crystal composition contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722, 512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), and acylphosphine oxide compounds (JP1988-40799B (JP-S63-40799B), JP1993-29234B (JP-H05-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, and IRGACURE OXE-01 (all manufactured by BASF SE).

In a case where the liquid crystal composition contains a polymerization initiator, from the viewpoint that the effects of the present invention are more excellent, the content of the polymerization initiator is preferably in a range of 0.1% to 6% by mass and more preferably in a range of 0.5% to 4% by mass with respect to the total solid content of the liquid crystal composition.

<Method of Forming Light Absorption Anisotropic Layer>

A method of forming the light absorption anisotropic layer using the above-described liquid crystal composition is not particularly limited, and examples thereof include a method of sequentially performing a step of coating a photoalignment layer (for example, the photoalignment layer described below) with the liquid crystal composition to form a coating film (hereinafter, also referred to as "coating film forming step") and a step of aligning a liquid crystal component contained in the coating film (hereinafter, also referred to as "aligning step").

(Coating Film Forming Step)

The coating film forming step is a step of coating a photoalignment layer with the liquid crystal composition to form a coating film.

The photoalignment layer is easily coated with the liquid crystal composition by using the liquid crystal composition containing the above-described solvent or using a liquid such as a melt obtained by heating the liquid crystal composition.

Examples of the method of coating the photoalignment layer with the liquid crystal composition, include known methods such as a roll coating method, a gravure printing method, a spin coating method, a wire bar coating method, an extrusion coating method, a direct gravure coating method, a reverse gravure coating method, a die coating method, a spraying method, and an ink jet method.

(Aligning Step)

The aligning step is a step of aligning the liquid crystal component contained in the coating film. In this manner, a light absorption anisotropic layer is obtained.

Further, the liquid crystal component is a component that also includes a dichroic substance having liquid crystallinity in a case where the above-described dichroic substance has liquid crystallinity, in addition to the above-described liquid crystal compound.

The aligning step may include a drying treatment. Components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

Here, the liquid crystal component contained in the liquid crystal composition may be aligned by performing the above-described coating film forming step or drying treatment. For example, in an embodiment in which the liquid crystal composition is prepared as a coating solution containing a solvent, a coating film having light absorption anisotropy (that is, a light absorption anisotropic layer) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the light absorption anisotropic layer.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal component contained in the coating film can be fixed. The cooling treatment is not particularly limited and can be performed according to a known method.

The light absorption anisotropic layer can be obtained by performing the above-described steps.

In the present embodiment, examples of the method of aligning the liquid crystal component contained in the coating film include a drying treatment and a heat treatment, but the method is not limited thereto, and the liquid crystal component can be aligned by a known alignment treatment.

(Other Steps)

The method of forming the light absorption anisotropic layer may include a step of curing the light absorption anisotropic layer after the aligning step (hereinafter, also referred to as a "curing step").

The curing step is performed by heating the light absorption anisotropic layer and/or irradiating the layer with light (exposing the layer to light), for example, in a case where the light absorption anisotropic layer contains a crosslinkable group (polymerizable group). Between these, it is preferable that the curing step is performed by irradiating the film with light.

In a case where the photoalignment layer contains a compound containing a photoreactive radical polymerizable group, an unreacted radically polymerizable group can be allowed to remain on the surface of the photoalignment layer using a method of allowing the photoalignment layer not to contain a radical polymerization initiator or a method of exposing the photoalignment layer in an environment with a high oxygen concentration. By reacting the unreacted radically polymerizable group present on the surface of the photoalignment layer with the radically polymerizable group of the light absorption anisotropic layer by performing the "curing step", the adhesiveness between the photoalignment layer and the light absorption anisotropic layer can be improved.

Various light sources such as infrared rays, visible light, and ultraviolet rays can be used as the light source for curing, but ultraviolet rays are preferable. In addition, ultraviolet rays may be applied while the film is heated during curing, or ultraviolet rays may be applied through a filter that transmits only a specific wavelength.

In a case where the exposure is performed while the film is heated, the heating temperature during the exposure depends on the transition temperature of the liquid crystal component contained in the light absorption anisotropic layer to the liquid crystal phase, but is preferably in a range of 25° to 140° C.

Further, the exposure may be performed under a nitrogen atmosphere. In a case where the curing of the light absorption anisotropic layer proceeds by radical polymerization, since the inhibition of polymerization by oxygen is reduced, it is preferable that exposure is performed in a nitrogen atmosphere.

The thickness of the light absorption anisotropic layer is less than 5 µm, preferably 3 µm or less, and more preferably 2 µm or less.

Here, the present inventors found that degradation of the resistance to the pressure from the surface of the laminate is particularly significant in a case where the thickness of the light absorption anisotropic layer is less than 5 µm, but this problem can be solved by using the laminate according to the embodiment of the present invention.

The lower limit of the thickness of the light absorption anisotropic layer is preferably 0.1 µm or greater and more preferably 0.3 µm or greater.

The indentation elastic modulus of the light absorption anisotropic layer is not particularly limited as long as the indentation elastic modulus thereof is less than the indentation elastic modulus of the first pressure sensitive adhesive layer, but is preferably in a range of 0.1 to 5.0 GPa, more preferably in a range of 0.5 to 3.5 GPa, and still more preferably in a range of 1 to 3 GPa from the viewpoint that the effects of the present invention are more excellent.

The ratio of the indentation elastic modulus of the first pressure sensitive adhesive layer to the indentation elastic modulus of the light absorption anisotropic layer (indentation elastic modulus of first pressure sensitive adhesive layer/indentation elastic modulus of light absorption anisotropic layer) is greater than 1, but is preferably 1.5 or greater from the viewpoint that the effects of the present invention are more excellent.

The upper limit of the ratio (indentation elastic modulus of first pressure sensitive adhesive layer/indentation elastic modulus of light absorption anisotropic layer) is not particularly limited, but is preferably 10 or less from the viewpoint that the effects of the present invention are more excellent.

The average visible light transmittance of the light absorption anisotropic layer is preferably 45% or greater, more preferably 48% or greater, and still more preferably 50% or greater. Further, the upper limit of the average visible light transmittance is 100%. It is advantageous that the average visible light transmittance of the light absorption anisotropic layer is 45% or greater from the viewpoint of improving the brightness.

In the present invention, the average visible light transmittance denotes an arithmetic average value of the transmittances at every 5 nm in a visible light region (wavelength range of 400 nm to 700 nm). The transmittance is measured using a spectrophotometer (for example, a multi-channel spectroscope (product name "QE65000", manufactured by OCEAN OPTICS Inc.).

[Alignment Layer]

It is preferable that the laminate according to the embodiment of the present invention includes an alignment layer. Examples of the alignment layer include a photoalignment layer and a rubbing treatment alignment layer. Among these, from the viewpoint that the effects of the present invention are more excellent, a photoalignment layer is preferable.

It is preferable that the alignment layer is disposed to be in contact with the surface of the light absorption anisotropic layer.

From the viewpoint that the effects of the present invention are more excellent, the thickness of the alignment layer is preferably in a range of 0.05 to 10 µm, more preferably in a range of 0.1 to 5 µm, and still more preferably in a range of 0.2 to 3 µm.

<Photoalignment Layer>

The photoalignment layer is a layer to which an alignment regulation force is applied by light.

From the viewpoint that the effects of the present invention are more excellent, the photoalignment layer contains preferably a polymer having a repeating unit that contains a radically polymerizable group and more preferably a polymer having a repeating unit that contains a radically polymerizable group and a repeating unit that contains a cinnamoyl group. Specific examples of the radically polymerizable group are as described above. Among these, a (meth)acryloyl group is preferable.

From the viewpoint that the effects of the present invention are more excellent, it is preferable that the photoalignment layer is an alignment layer to which an alignment regulation force is applied, which is obtained by performing a step (coating film forming step) of coating a polymer film with a composition (hereinafter, also referred to as a "composition for forming a photoalignment layer") that contains a compound (photoactive compound) containing a photoreactive group to form a coating film, a step (drying step) of heating the coating film so that the coating film is dried, and a step (light irradiation step) of irradiating the dried coating film with polarized light or non-polarized light in a direction oblique to the surface of the coating film.

(Coating Film Forming Step)

As described above, the coating film forming step is a step of coating a polymer film with the composition for forming a photoalignment layer to form a coating film.

Polymer Film

The polymer film is not particularly limited, and a commonly used polymer film can be used.

Specific examples of the polymer constituting the polymer film include a cellulose-based polymer, an acrylic polymer containing an acrylic acid ester polymer such as polymethyl methacrylate or a lactone ring-containing polymer, a thermoplastic norbornene-based polymer, a polycarbonate-based polymer, a polyester-based polymer such as polyethylene terephthalate or polyethylene naphthalate, a styrene-based polymer such as polystyrene or an acrylonitrile-styrene copolymer (AS resin), a polyolefin-based polymer such as polyethylene, polypropylene, or an ethylene-propylene copolymer, a vinyl chloride-based polymer, an amide-based polymer such as nylon or aromatic polyamide, an imide-based polymer, a sulfone-based polymer, a polyether sulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, and a polymer obtained by mixing such polymers.

Among these, a cellulose-based polymer represented by triacetyl cellulose (hereinafter, also referred to as "cellulose acylate") can be preferably used.

Further, from the viewpoint of workability and optical performance, an acrylic polymer is also preferably used.

Examples of the acrylic polymer include polymethyl methacrylate and the lactone ring-containing polymer and the like described in paragraphs [0017] to [0107] of JP2009-98605A.

In the present invention, a cellulose-based polymer or a polyester-based polymer can be preferably used in an aspect of using a polymer film that can be peeled off from the prepared laminate.

Further, in the present invention, it is preferable that the polymer film is transparent.

Here, the "transparent" in the present invention indicates that the average visible light transmittance is 60% or greater, preferably 80% or greater, and particularly preferably 90% or greater.

The thickness of the polymer film is not particularly limited, but is preferably 40 μm or less from the viewpoint that the thickness of the laminate can be reduced. The lower limit is not particularly limited, but is typically 5 μm or greater.

Photoactive Compound

As described above, the composition for forming a photoalignment layer contains a compound containing a photoreactive group (photoactive compound).

The photoreactive group denotes a group that produces a liquid crystal alignment ability by irradiating with light. Specifically, the photoreactive group causes the photoreaction that is the origin of the liquid crystal alignment ability such as alignment induction or isomerization reaction, dimerization reaction, photocrosslinking reaction, or photodegradation reaction of molecules (also referred to as photoactive compounds) generated by irradiation with light.

As the photoreactive group, from the viewpoint that the effects of the present invention are more excellent, those having an unsaturated bond and particularly a double bond are preferable, and examples thereof include a group containing at least one selected from the group consisting of a carbon-carbon double bond (C=C bond), a carbon-nitrogen double bond (C=N bond), a nitrogen-nitrogen double bond (N=N bond), and a carbon-oxygen double bond (C=O bond).

Examples of the photoreactive group having a C=C bond include a vinyl group, a polyene group, a stilbene group, a stilbazole group, a stilbazolium group, a chalcone group, and a cinnamoyl group.

Examples of the photoreactive group having a C=N bond include groups having structures such as an aromatic Schiff base and an aromatic hydrazone.

Examples of the photoreactive group having a C=O bond include a benzophenone group, a coumarin group, an anthraquinone group, and a maleimide group.

Examples of the photoreactive group having a N=N bond (hereinafter, also referred to as an "azo group") include an azobenzene group, an azonaphthalene group, an aromatic heterocyclic azo group, a bisazo group, a formazan group, and a group having azoxybenzene as a basic structure.

These groups may have a substituent such as an alkyl group, an alkoxy group, an aryl group, an allyloxy group, a cyano group, an alkoxycarbonyl group, a hydroxy group, a sulfonic acid group, and a halogenated alkyl group.

Among these groups, a cinnamoyl group or an azobenzene group is preferable from the viewpoint that the polarized light irradiation amount required for photoalignment is relatively small, and a photoalignment layer having excellent thermal stability and temporal stability is easily obtained.

(1) Preferred Embodiment 1: Photoactive Compound Containing Azobenzene Group

As the photoactive compound containing an azobenzene group, a photoactive compound represented by Formula (1) is particularly preferable.

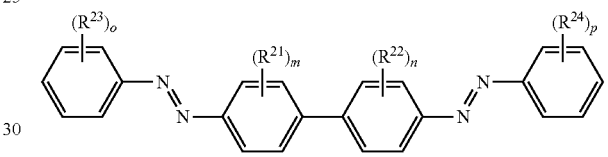

In the formula, $R^{21}$ to $R^{24}$ each independently represent a hydrogen atom or a substituent, where at least one of the groups represented by $R^{21}$ to $R^{24}$ is a carboxy group or a sulfo group, m represents an integer of 1 to 4, n represents an integer of 1 to 4, o represents an integer of 1 to 5, p represents an integer of 1 to 5, and a plurality of $R^{21}$'s to $R^{24}$'s may be the same as or different from each other in a case where m, n, o, and p represent an integer of 2 or greater.

In Formula (1), examples of the substituent represented by $R^{21}$ to $R^{24}$ include the following groups.

Examples of the substituent include a carboxy group (which may form a salt with an alkali metal, and a carboxy group that does not form a salt or a carboxy group that forms a sodium salt is preferable, and a carboxy group that forms a sodium salt is more preferable), a sulfo group (which may form a salt with an alkali metal, and a sulfo group that does not form a salt or a sulfo group that forms a sodium salt is preferable, and a sulfo group that forms a sodium salt is more preferable), an alkyl group (having preferably 1 to 20 carbon atoms, more preferably 1 to 12 carbon atoms, and particularly preferably 1 to 8 carbon atoms, and examples thereof include a methyl group, an ethyl group, an isopropyl group, a tert-butyl group, an n-octyl group, an n-decyl group, an n-hexadecyl group, a cyclopropyl group, a cyclopentyl group, and cyclohexyl group), alkenyl group (having preferably 2 to 20 carbon atoms, more preferably 2 to 12 carbon atoms, and particularly preferably 2 to 8 carbon atoms, and examples thereof include a vinyl group, an allyl group, a 2-butenyl group, and a 3-pentenyl group), an alkynyl group (having preferably 2 to 20 carbon atoms, more preferably 2 to 12 carbon atoms, and particularly preferably 2 to 8 carbon atoms, and examples thereof include a propargyl group and a 3-pentynyl group), an aryl group (having preferably 6 to 30 carbon atoms, more preferably 6 to 20 carbon atoms, and particularly preferably 6 to 12 carbon atoms, and examples thereof include a phenyl group, a 2,6-diethylphenyl group, a 3,5-ditrifluoromethylphenyl group, a naphthyl group, and a biphenyl group), and a substituted or unsubstituted amino group (having preferably 0 to 20 carbon atoms, more preferably 0 to 10 carbon atoms, and particularly preferably 0 to 6 carbon atoms, and examples thereof include an unsubstituted amino group, a methylamino group, a dimethylamino group, a diethylamino group, and an anilino group), an alkoxy group (having preferably 1 to 20 carbon atoms, more preferably 1 to 10 carbon atoms, and particularly preferably 1 to 6 carbon atoms, and examples thereof include a methoxy group, an ethoxy group, and a butoxy group), an alkoxycarbonyl group (having preferably 2 to 20 carbon atoms, more preferably 2 to 10 carbon atoms, and particularly preferably 2 to 6 carbon atoms, and examples thereof include a methoxycarbonyl group and an ethoxycarbonyl group), an acyloxy group (having preferably 2 to 20 carbon atoms, more preferably 2 to 10 carbon atoms, and particularly preferably 2 to 6 carbon atoms, and examples thereof include an acetoxy group and a benzoyloxy group), an acylamino group (having preferably 2 to 20 carbon atoms, more preferably 2 to 10 carbon atoms, and particularly preferably 2 to 6 carbon atoms, and examples thereof include an acetylamino group and a benzoylamino group), an alkoxycarbonylamino group (having preferably 2 to 20 carbon atoms, more preferably 2 to 10 carbon atoms, and particularly preferably 2 to 6 carbon atoms, and examples thereof include a methoxycarbonylamino group), an aryloxycarbonylamino group (having preferably 7 to 20 carbon atoms, more preferably 7 to 16 carbon atoms, and particularly preferably 7 to 12 carbon atoms, and examples thereof include a phenyloxycarbonylamino group), a sulfonylamino group (having preferably 1 to 20 carbon atoms, more preferably 1 to 10 carbon atoms, and particularly preferably 1 to 6 carbon atoms, and examples thereof include a methanesulfonylamino group and a benzenesulfonylamino group), a sulfamoyl group (having preferably 0 to 20, more preferably 0 to 10 carbon atoms, and particularly preferably 0 to 6 carbon atoms, and examples thereof include an unsubstituted sulfamoyl group, a methylsulfamoyl group, a dimethylsulfamoyl group, and a phenylsulfamoyl group), and a carbamoyl group (having preferably 1 to 20 carbon atoms, more preferably 1 to 10 carbon atoms, and particularly preferably 1 to 6 carbon atoms, and examples thereof include an unsubstituted carbamoyl group, a methylcarbamoyl group, a diethylcarbamoyl group, and a phenylcarbamoyl group), an alkylthio group (having preferably 1 to 20 carbon atoms, more preferably 1 to 10 carbon atoms, and particularly preferably 1 to 6 carbon atoms, and examples thereof include a methylthio group and an ethylthio group), an arylthio group (having preferably 6 to 20 carbon atoms, more preferably 6 to 16 carbon atoms, and particularly preferably 6 to 12 carbon atoms, and examples thereof include a phenylthio group), a sulfonyl group (having preferably 1 to 20 carbon atoms, more preferably 1 to 10 carbon atoms, and particularly preferably 1 to 6 carbon atoms, and examples thereof include a mesyl group and a tosyl group), a sulfinyl group (having preferably 1 to 20 carbon atoms, more preferably 1 to 10 carbon atoms, and particularly preferably 1 to 6 carbon atoms, and examples thereof include a methanesulfinyl group and a benzenesulfinyl group), a ureido group (having preferably 1 to 20 carbon atoms, more preferably 1 to 10 carbon atoms, and particularly preferably 1 to 6 carbon atoms, and examples thereof include an unsubstituted ureido group, a methyl ureido group, and a phenyl ureido group), a phosphoric acid amide group (having preferably 1 to 20 carbon atoms, more preferably 1 to 10 carbon atoms, and particularly preferably 1 to 6 carbon atoms, and examples thereof include a diethyl phosphoric acid amide group and a phenyl phosphoric acid amide group), a hydroxy group, a mercapto group, a halogen atom (such as a fluorine atom, a chlorine atom, a bromine atom, or an iodine atom), a cyano group, a nitro group, a hydroxamic acid group, a sulfino group, a hydrazino group, an imino group, a heterocyclic group (having preferably 1 to 30 carbon atoms and more preferably 1 to 12 carbon atoms, and examples thereof include a heterocyclic group having heteroatoms such as nitrogen atoms, oxygen atoms, and sulfur atoms, and specific examples thereof include an imidazolyl group, a pyridyl group, a quinolyl group, a furyl group, a piperidyl group, a morpholino group, a benzoxazolyl group, a benzimidazolyl group, and a benzothiazolyl group), and a silyl group (having preferably 3 to 40 carbon atoms, more preferably 3 to 30 carbon atoms, and particularly preferably 3 to 24 carbon atoms, and examples thereof include a trimethylsilyl group and a triphenylsilyl group).

These substituents may be further substituted with these substituents. Further, in a case where two or more substituents are present, these may be the same as or different from each other. Further, these may be bonded to each other to form a ring where possible. The group represented by any of $R^{21}$ to $R^{24}$ may be a polymerizable group or a substituent containing a polymerizable group.

In Formula (I), as the group represented by any of $R^{21}$ to $R^{24}$, from the viewpoint that the effects of the present invention are more excellent, a hydrogen atom, a carboxy group, a sulfo group, a halogen atom, an alkyl group, an alkoxy group, a cyano group, a nitro group, an alkoxycarbonyl group, or a carbamoyl group is preferable, a hydrogen atom, a carboxy group, a sulfa group, a halogen atom, a halogenated methyl group, a halogenated methoxy group, a cyano group, a nitro group, or a methoxycarbonyl group is more preferable, and a hydrogen atom, a carboxy group, a sulfo group, a halogen atom, a cyano group, or a nitro group is particularly preferable.

At least one of the groups represented by $R^{21}$ to $R^{24}$ is a carboxy group or a sulfo group. The substitution position of the carboxy group or the sulfo group is not particularly limited, but from the viewpoint of photoactivation, it is preferable that at least one $R^{21}$ and/or at least one $R^{22}$ represent a sulfo group and more preferable that at least one $R^{21}$ and at least one $R^{22}$ represent a sulfo group. From the same viewpoint as described above, it is preferable that at least one $R^{23}$ and/or at least one $R^{24}$ represent a carboxy group and more preferable that at least one $R^{23}$ and at least one $R^{24}$ represent a carboxy group. It is still more preferable that $R^{23}$ and $R^{24}$ substituted at the meta position with respect to an azo group represent a carboxy group.

In Formula (I), m represents an integer of 1 to 4, n represents an integer of 1 to 4, o represents an integer of 1 to 5, and p represents an integer of 1 to 5. It is preferable that m represents an integer of 1 or 2, n represents an integer of 1 or 2, o represents an integer of 1 or 2, and p represents an integer of 1 or 2.

Hereinafter, specific examples of the compound represented by Formula (I) will be described below, but the present invention is not limited to the following specific examples.

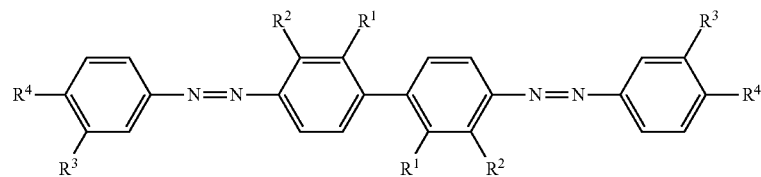

| No. | $R^1$ | $R^2$ | $R^3$ | $R^4$ |
|---|---|---|---|---|
| E-1 | —SO$_3$Na | —H | —COOH | —OH |
| E-2 | —H | —SO$_3$Na | —COOH | —OH |
| E-3 | —SO$_3$Na | —H | —COONa | —OH |
| E-4 | —H | —SO$_3$Na | —COONa | —OH |
| E-5 | —CH$_3$ | —H | —COONa | —OH |
| E-6 | —H | —CH$_3$ | —COONa | —OH |
| E-7 | —H | —OCH$_3$ | —COONa | —OH |
| E-8 | —H | —OCF$_3$ | —COONa | —OH |
| E-9 | —H | —Cl | —COONa | —OH |
| E-10 | —H | —CN | —COONa | —OH |
| E-11 | —H | —NO$_2$ | —COONa | —OH |
| E-12 | —COOCH$_3$ | —H | —COONa | —OH |
| E-13 | —CONH$_2$ | —H | —COONa | —OH |
| E-14 | —SO$_3$NH$_2$ | —H | —COONa | —OH |
| E-15 | —SO$_3$Na | —H | —COONa | —OH |
| E-16 | —SO$_3$Na | —H | —CH$_2$OH | —OH |
| E-17 | —H | —SO$_3$Na | —CH$_2$OH | —OH |
| E-18 | —SO$_3$Na | —H | —COOH | —O–C(=O)–C$_6$H$_4$–O(CH$_2$)$_4$O–C(=O)–CH=CH$_2$ |
| E-19 | —H | —SO$_3$Na | —COOH | —O–C(=O)–C$_6$H$_4$–O(CH$_2$)$_4$O–C(=O)–CH=CH$_2$ |
| E-20 | —CH$_3$ | —H | —COONa | —O–C(=O)–C$_6$H$_4$–O(CH$_2$)$_4$O–C(=O)–CH=CH$_2$ |
| E-21 | —H | —CH$_3$ | —COONa | —O–C(=O)–C$_6$H$_4$–O(CH$_2$)$_4$O–C(=O)–CH=CH$_2$ |
| E-22 | —SO$_3$Na | —H | —CF$_3$ | —O–C(=O)–C$_6$H$_4$–O(CH$_2$)$_4$O–C(=O)–CH=CH$_2$ |
| E-23 | —H | —SO$_3$Na | —CF$_2$ | —O–C(=O)–C$_6$H$_4$–O(CH$_2$)$_4$O–C(=O)–CH=CH$_2$ |
| E-24 | —SO$_3$Na | —H | —COOH | —O–C(=O)–C$_6$H$_4$–O(CH$_2$)$_6$O–C(=O)–CH=CH$_2$ |
| E-25 | —CH$_3$ | —H | —COONa | —O–C(=O)–C$_6$H$_4$–O(CH$_2$)$_6$O–C(=O)–CH=CH$_2$ |

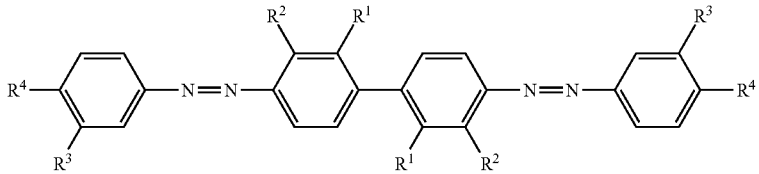

| No. | R¹ | R² | R³ | R⁴ |
|---|---|---|---|---|
| E-26 | —SO₃Na | —H | —CF₃ | 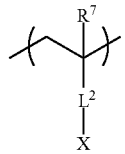 |

In the present invention, from the viewpoint that the degree of alignment is excellent, as the compound containing an azo group (particularly, an azobenzene group) having a nitrogen-nitrogen double bond (N=N bond), a low-molecular-weight compound represented by any of Formulae E-1 to E-17 and containing no polymerizable group having a molecular weight of 1000 or less is preferable.

(2) Preferred Embodiment 2: Photoactive Compound Containing Cinnamoyl Group

Meanwhile, as the photoactive compound containing a cinnamoyl group, a polymer is preferable from the viewpoint that the influence of contact with the photoalignment layer is small.

Further, a polymer containing a cinnamoyl group and a crosslinkable group is preferable from the viewpoint that the influence of contact with the photoalignment layer is further reduced.

The crosslinkable group may be a group that is crosslinked by causing a crosslinking reaction, and examples thereof include a cationically polymerizable group such as an epoxy group, and a radically polymerizable group such as an acrylate or a methacrylate.

Further, in order to improve the adhesiveness, it is still more preferable that the coating film of the photoalignment layer contains both a cationically polymerizable group and a radically polymerizable group from the viewpoint of being functionally separated and used.

Suitable examples of the polymer containing a cinnamoyl group and a crosslinkable group include a photoalignment copolymer having a repeating unit A containing a cinnamoyl group represented by Formula (A) and a repeating unit B containing a crosslinkable group represented by Formula (B).

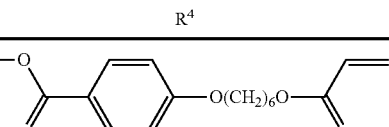

(A)

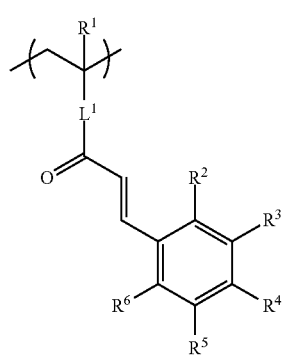

(B)

In Formula (A), $R^1$ represents a hydrogen atom or a methyl group. $L^1$ represents a divalent linking group having a nitrogen atom and a cycloalkane ring, and some carbon atoms constituting the cycloalkane ring may be substituted with heteroatoms selected from the group consisting of nitrogen, oxygen, and sulfur.

$R^2$, $R^3$, $R^4$, $R^5$, and $R^6$ each independently represent a hydrogen atom or a substituent, and two adjacent groups from among $R^2$, $R^3$, $R^4$, $R^5$, and $R^6$ may be bonded to each other to form a ring.

In Formula (B), $R^1$ represents a hydrogen atom or a methyl group, $L^2$ represents a divalent linking group, and X represents a crosslinkable group (polymerizable group).

In the present invention, the solvent resistance of the photoalignment layer to be obtained and the aligning properties of the polymer liquid crystal compound (hereinafter, referred to as "liquid crystal aligning properties") during formation of the light absorption anisotropic layer are enhanced by using a photoalignment copolymer having a repeating unit A containing a cinnamoyl group represented by Formula (A) and a repeating unit B containing a crosslinkable group represented by Formula (B).

The reason for this is not clear, but the present inventors presume as follows.

That is, it is considered that in a case where the divalent linking group represented by $L^1$ in Formula (A) has a nitrogen atom and a cycloalkane ring, the hydrogen bond properties and the molecular rigidity are enhanced so that molecular motion is suppressed, and thus the solvent resistance is improved.

Similarly, it is considered that in a case where the divalent linking group represented by $L^1$ in Formula (A) has a nitrogen atom and a cycloalkane ring, the glass transition temperature of the copolymer is increased, the temporal stability of the photoalignment layer to be obtained is improved, and thus the liquid crystal aligning properties are enhanced regardless of the timing of formation of the optically anisotropic layer.

Next, the divalent linking group having a nitrogen atom and a cycloalkane ring which is represented by $L^1$ in Formula (A) will be described. In the present invention, as described above, some carbon atoms constituting the cycloalkane ring may be substituted with a heteroatom selected from the group consisting of nitrogen, oxygen, and sulfur. Further, in a case where some carbon atoms constituting the cycloalkane ring are substituted with nitrogen atoms, the divalent linking group may not have a nitrogen atom separately from the cycloalkane ring.

Further, as the cycloalkane ring contained in the divalent linking group represented by $L^1$ in Formula (A), a cycloalkane ring having 6 or more carbon atoms is preferable, and specific examples thereof is a cyclohexane ring, a cycloheptane ring, a cyclooctane ring, a cyclododecane ring, and a cyclodocosane ring.

In the present invention, from the viewpoint of further enhancing the liquid crystal aligning properties, it is preferable that $L^1$ in Formula (A) represents a divalent linking group represented by any of Formulae (1) to (10).

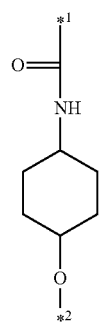
(1)

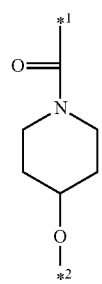
(2)

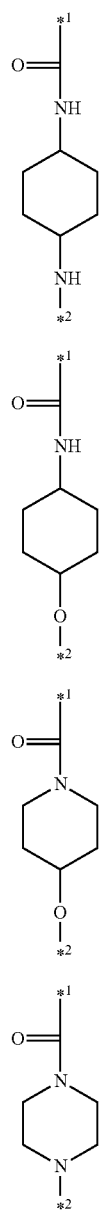
(3)

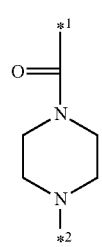
(4)

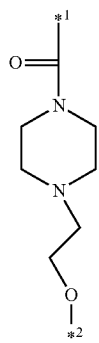
(5)

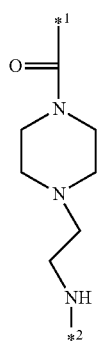
(6)

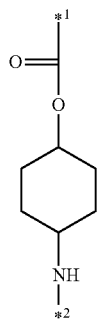
(7)

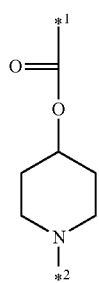
(8)

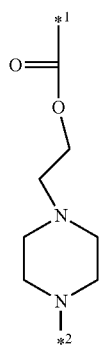
(9)

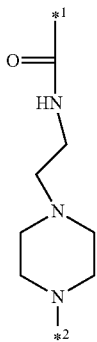
(10)

In Formulae (1) to (10), *1 represents a bonding position with respect to the carbon atom constituting the main chain in Formula (A), and *2 represents a bonding position with respect to the carbon atom constituting the carbonyl group in Formula (A).

Among the divalent linking groups represented by any of Formulae (1) to (10), from the viewpoint of enhancing the balance between the solubility in a solvent used for forming the photoalignment layer and the solvent resistance of the photoalignment layer to be obtained, a divalent linking group represented by any of Formulae (2), (3), (7), and (8) is preferable.

Next, the substituents represented by $R^2$, $R^3$, $R^4$, $R^5$, and $R^6$ in Formula (A) will be described. Further, $R^2$, $R^3$, $R^4$, $R^5$, and $R^6$ in Formula (A) may represent a hydrogen atom in place of a substituent, as described above.

From the viewpoint that the cinnamoyl group easily interacts with the liquid crystal compound and the liquid crystal aligning properties are further enhanced, it is preferable that the substituents represented by $R^2$, $R^3$, $R^4$, $R^3$, and $R^6$ in Formula (A) are each independently a halogen atom, a linear, branched, or cyclic alkyl group having 1 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, an amino group, or a group represented by Formula (11).

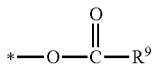
(11)

Here, in Formula (11), * represents a bonding position with respect to the benzene ring in Formula (A), and $R^9$ represents a monovalent organic group.

Examples of the halogen atom include a fluorine atom, a chlorine atom, a bromine atom, and an iodine atom. Among these, a fluorine atom and a chlorine atom are preferable.

In regard to the linear, branched, or cyclic alkyl group having 1 to 20 carbon atoms, an alkyl group having 1 to 6 carbon atoms is preferable as the linear alkyl group, and specific examples thereof include a methyl group, an ethyl group, and an n-propyl group.

An alkyl group having 3 to 6 carbon atoms is preferable as the branched alkyl group, and specific examples thereof include an isopropyl group and a tert-butyl group.

An alkyl group having 3 to 6 carbon atoms is preferable as the cyclic alkyl group, and specific examples thereof include a cyclopropyl group, a cyclopentyl group, and a cyclohexyl group.

As the linear halogenated alkyl group having 1 to 20 carbon atoms, a fluoroalkyl group having 1 to 4 carbon atoms is preferable, and specific examples thereof include a trifluoromethyl group, a perfluoromethyl group, a perfluoropropyl group, and a perfluorobutyl group. Among these, a trifluoromethyl group is preferable.

As the alkoxy group having 1 to 20 carbon atoms, an alkoxy group having 1 to 18 carbon atoms is preferable, an alkoxy group having 6 to 18 carbon atoms is more preferable, and an alkoxy group having 6 to 14 carbon atoms is still more preferable. Specific suitable examples thereof include a methoxy group, an ethoxy group, an n-butoxy group, a methoxyethoxy group, an n-hexyloxy group, an n-octyloxy group, an n-decyloxy group, an n-dodecyloxy group, and an n-tetradecyloxy group. Among these, an n-hexyloxy group, an n-octyloxy group, an n-decyloxy group, an n-dodecyloxy group, and an n-tetradecyloxy group are more preferable.

An aryl group having 6 to 20 carbon atoms is preferable as the aryl group having 6 to 12 carbon atoms, and specific examples thereof include a phenyl group, an α-methylphenyl group, and a naphthyl group. Among these, a phenyl group is preferable.

An aryloxy group having 6 to 12 carbon atoms is preferable as the aryloxy group having 6 to 20 carbon atoms, and specific examples thereof include a phenyloxy group and a 2-naphthyloxy group. Among these, a phenyloxy group is preferable.

Examples of the amino group include a primary amino group ($-NH_2$), a secondary amino group such as a methylamino group, and a tertiary amino group such as a dimethylamino group, a diethylamino group, a dibenzylamino group, or a group having a nitrogen atom of a nitrogen-containing heterocyclic compound (for example, pyrrolidine, piperidine, or piperazine) as a bonding site.

In regard to the group represented by Formula (11), examples of the monovalent organic group represented by $R^9$ in Formula (11) include a linear or cyclic alkyl group having 1 to 20 carbon atoms.

As the linear alkyl group, an alkyl group having 1 to 6 carbon atoms is preferable, and specific examples thereof include a methyl group, an ethyl group, and an n-propyl group. Among these, a methyl group or an ethyl group is preferable.

As the cyclic alkyl group, an alkyl group having 3 to 6 carbon atoms is preferable, and specific examples thereof include a cyclopropyl group, a cyclopentyl group, and a cyclohexyl group. Among these, a cyclohexyl group is preferable.

As the monovalent organic group represented by $R^9$ in Formula (11), a combination of a plurality of the linear alkyl groups and a plurality of the cyclic alkyl groups described above directly or via a single bond may be used.

In the present invention, it is preferable that at least $R^4$ among $R^2$, $R^3$, $R^4$, $R^5$, and $R^6$ in Formula (A) represents the above-described substituent from the viewpoint that the cinnamoyl group easily interacts with the liquid crystal compound and the liquid crystal aligning properties are further enhanced and more preferable that all $R^2$, $R^3$, $R^5$, and $R^6$ represent a hydrogen atom from the viewpoint that the linearity of the photoalignment copolymer to be obtained is improved, the cinnamoyl group easily interacts with the liquid crystal compound, and the liquid crystal aligning properties are further enhanced.

In the present invention, from the viewpoint of improving the reaction efficiency in a case where the photoalignment layer to be obtained is irradiated with light, it is preferable that $R^4$ in Formula (A) represents an electron-donating substituent.

Here, the electron-donating substituent (electron-donating group) is a substituent having a Hammett constant (Hammett's substituent constant σp value) of 0 or less, and among the above-described substituents, an alkyl group, a halogenated alkyl group, and an alkoxy group are exemplified.

Among these, an alkoxy group is preferable, and from the viewpoint that the liquid crystal aligning properties are further enhanced, an alkoxy group having 6 to 16 carbon atoms is more preferable, and an alkoxy group having 7 to 10 carbon atoms is still more preferable.

Next, the divalent linking group represented by $L^2$ in Formula (B) will be described.

From the viewpoint that the cinnamoyl group easily interacts with the liquid crystal compound and the liquid crystal aligning properties are further enhanced, as the divalent linking group, a divalent linking group obtained by combining at least two or more groups selected from the group consisting of a linear, branched, or cyclic alkylene group having 1 to 18 carbon atoms which may have a substituent, an arylene group having 6 to 12 carbon atoms which may have a substituent, an ether group (—O—), a carbonyl group (—C(O)—), and an imino group (—NH—) which may have a substituent is preferable.

Here, examples of the substituent that the alkylene group, the arylene group, and the imino group may have include a halogen atom, an alkyl group, an alkoxy group, an aryl group, an aryloxy group, a cyano group, a carboxy group, an alkoxycarbonyl group, and a hydroxy group.

Examples of the halogen atom include a fluorine atom, a chlorine atom, a bromine atom, and an iodine atom. Among these, a fluorine atom and a chlorine atom are preferable.

As the alkyl group, for example, a linear, branched, or cyclic alkyl group having 1 to 18 carbon atoms is preferable, an alkyl group having 1 to 8 carbon atoms (such as a methyl group, an ethyl group, a propyl group, an isopropyl group, an n-butyl group, an isobutyl group, a sec-butyl group, a t-butyl group, or a cyclohexyl group) is more preferable, an alkyl group having 1 to 4 carbon atoms is still more preferable, and a methyl group or an ethyl group is particularly preferable.

As the alkoxy group, for example, an alkoxy group having 1 to 18 carbon atoms is preferable, an alkoxy group having 1 to 8 carbon atoms (such as a methoxy group, an ethoxy group, an n-butoxy group, or a methoxyethoxy group) is more preferable, an alkoxy group having 1 to 4 carbon atoms is still more preferable, and a methoxy group or an ethoxy group is particularly preferable.

Examples of the aryl group include an aryl group having 6 to 12 carbon atoms, and specific examples thereof include a phenyl group, an α-methylphenyl group, and a naphthyl group. Among these, a phenyl group is preferable.

Examples of the aryloxy group include phenoxy, naphthoxy, imidazolyloxy, benzimidazolyloxy, pyridine-4-yloxy, pyrimidinyloxy, quinazolinyloxy, purinyloxy, and thiophene-3-yloxy.

Examples of the alkoxycarbonyl group include methoxycarbonyl and ethoxycarbonyl.

In regard to the linear, branched, or cyclic alkylene group having 1 to 18 carbon atoms, specific examples of the linear alkylene group includes a methylene group, an ethylene group, a propylene group, a butylene group, a pentylene group, a hexylene group, a decylene group, an undecylene group, a dodecylene group, a tridecylene group, a tetra-decylene group, a pentadecylene group, a hexadecylene group, a heptadecylene group, and an octadecylene group.

Further, specific examples of the branched alkylene group include a dimethylmethylene group, a methylethylene group, a 2,2-dimethylpropylene group, and a 2-ethyl-2-methylpropylene group.

Further, specific examples of the cyclic alkylene group include a cyclopropylene group, a cyclobutylene group, a cyclopentylene group, a cyclohexylene group, a cyclooctylene group, a cyclodecylene group, an adamantane-diyl group, a norbornane-diyl group, and an exo-tetrahydrodicyclopentadiene-diyl group. Among these, a cyclohexylene group is preferable.

Specific examples of the arylene group having 6 to 12 carbon atoms include a phenylene group, a xylylene group, a biphenylene group, a naphthylene group, and a 2,2'-methylenebisphenyl group. Among these, a phenylene group is preferable.

Next, the crosslinkable group represented by X in Formula (B) will be described.

Specific examples of X (crosslinkable group) in Formula (B) include an epoxy group, an epoxycyclohexyl group, an oxetanyl group, and a functional group having an ethylenically unsaturated double bond. Among these, at least one crosslinkable group selected from the group consisting of crosslinkable groups represented by Formulae (X1) to (X4) is preferable.

(X1)

(X2)

(X3)

(X4)

In Formulae (X1) to (X4), * represents a bonding position with respect to $L^2$ in Formula (B), and $R^8$ represents any of a hydrogen atom, a methyl group, or an ethyl group, in Formula (X4), S represents a functional group having an ethylenically unsaturated double bond.

Here, specific examples of the functional group having an ethylenically unsaturated double bond include a vinyl group, an allyl group, a styryl group, acryloyl group, and a methacryloyl group. Among these, an acryloyl group or a methacryloyl group is preferable.

In the present invention, from the viewpoint of increasing the strength of the optical laminate to be obtained and enhancing the handleability in a case of forming other layers using the optical laminate to be obtained, it is preferable that the repeating unit B includes a repeating unit in which X in Formula (B) represents a crosslinkable group represented by any one of Formulae (X1) to (X3) (hereinafter, also referred to as a "repeating unit B1") and a repeating unit in which X in Formula (B) represents a crosslinkable group represented by Formula (X4) (hereinafter, also referred to as a "repeating unit B2").

Specific examples of the repeating unit A containing a cinnamoyl group represented by Formula (A) include the following repeating units A-1 to A-44. In the following formulae, Me represents a methyl group, and Et represents an ethyl group. In the following specific examples, the "1,4-cyclohexyl group" contained in the divalent linking group of each of the repeating units A-1 to A-10 may be any of a cis form or a transformer form and is preferably a transformer form.

A-1
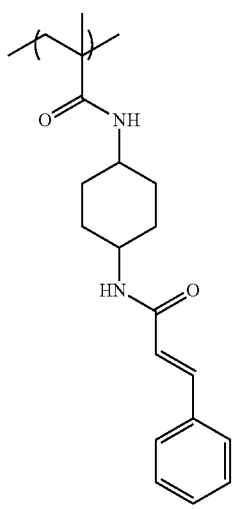

A-2
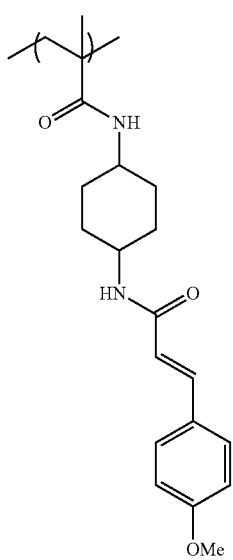

-continued

A-3
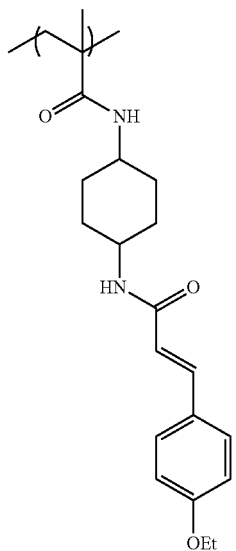

A-4
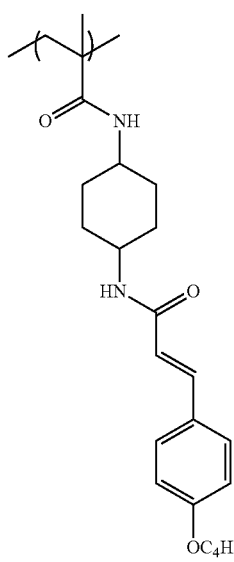

A-5
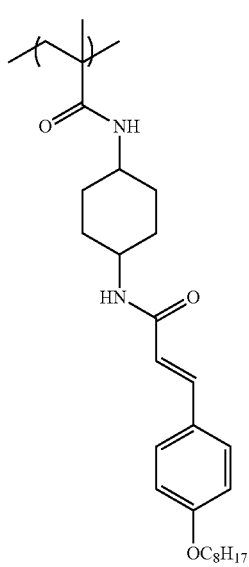

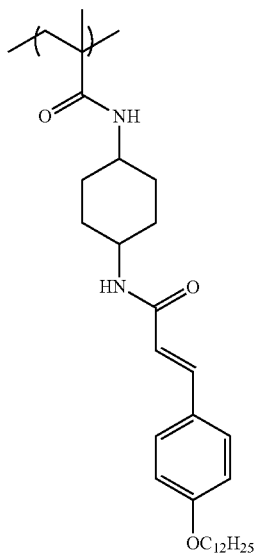
A-6
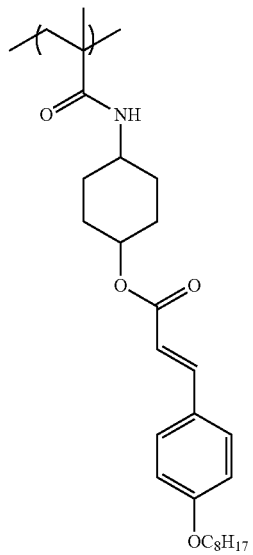
A-9
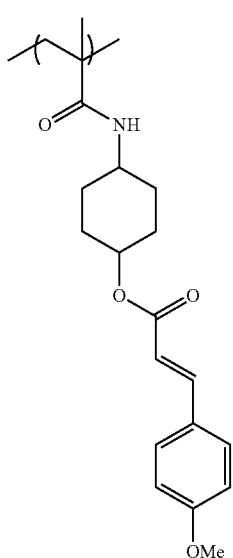
A-7
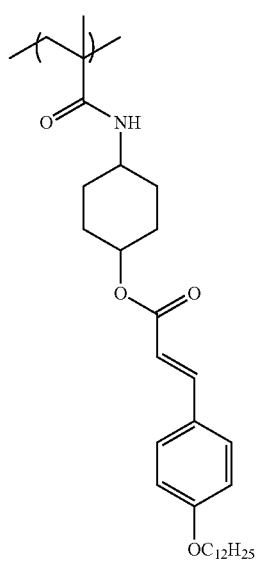
A-10
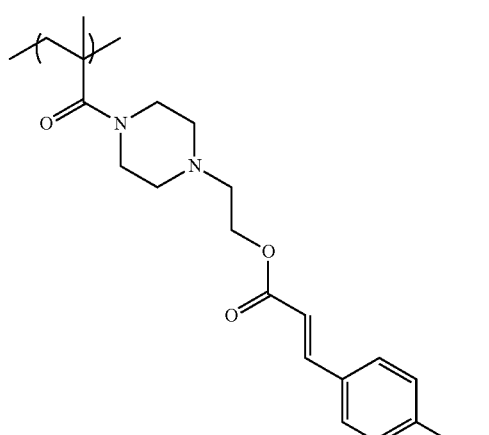
A-8
A-11

A-12
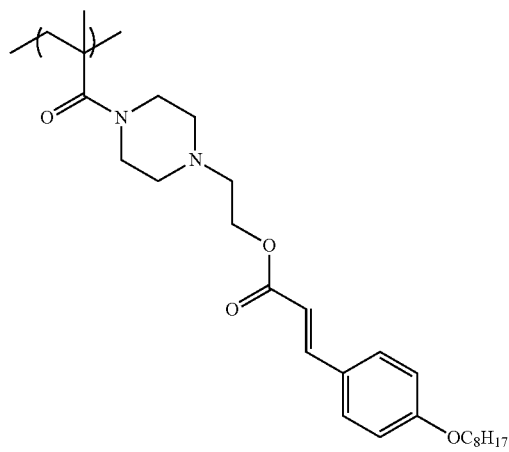
A-13
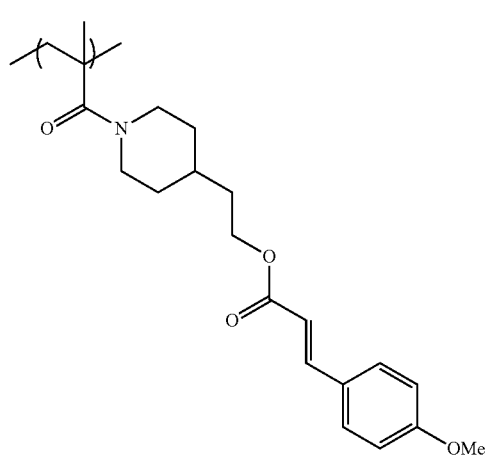
A-14
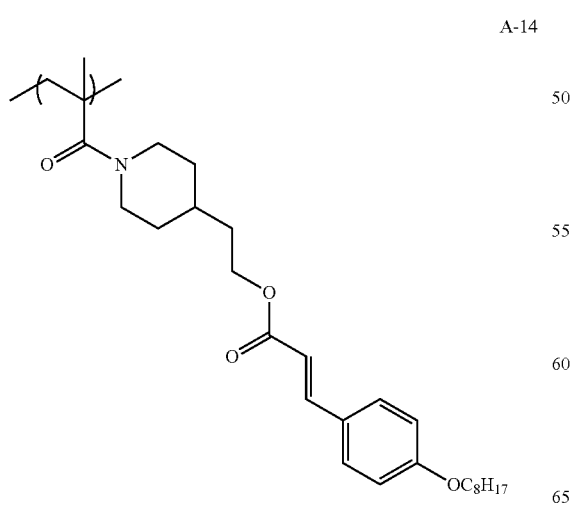
A-15
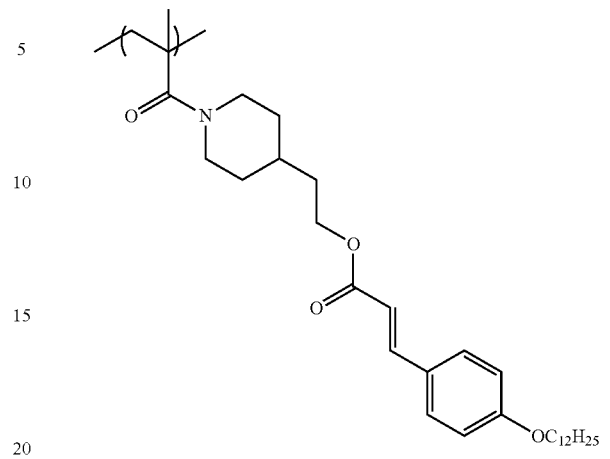
A-16
A-17
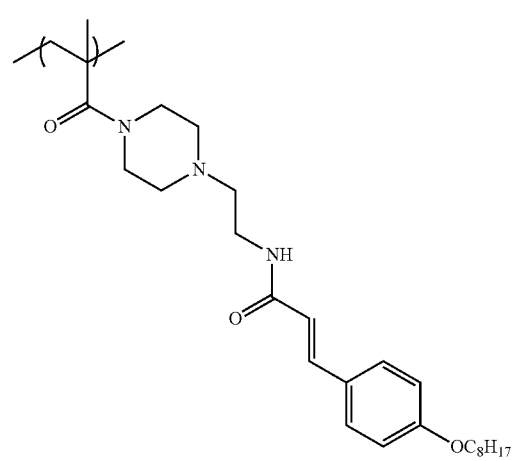

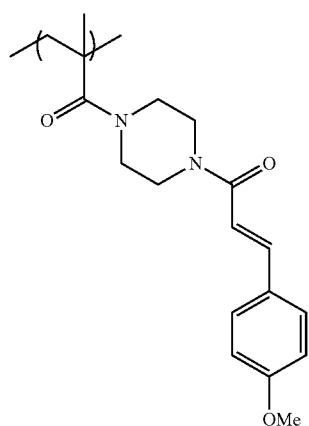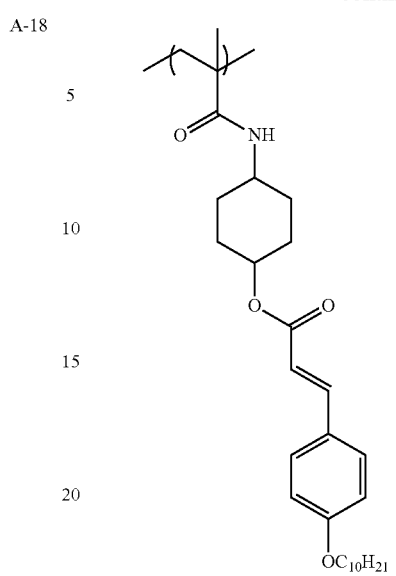

A-24
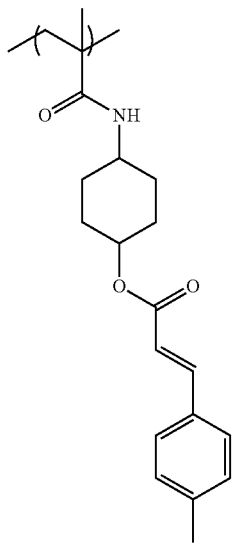
A-25
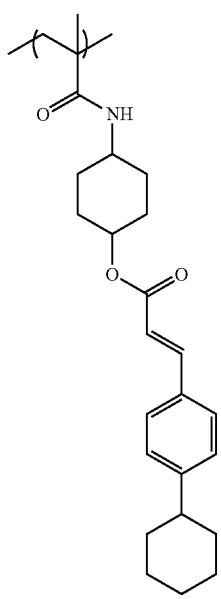
A-26
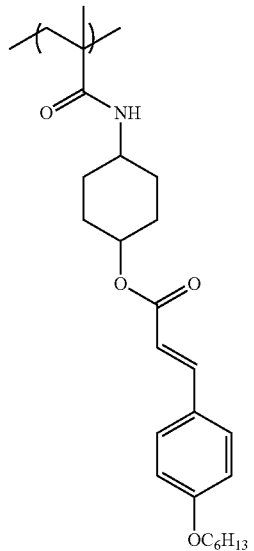
A-27
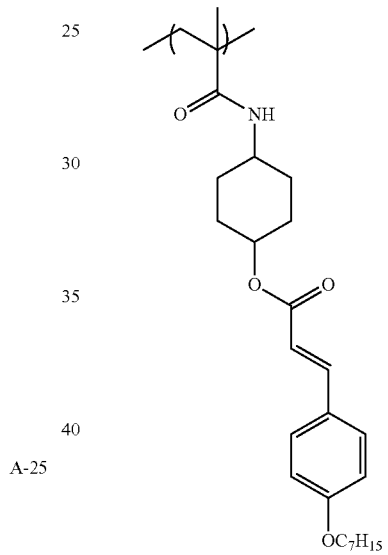
A-28
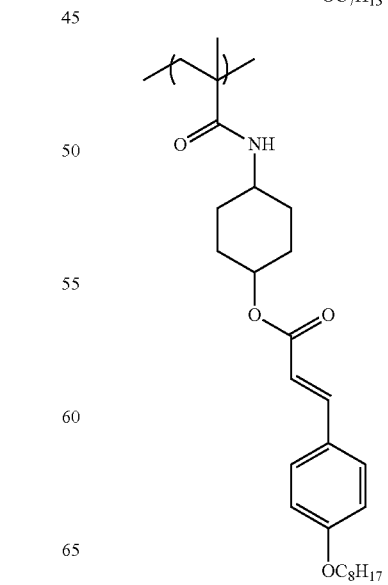

A-29
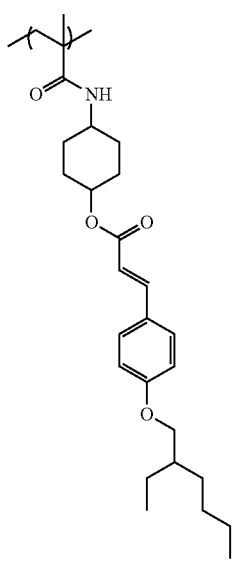
A-30
A-31
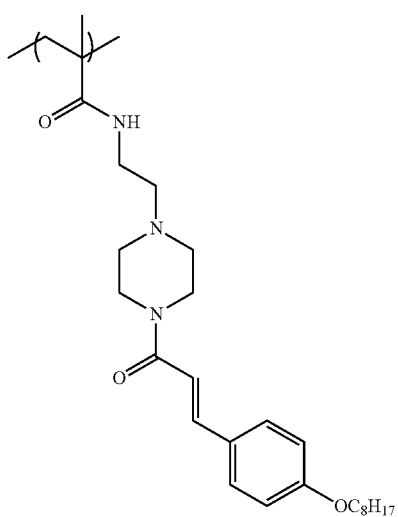
A-32
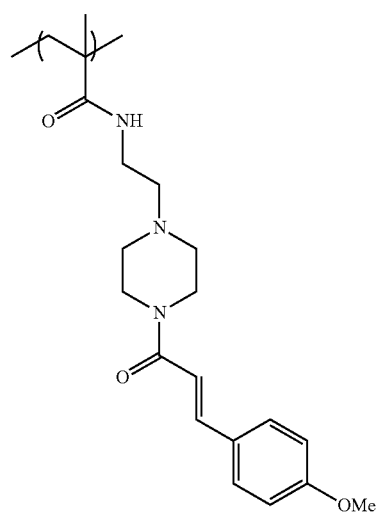
A-33
A-34
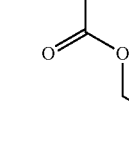

A-35
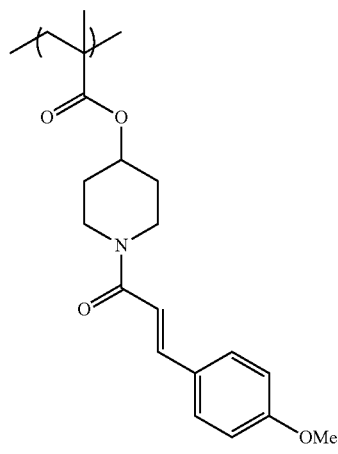
A-36
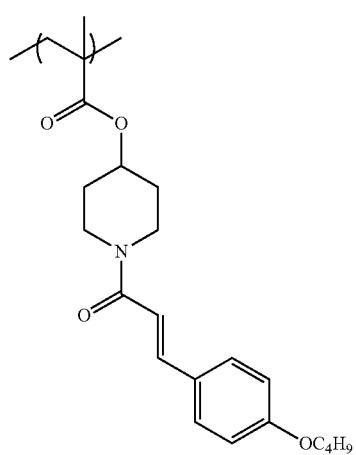
A-37
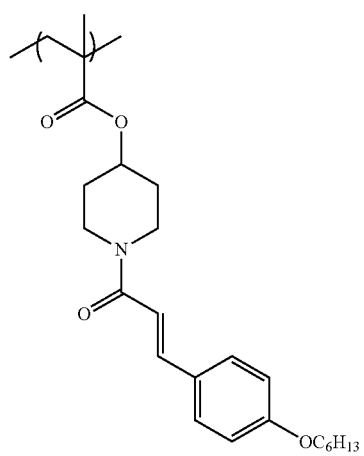
A-38
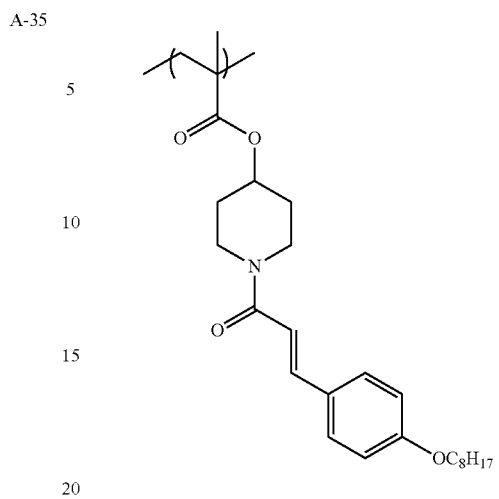
A-39
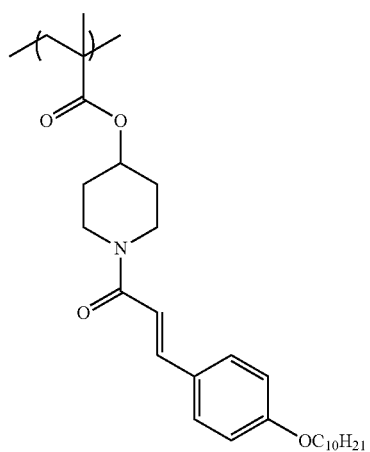
A-40
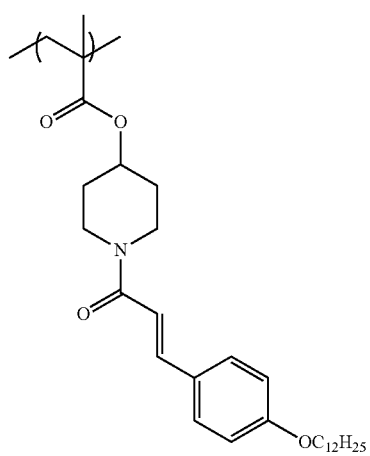

A-41
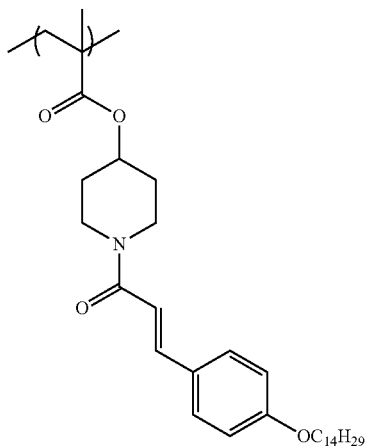
A-42
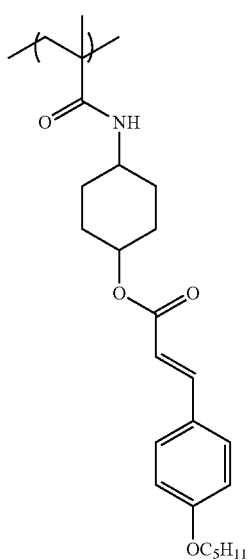
A-43
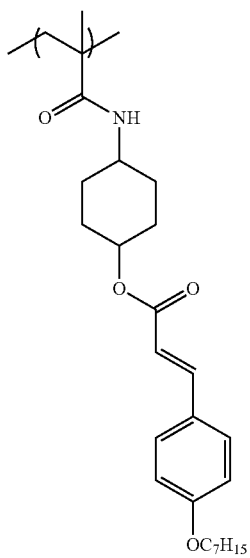
A-44
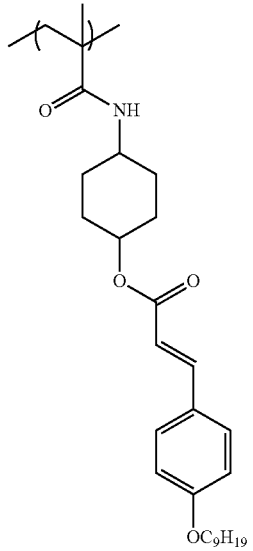
Specific examples of the repeating unit B (repeating unit B1) containing a crosslinkable group represented by Formula (B) include repeating units B-1 to B-17 shown below.
B-1
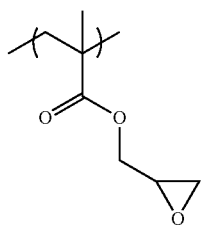
B-2
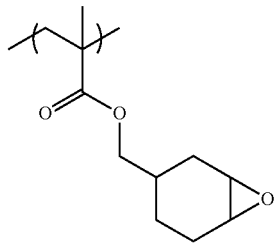
B-3
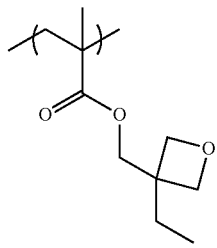

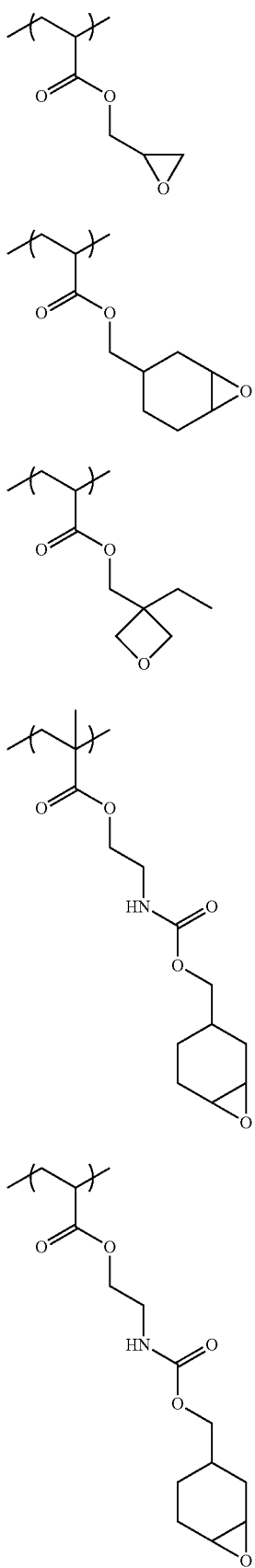
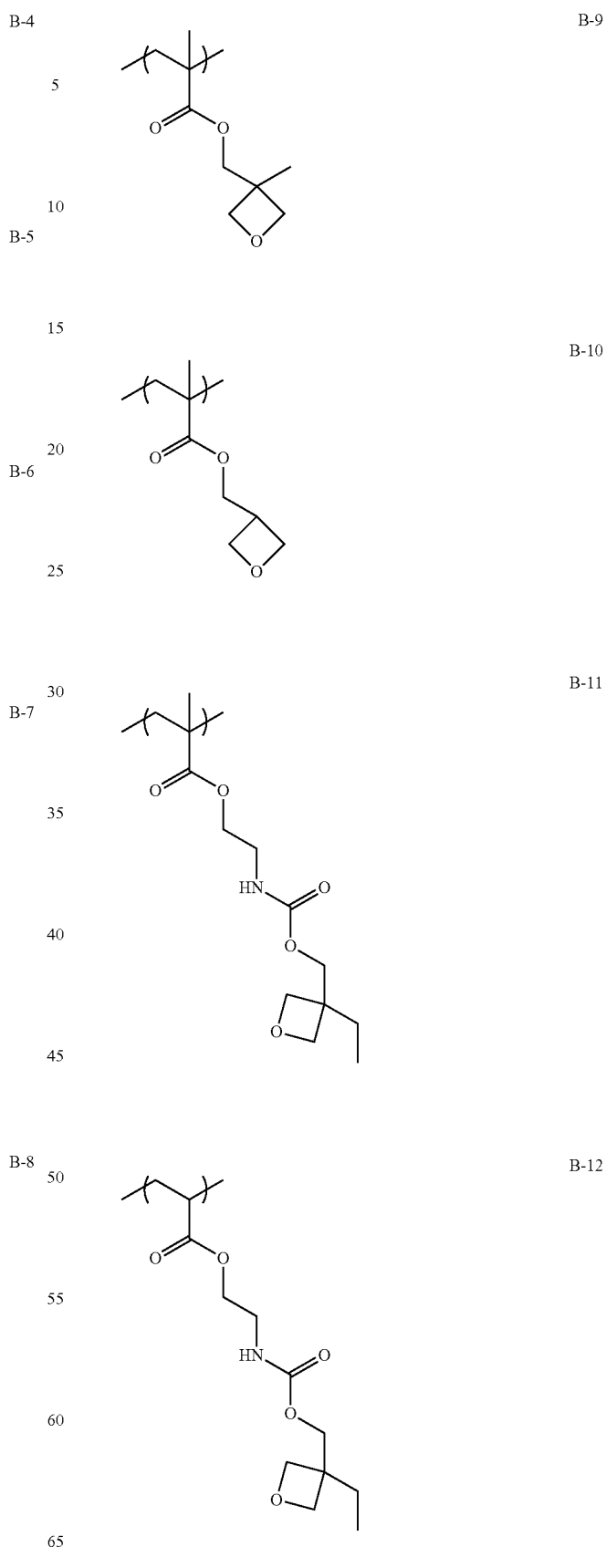

B-13
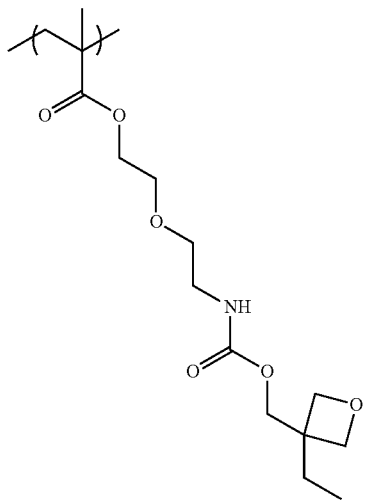
B-14
B-16
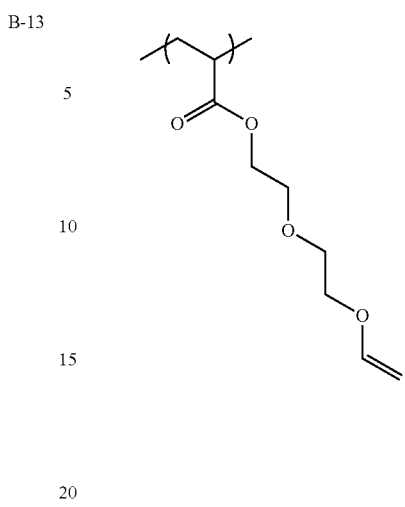
B-17
Further, specific examples of the repeating unit B (repeating unit B2) containing a crosslinkable group represented by Formula (B) include repeating units B-18 to B-47 shown below.
B-15
B-18

B-19
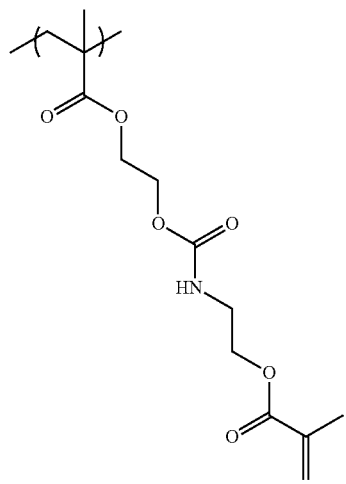
B-20
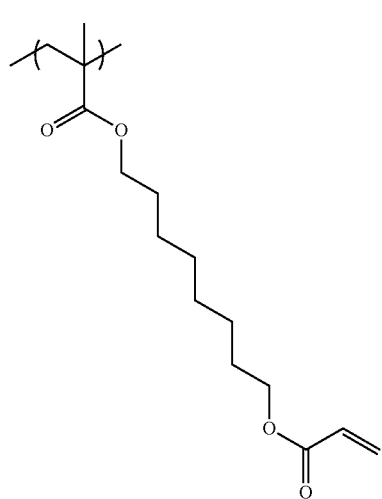
B-21
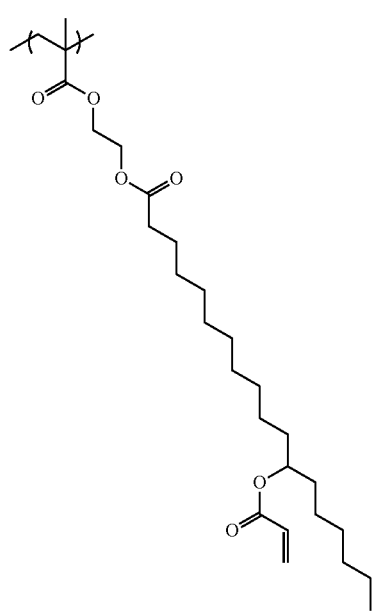
B-22
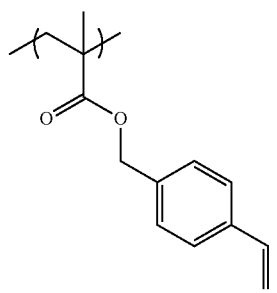
B-23
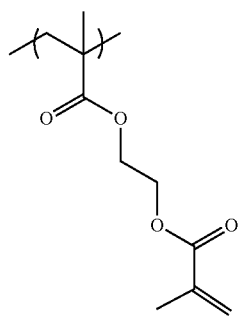
B-24
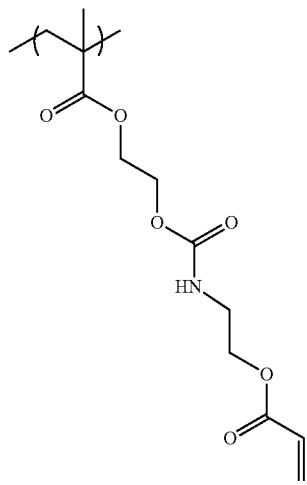

B-25

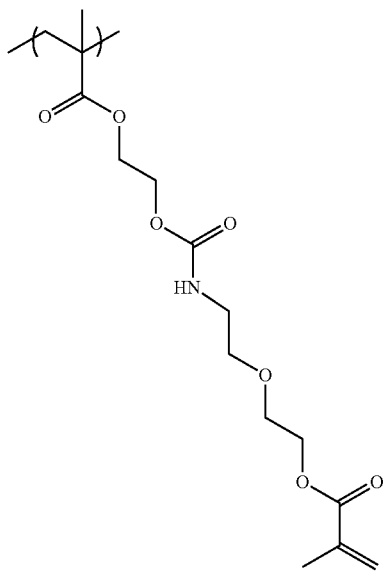

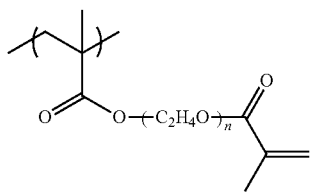
B-26: n = 2
B-27: n = 4.5
B-28: n = 8

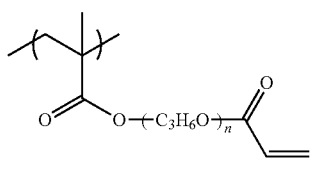
B-29: n = 2
B-30: n = 4.5
B-31: n = 8

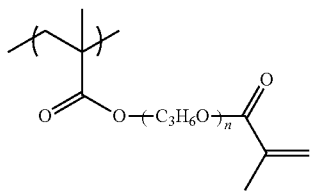
B-32: n = 4~6
B-33: n = 4.5
B-34: n = 8

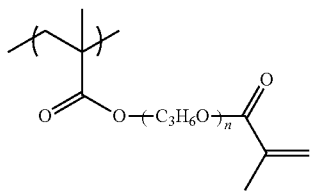
B-35: n = 4~6
B-36: n = 4.5
B-37: n = 8

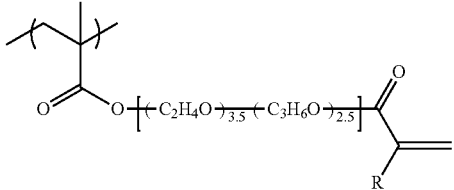
B-38: R = H
B-39: R = CH₃

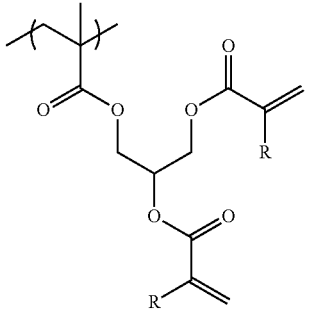
B-40: R = H
B-41: R = CH₃

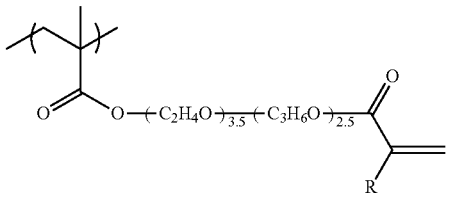
B-42: R = H
B-43: R = CH₃

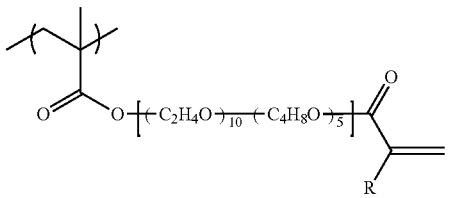
B-44: R = H
B-45: R = CH₃

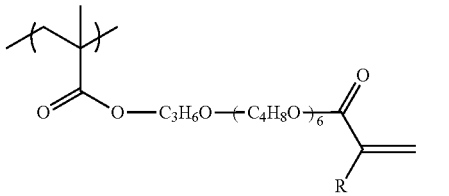
B-46: R = H
B-47: R = CH₃

In the photoalignment copolymer, a content a of the repeating unit A described above and a content b of the repeating unit B described above satisfy preferably Expression (12), more preferably Expression (13), still more preferably Expression (14), and particularly preferably Expression (15) in terms of the mass ratio.

$$0.03 \leq a/(a+b) \leq 0.5 \quad (12)$$

$$0.03 \leq a/(a+b) \leq 0.3 \quad (13)$$

$$0.03 \leq a/(a+b) \leq 0.2 \quad (14)$$

$$0.05 \leq a/(a+b) \leq 0.2 \quad (15)$$

Further, in a case where the photoalignment copolymer has the repeating unit B1 described above and the repeating unit B2 described above, from the viewpoint of further increasing the strength of the optically anisotropic layer including the photoalignment layer while maintaining satisfactory liquid crystal aligning properties and adhesiveness, the content a of the repeating unit A described above, a content b1 of the repeating unit B1 described above, and a content b2 of the repeating unit B2 described above satisfy preferably Expression (16), more preferably Expression (17), and still more preferably Expression (18) in terms of the mass ratio.

$$0.05 \leq b2/(a+b1+b2) \leq 0.7 \quad (16)$$

$$0.10 \leq b2/(a+b1+b2) \leq 0.5 \quad (17)$$

$$0.12 \leq b2/(a+b1+b2) \leq 0.35 \quad (18)$$

The photoalignment copolymer may have repeating units other than the repeating unit A and the repeating unit B described above as long as the effects of the present invention are not impaired.

Examples of the monomer (radical polymerizable monomer) forming such repeating units include an acrylic acid ester compound, a methacrylic acid ester compound, a maleimide compound, an acrylamide compound, acrylonitrile, a maleic acid anhydride, a styrene compound, and a vinyl compound.

A method of synthesizing the photoalignment copolymer is not particularly limited, and for example, the photoalignment copolymer can be synthesized by mixing a monomer forming the repeating unit A described above, a monomer forming the repeating unit B described above, and monomer forming any other repeating units and polymerizing the mixture in an organic solvent using a radical polymerization initiator.

From the viewpoint of further improving the liquid crystal aligning properties, the weight-average molecular weight (Mw) of the photoalignment copolymer is preferably in a range of 10000 to 500000 and more preferably in a range of 30000 to 300000.

In a case where the photoalignment copolymer is used, the content of the photoalignment copolymer in the composition for forming a photoalignment layer is not particularly limited, but in a case where the composition contains an organic solvent, the content thereof is preferably in a range of 0.1 to 50 parts by mass and more preferably in a range of 0.5 to 10 parts by mass with respect to 100 parts by mass of the organic solvent.

(Additive)

The composition for forming a photoalignment layer may contain one or more additives other than the photoactive compound. For example, the additive is added for the purpose of adjusting the refractive index of the composition for forming a photoalignment layer. As the additive, a compound containing a hydrophilic group and a (meth)acryloyloxy group is preferable from the viewpoint of the compatibility with the photoactive compound, and the additive can be added to the extent that the alignment ability is not significantly reduced. Examples of the hydrophilic group include a hydroxy group, a carboxy group, a sulfo group, and an amino group.

(Organic Solvent)

From the viewpoint of the workability for preparing a photoalignment layer, it is preferable that the composition for forming a photoalignment layer contains an organic solvent.

Specific examples of the organic solvent include ketones (such as acetone, 2-butanone, methyl isobutyl ketone, cyclohexanone, and cyclopentanone), ethers (such as dioxane and tetrahydrofuran), aliphatic hydrocarbons (such as hexane), alicyclic hydrocarbons (such as cyclohexane), aromatic hydrocarbons (such as toluene, xylene, and trimethylbenzene), carbon halides (such as dichloromethane, dichloroethane, dichlorobenzene, and chlorotoluene), esters (such as methyl acetate, ethyl acetate, and butyl acetate), water, alcohols (such as ethanol, isopropanol, butanol, and cyclohexanol), cellosolves (such as methylcellosolve and ethyl cellosolve), cellosolve acetates, sulfoxides (such as dimethylsulfoxide), and amides (such as dimethylformamide and dimethylacetamide), and such solvents may be used alone or in combination of two or more kinds thereof.

The composition for forming a photoalignment layer may contain components other than the above-described components, and examples thereof include a crosslinking catalyst (such as a thermally reactive acid generator), an adhesion improver, a leveling agent, a surfactant, and a plasticizer.

In a case where the additive is used for the purpose of adjusting the refractive index of the composition for forming a photoalignment layer, the refractive index of the additive is preferably in a range of 1.4 to 1.6 and more preferably in a range of 1.4 to 1.55.

In the present invention, from the viewpoint of enhancing the adhesiveness between the photoalignment layer and the light absorption anisotropic layer, it is preferable that the composition for forming a photoalignment layer is a composition containing a compound (such as the photoalignment copolymer described above) that contains a photoreactive group and a crosslinkable group and containing no radical polymerization initiator.

(Coating Method)

As a method of coating the above-described polymer film with the composition for forming a photoalignment layer, known methods, for example, a coating method such as a spin coating method, an extrusion method, a gravure coating method, a die coating method, a bar coating method, or an applicator method and a printing method such as a flexographic method are employed.

In a case where the optical laminate is produced by a Roll-to-Roll type continuous production method, a printing method such as a gravure coating method, a die coating method, or a flexographic method is typically employed as the coating method.

(Drying Step)

A method of heating the coating film formed by the coating step so that the coating film is dried is not particularly limited, and the drying temperature is preferably in a range of 50° C. to 180° C. and more preferably in a range of 80° C. to 150° C.

The drying time is preferably in a range of 10 seconds to 10 minutes and more preferably in a range of 30 seconds to 5 minutes.

In a case where the composition for forming a photoalignment layer contains a compound containing a crosslinking catalyst such as a thermally reactive acid generator and a cationically polymerizable crosslinkable group, it is preferable that curing of the coating film is promoted by the crosslinking reaction by being heated in this step.

(Light Irradiation Step)

The polarized light to be applied to the coating film after the drying step is not particularly limited, and examples thereof include linearly polarized light, circularly polarized light, and elliptically polarized light. Among these, linearly polarized light is preferable.

Further, the "diagonal direction" in which non-polarized light is applied is not particularly limited as long as the direction is inclined at a polar angle θ (0<θ<90°) with respect to the normal direction of the surface of the coating film, and the polar angle θ can be appropriately selected depending on the purpose thereof, but is preferably in a range of 20° to 80°.

In the present specification, the "irradiation with linearly polarized light" and the "irradiation with non-polarized light" are operations for causing a photoreaction in the photoactive compound. The wavelength of the light to be used varies depending on the photoactive compound to be used and is not particularly limited as long as the wavelength is required for the photoreaction. The peak wavelength of light to be used for irradiation with light is preferably in a range of 200 nm to 700 nm, and ultraviolet light having a peak wavelength of 400 nm or less is more preferable.

Examples of the light source used for irradiation with light include commonly used light sources, for example, lamps such as a tungsten lamp, a halogen lamp, a xenon lamp, a xenon flash lamp, a mercury lamp, a mercury xenon lamp, or a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic coloring agent polarizing plate, or a wire grid polarizing plate), a method of using a prism-based element (for example, a Glan-Thompson prism) or a reflective polarizes for which a Brewster's angle is used, or a method of using light emitted from a laser light source having polarized light can be employed. In addition, only light having a required wavelength may be selectively applied using a filter or a wavelength conversion element.

In a case where light to be applied is linearly polarized light, a method of applying light vertically or obliquely to the upper surface with respect to the alignment layer or the surface of the alignment layer from the rear surface is employed. The incidence angle of light varies depending on the photoactive compound, but is preferably in a range of 0° to 90° (vertical) and more preferably in a range of 40° to 90°.

In a case where light to be applied is non-polarized light, the alignment layer is irradiated with non-polarized light obliquely. The incidence angle thereof is preferably in a range of 10° to 80°, more preferably in a range of 20° to 60°, and still more preferably in a range of 30° to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

<Rubbing Treatment Alignment Layer>

A rubbing treatment alignment layer is a layer to which an alignment regulation force is applied by a rubbing treatment.

A polymer material used for the rubbing treatment alignment layer is described in a plurality of documents, and a plurality of commercially available products can be used. In the present invention, polyvinyl alcohol or polyimide and derivatives thereof are preferably used. As the alignment layer, the description on page 43, line 24 to page 49, line 8 of WO2001/88574A1 can be referred to.

[Second Pressure Sensitive Adhesive Layer]

The laminate according to the embodiment of the present invention includes a second pressure sensitive adhesive layer.

The second pressure sensitive adhesive layer is disposed on the side of the light absorption anisotropic layer opposite to the side of the first pressure sensitive adhesive layer.

Further, in a case where two or more pressure sensitive adhesive layers are provided between the light absorption anisotropic layer described above and the optically anisotropic layer described below, the second pressure sensitive adhesive layer denotes the pressure sensitive adhesive layer closest to the light absorption anisotropic layer among the two or more pressure sensitive adhesive layers.

Specific examples of the materials constituting the pressure sensitive adhesive layer are as described above, and thus the description thereof will not be repeated.

The thickness of the second pressure sensitive adhesive layer is not particularly limited, but is preferably in a range of 1 to 50 µm, more preferably in a range of 5 to 30 µm, and still more preferably in a range of 5 to 15 µm from the viewpoint that the effects of the present invention are more excellent.

From the viewpoint that the effects of the present invention are more excellent, the storage elastic modulus of the second pressure sensitive adhesive layer is preferably 0.5 MPa or greater and more preferably 1 MPa or greater.

The storage elastic modulus of the second pressure sensitive adhesive layer is not particularly limited, but is preferably 10 MPa or less and more preferably 5 MPa or less.

In the present invention, the storage elastic modulus of the second pressure sensitive adhesive layer denotes a value measured under the conditions of a frequency of 1 Hz and a temperature of 25° C. using a dynamic viscoelasticity measuring device (DVA-200, manufactured by IT Measurement Control Co., Ltd.).

In the laminate according to the embodiment of the present invention, from the viewpoint that the effects of the present invention are more excellent, the thickness of the layer disposed between the first pressure sensitive adhesive layer and the second pressure sensitive adhesive layer is preferably 10 µm or less, more preferably 8 µm or less, and still more preferably 5 µm or less. The lower limit of the thickness of the layer disposed between the first pressure sensitive adhesive layer and the second pressure sensitive adhesive layer is the same as the thickness of the light absorption anisotropic layer.

[Optically Anisotropic Layer]

It is preferable that the laminate according to the embodiment of the present invention includes an optically anisotropic layer containing a liquid crystal compound.

It is preferable that the optically anisotropic layer is disposed on the side of the second pressure sensitive adhesive layer opposite to the side of the light absorption anisotropic layer.

The optically anisotropic layer is not particularly limited as long as the layer has optical anisotropy, but from the viewpoint that the effects of the present invention are more excellent, a retardation layer is preferable, and a λ/4 plate is more preferable.

Here, the "λ/4 plate" is a plate having a λ/4 function, specifically, a plate having a function of converting linearly polarized light having a specific wavelength into circularly polarized light (or converting circularly polarized light into linearly polarized light).

Specific examples of the λ/4 plate include those described in US2015/0277006A.

For example, specific examples of a form in which the λ/4 plate has a single-layer structure include a stretched polymer film and a phase difference film in which an optically anisotropic layer having a λ/4 function is provided on a support. Further, specific examples of a form in which the λ/4 plate has a multilayer structure include a broadband λ/4 plate obtained by laminating a λ/4 plate and a λ/2 plate.

From the viewpoint that the effects of the present invention are more excellent, it is preferable that the λ/4 plate is formed by being coated with a liquid crystal composition containing a liquid crystal compound.

It is more preferable that the phase difference film provided with the optically anisotropic layer having a λ/4 function is a phase difference film formed of one or more layers containing at least one liquid crystal compound (such as a disk-like liquid crystal compound or a rod-like liquid crystal compound) formed by polymerizing a liquid crystal monomer exhibiting a nematic liquid crystal layer or a smectic liquid crystal layer.

Further, it is still more preferable to use a liquid crystal compound having reciprocal wavelength dispersibility as the λ/4 plate having excellent optical performance. Specifically, the liquid crystal compound represented by Formula (II) described in WO2017/043438A is preferably used. In regard to a method of preparing the λ/4 plate formed of a liquid crystal compound having reciprocal wavelength dispersibility, the description of Examples 1 to 10 of WO20171043438A and Example 1 of JP2016-91022A can be referred to.

The thickness of the optically anisotropic layer (particularly, the λ/4 plate) is not particularly limited, but is preferably in a range of 0.1 to 100 μm and more preferably in a range of 0.5 to 5 μm from the viewpoint that the effects of the present invention are more excellent.

[Cured Layer]

The laminate according to the embodiment of the present invention may include a cured layer having a thickness of 100 nm or less for the purpose of reducing a difference in refractive index between the light absorption anisotropic layer and the layer adjacent thereto. It is preferable that the laminate include the cured layer on the side of the light absorption anisotropic layer opposite to the side of the alignment layer (particularly, the photoalignment layer).

Further, in a case where the cured layer is disposed on the side of the first pressure sensitive adhesive layer opposite to the side of the light absorption anisotropic layer, the cured layer corresponds to the surface protective layer.

Such a cured layer is not particularly limited, and various known layers can be used. Examples of such a cured layer include a layer containing a liquid crystal compound and a layer obtained by curing a composition containing a polyfunctional monomer. It is preferable that the cured layer has a refractive index that enables index matching with the optically anisotropic layer (particularly, the light absorption anisotropic layer).

[Oxygen Blocking Layer]

The laminate according to the embodiment of the present invention may include an oxygen blocking layer for the purpose of improving light resistance. It is preferable that the laminate includes the oxygen blocking layer on any one or both on the side of the alignment layer (particularly, the photoalignment layer) opposite to the side of the light absorption anisotropic layer and on the side of the light absorption anisotropic layer opposite to the alignment layer (particularly, the photoalignment layer). In the following description, the oxygen blocking layer provided on the side of the alignment layer (particularly, the photoalignment layer) opposite to the side of the light absorption anisotropic layer is also referred to as "oxygen blocking layer 1" and the oxygen blocking layer provided on the side of the light absorption anisotropic layer opposite to the side of the alignment layer (particularly, the photoalignment layer) is also referred to as "oxygen blocking layer 2".

Further, in a case where the oxygen blocking layer is disposed on the side of the first pressure sensitive adhesive layer opposite to the side of the light absorption anisotropic layer, the oxygen blocking layer corresponds to the surface protective layer.

The "oxygen blocking layer" is an oxygen blocking film with an oxygen blocking function, and specific examples thereof include layers containing organic compounds such as polyvinyl alcohol, polyethylene vinyl alcohol, polyvinyl ether, polyvinylpyrrolidone, polyacrylamide, polyacrylic acid, cellulose ether, polyamide, polyimide, a styrene/maleic acid copolymer, gelatin, vinylidene chloride, and cellulose nanofibers.

In the present specification, the oxygen blocking function is not limited to a function for making a state where oxygen is not allowed to pass at all, and also includes a function for making a state where a small amount of oxygen is allowed to pass depending on the desired performance.

In a case where an oxygen blocking layer is provided on a transparent polymer film and a photoalignment layer containing an azobenzene compound represented by Formula (I) is provided on the oxygen blocking layer, from the viewpoint of enhancing the aligning properties, it is preferable that polyvinyl alcohol having a saponification degree of 95 mol % or greater or modified polyvinyl alcohol having a saponification degree of 95 mol % or greater is used as the oxygen blocking layer.

Further, examples of the oxygen blocking layer also include a thin layer consisting of a metal compound (metal compound thin layer). As a method of forming the metal compound thin layer, any method can be used as long as a desired thin layer can be formed. Suitable examples thereof include a sputtering method, a vacuum deposition method, an ion plating method, and a plasma chemical vapor deposition (CVD) method. Specifically, the forming methods described in JP3400324B, JP2002-322561A, and JP2002-361774A can be employed.

The component contained in the metal compound thin layer is not particularly limited as long as the component can exhibit an oxygen blocking function, and an oxide, a nitride, an oxynitride, or the like containing one or more metals selected from Si, Al, In, Sn, Zn, Ti, Cu, Ce, Ta and the like can be used. Among these, an oxide, a nitride, or an oxynitride of a metal selected from Si, Al, In, Sn, Zn, and Ti is preferable, and an oxide, a nitride, or an oxynitride of a metal selected from Si, Al, Sn, and Ti is particularly preferable. These may contain other elements as secondary components.

Further, the oxygen blocking layer may be in the form of lamination of the layer containing an organic material and the metal compound thin layer as described in, for example, U.S. Pat. No. 6,413,645B, JP2015-226995A, JP2013-202971A, JP2003-335880A, JP1978-12953A (JP-S53-12953A), and JP1983-217344A (JP-S58-217344A) and may be a layer obtained by hybridizing an organic compound and an inorganic compound as described in WO2011/11836A, JP2013-248832A, and JP3855004B.

The oxygen blocking layer may also serve as an alignment layer of an optically anisotropic layer having a λ/4 function. In such a case, an oxygen blocking layer containing polyvinyl alcohol, polyamide, or polyimide is preferable.

In a case of the layer containing an organic compound, from the viewpoint that the effects of the present invention are more excellent, the thickness of the oxygen blocking layer is preferably in a range of 0.1 to 10 μm and more preferably in a range of 0.5 to 5.5 μm. In a case of the metal compound thin layer, the thickness of the oxygen blocking layer is preferably in a range of 5 nm to 500 nm and more preferably in a range of 10 nm to 200 nm from the viewpoint that the effects of the present invention are more excellent.

[Ultraviolet (UV) Absorbing Layer]

It is preferable that the laminate according to the embodiment of the present invention includes a functional layer (UV absorbing layer) having a function of reducing short wave light on the side of the surface protective layer with respect to the light absorption anisotropic layer. By reducing short wave light, a laminate that suppresses photodecomposition of the dichroic substance and has excellent light resistance can be provided.

Further, in a case where the oxygen blocking layer is disposed on the side of the first pressure sensitive adhesive layer opposite to the side of the light absorption anisotropic layer, the oxygen blocking layer corresponds to the surface protective layer.

As one embodiment, it is preferable that the above-described pressure sensitive adhesive layer or oxygen blocking layer has a function of reducing short wave light.

As another aspect, it is also preferable that a layer having a function of reducing short wave light is newly provided on the viewing side with respect to the light absorption anisotropic layer.

A method of reducing short wave light is not particularly limited, and examples thereof include a method of applying light absorption using an absorbing agent or the like and a method of applying wavelength selective reflection using a multilayer film.

The above-described short wave light is light having a wavelength of 430 nm or less. By reducing the light having a wavelength of 430 nm or less, photodecomposition of a coloring agent compound due to sunlight or light from a light source used in the light resistance test of JIS B 7751 and JIS B 7754 can be suppressed.

Further, it is preferable that the UV absorbing layer is transparent in a wavelength range of 450 nm or greater so that the performance of the light absorption anisotropic layer in visible light is not affected.

From the viewpoint that the effects of the present invention are more excellent, it is preferable that the UV absorbing layer is a UV absorbing layer that has an absorbance of 0.5 or greater at a wavelength of 360 nm and a wavelength of 400 nm.

[Display Device]

A display device according to the embodiment of the present invention includes the above-described laminate according to the embodiment of the present invention. It is preferable that the display device is an image display device capable of displaying an image of characters, figures, or the like.

The display element used in the display device according to the embodiment of the present invention is not particularly limited, and examples thereof include a liquid crystal cell, an organic electroluminescence display panel, and a plasma display panel.

Among these, a liquid crystal cell or an organic EL display panel is preferable, and an organic EL display panel is more preferable. That is, in the display device according to the embodiment of the present invention, a liquid crystal display device obtained by using a liquid crystal cell as a display element or an organic EL display device obtained by using an organic EL display panel as a display element is preferable, and an organic EL display device is more preferable.

[Liquid Crystal Display Device]

A liquid crystal display device which is an example of the display device according to the embodiment of the present invention is a liquid crystal display device that includes the above-described optical laminate according to the embodiment of the present invention (but does not include a λ/4 plate) and a liquid crystal cell.

In the present invention, between the optical laminates provided on both sides of the liquid crystal cell, it is preferable that the laminate according to the embodiment of the present invention is used as a front-side (viewing side) polarizer and more preferable that the laminate according to the embodiment of the present invention is used as a front-side polarizer and a rear-side polarizer.

Hereinafter, the liquid crystal cell constituting the liquid crystal display device will be described in detail.

<Liquid Crystal Cell>

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules (rod-like liquid crystal compound) are substantially horizontally aligned in a case of no voltage application and further twistedly aligned at 60° to 120°. The liquid crystal cell in a TN mode is most frequently used as a color TFT liquid crystal display device and is described in a plurality of documents.

In the liquid crystal cell in a VA mode, rod-like liquid crystal molecules are substantially vertically aligned at the time of no voltage application. The concept of the liquid crystal cell in a VA mode includes (1) liquid crystal cell in a VA mode in a narrow sense where rod-like liquid crystal molecules are aligned substantially vertically in a case of no voltage application and substantially horizontally in a case of voltage application (described in JP1990-176625A (JP-H02-176625A)), (2) liquid crystal cell (in a multi-domain vertical alignment (MVA) mode) (SID97, described in Digest of tech. Papers (proceedings) 28 (1997) 845) in which the VA mode is formed to have multi-domain in order to expand the viewing angle, (3) liquid crystal cell in an axially symmetric aligned microcell (n-ASM) mode in which rod-like liquid crystal molecules are substantially vertically aligned in a case of no voltage application and twistedly multi-domain aligned in a case of voltage application (described in proceedings of Japanese Liquid Crystal Conference, pp. 58 to 59 (1998)), and (4) liquid crystal cell in a SURVIVAL mode (presented at LCD International 98). Further, the liquid crystal cell may be of any of a patterned vertical alignment (PVA) type, a photoalignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

[Organic EL Display Device]

As an organic EL display device which is an example of the display device according to the embodiment of the present invention, an embodiment of a display device including the above-described laminate (here, including a λ/4 plate) according to the embodiment of the present invention and an organic EL display panel in order from the viewing side is suitably exemplified.

Further, the organic EL display panel is a display panel formed using an organic EL element having an organic light emitting layer (organic electroluminescence layer) interposed between electrodes (between a cathode and an anode). The configuration of the organic EL display panel is not particularly limited, and a known configuration is employed.

EXAMPLES

Hereinafter, the present invention will be described in more detail with reference to examples. Materials, used amounts, ratios, treatment contents, treatment procedures, and the like described in the following examples can be appropriately changed without departing from the spirit of the present invention. Therefore, the scope of the present invention should not be limitatively interpreted by the following examples.

In the description below, Preparation Examples 1 and 3 are comparative example, and Preparation Examples 2 and 4 to 22 are examples.

Preparation Example 1

A low-reflection surface film CV-LC5 (using triacetyl cellulose as a support, manufactured by FUJIFILM Corporation) was prepared as a surface protective layer H1.

[Preparation of Laminate 1B]

As described below, a laminate 1B in which a cellulose acylate film 1, a photoalignment layer PA1, and a light absorption anisotropic layer P1 were formed in this order was prepared.

<Preparation of Cellulose Acylate Film 1>
<Preparation of Core Layer Cellulose Acylate Dope>

The following composition was put into a mixing tank and stirred to dissolve each component, thereby preparing a cellulose acetate solution used as a core layer cellulose acylate dope.

Core Layer Cellulose Acylate Dope

Cellulose acetate having acetyl substitution degree of 2.88: 100 parts by mass

Polyester compound B described in example of JP2015-2279558: 12 parts by
Compound F shown below: 2 parts by mass
Methylene chloride (first solvent): 430 parts by mass
Methanol (second solvent): 64 parts by mass

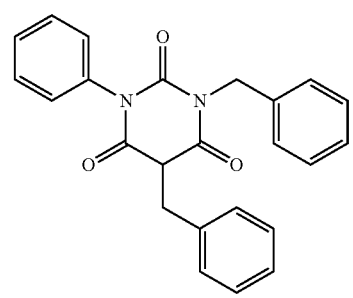

Compound F (Preparation of Outer Layer Cellulose Acylate Dope)

10 parts by mass of the following matting agent solution was added to 90 parts by mass of the above-described core layer cellulose acylate dope, thereby preparing a cellulose acetate solution used as an outer layer cellulose acylate dope.

Matting Agent Solution

Silica particles with average particle size of 20 nn (AEROSIL R972, manufactured by Nippon Aerosil Co., Ltd.): 2 parts by mass
Methylene chloride (first solvent): 76 parts by mass
Methanol (second solvent): 11 parts by mass
Core layer cellulose acylate dope described above: 1 parts by mass (Preparation of Cellulose Acylate Film 1)

The core layer cellulose acylate dope and the outer layer cellulose acylate dope were filtered through filter paper having an average pore size of 34 μm and a sintered metal filter having an average pore size of 10 μm, and three layers which were the core layer cellulose acylate dope and the outer layer cellulose acylate dopes provided on both sides of the core layer cellulose acylate dope were simultaneously cast from a casting port onto a drum at 20° C. (band casting machine).

Next, the film was peeled off in a state where the solvent content was approximately 20% by mass, both ends of the film in the width direction were fixed by tenter clips, and the film was dried while being stretched at a stretching ratio of 1.1 times in the lateral direction.

Thereafter, the film was further dried by being transported between the rolls of the heat treatment device to prepare an optical film having a thickness of 40 μm, and the optical film was used as the cellulose acylate film 1. The in-plane retardation of the obtained cellulose acylate film 1 was 0 nm.

<Preparation of Photoalignment Layer PA1>

The cellulose acylate film 1 was continuously coated with a coating solution PA1 for forming an alignment layer described below with a wire bar. The support on which a coating film was formed was dried with hot air at 140° C. for 120 seconds, and the coating film was irradiated with polarized ultraviolet rays (10 mJ/cm$^2$, using an ultra-high pressure mercury lamp) to form a photoalignment layer PA1, thereby obtaining a TAC film provided with a photoalignment layer. The film thickness of the photoalignment layer PA1 was 0.3 µm.

(Coating Solution PA1 for Forming Alignment Layer)

Polymer PA-1 shown below: 100.00 parts by mass
Acid generator PAG-1 shown below: 5.00 parts by mass
Acid generator CPI-110TF shown below: 0.005 parts by mass
Xylene: 1220.00 parts by mass
Methyl isobutyl ketone: 122.00 parts by mass Polymer PA-1

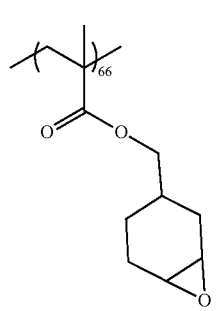

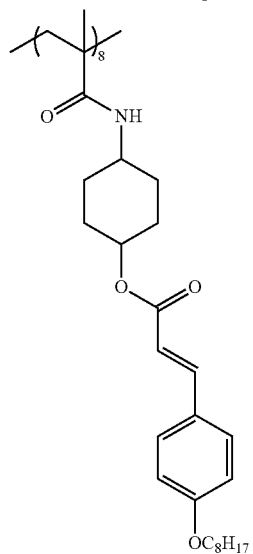

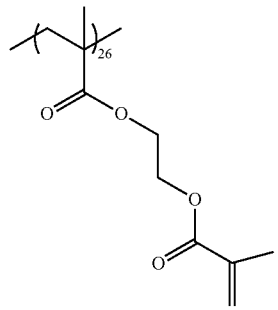

Acid generator PAG-1

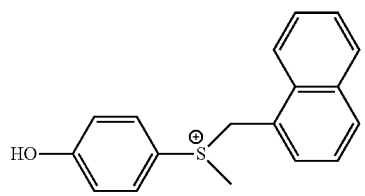

Acid generator CPI-110F

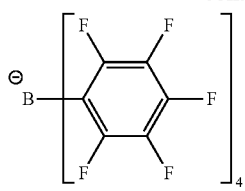

-continued

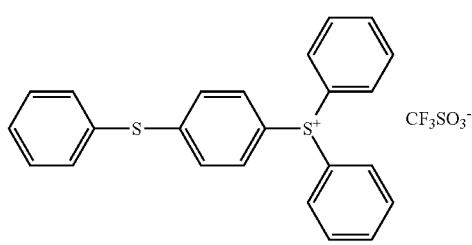

<Formation of Light Absorption Anisotropic Layer P1>

A coating layer P1 was formed by continuously coating the obtained photoalignment layer PA1 with the following composition P1 for forming a light absorption anisotropic layer using a wire bar.

Next, the coating layer P1 was heated at 140° C. for 30 seconds, and the coating layer P1 was cooled to room temperature (23° C.).

Next, the coating layer was heated at 90° C. for 60 seconds and cooled to room temperature again.

Thereafter, a laminate 1B was obtained by irradiating the coating layer with an LED lamp (central wavelength of 365 nm) for 2 seconds under an irradiation condition of an illuminance of 200 mW/cm$^2$ to prepare the light absorption anisotropic layer P1 on the photoalignment layer PA1. The film thickness of the light absorption anisotropic layer P1 was 0.5 µm.

Composition of Composition P1 for Forming Light Absorption Anisotropic Layer

Dichroic substance D-1 shown below: 0.25 parts by mass
Dichroic substance D-2 shown below: 0.36 parts by mass
Dichroic substance D-3 shown below: 0.59 parts by mass
Polymer liquid crystal compound P-1 shown below: 2.21 parts by mass
Low-molecular-weight liquid crystal compound M-1 shown above: 1.36 parts by mass
Polymerization initiator
IRGACURE OXE-02 (manufactured by BASF SE): 0.200 parts by mass
Surfactant F-1 shown below: 0.026 parts by mass
Cyclopentanone: 46.00 parts by mass
Tetrahydrofuran: 46.00 parts by mass
Benzyl alcohol: 3.00 parts by mass

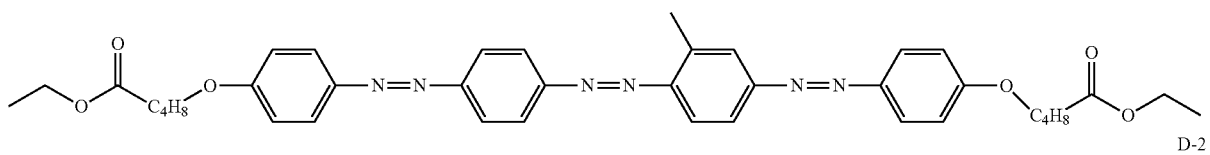

D-2

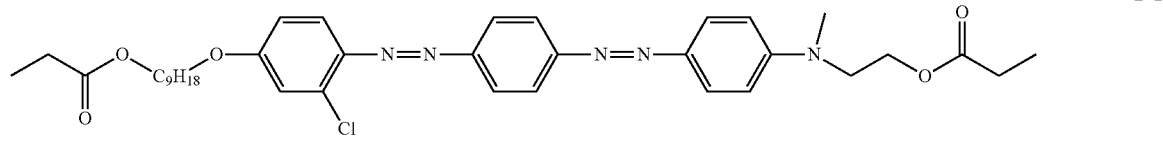

D-3

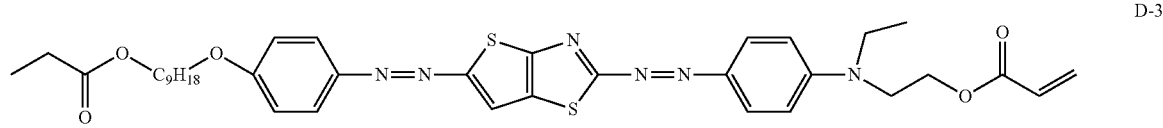

compound P-1

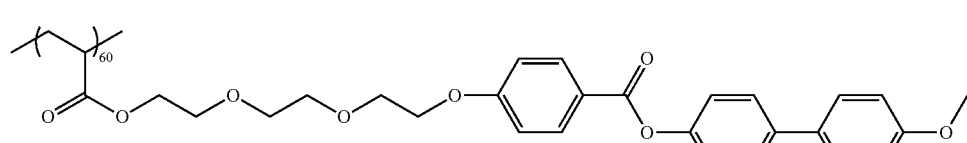

Polymer liquid crystal compound M-1

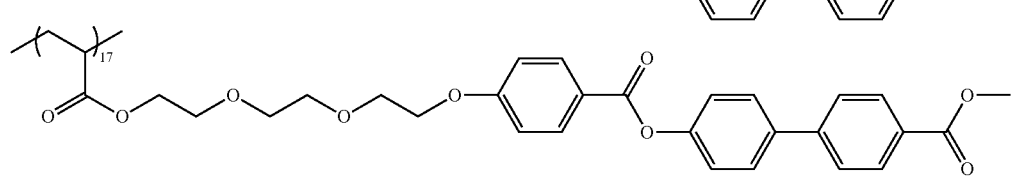

Low-molecular-weight liquid crystal

F-1

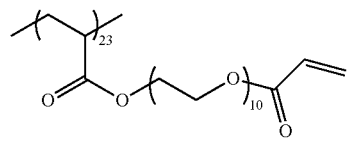

Interface improver

<Preparation of Pressure Sensitive Adhesive Sheet N1>

70 parts of butyl acrylate, 30 parts of methyl acrylate, 4 parts of acrylic acid, 2 parts of N,N-dimethylmethacrylamide, 0.1 part of azobisisobutyronitrile, and 120 parts of ethyl acetate were added. The mixture was polymerized by a solution polymerization method, thereby obtaining a solution of an acrylic copolymer having a weight-average molecular weight of 1500000.

A solution obtained by mixing 3 parts by mass of CORONATE L (polyisocyanate, manufactured by Nippon Polyurethane Industry Co., Ltd.), 0.2 parts by mass of aluminum chelate A (aluminum trisacetylacetonate manufactured by Kawaken Fine Chemical Co., Ltd.), and 0.1 parts by mass of KBM-803 (manufactured by Shin-Etsu Chemical Co., Ltd., γ-mercaptopropylmethyldimethoxysilane) with 100 parts by mass of the solid content in the copolymer solution 1 was used as a pressure sensitive adhesive composition N1. A separate film that had been subjected to a surface treatment with a silicone-based release agent was coated with the composition using a die coater and dried in an environment of 90° C. for 1 minute, thereby preparing a pressure sensitive adhesive sheet having a pressure sensitive adhesive layer with a thickness of 5 µm. The storage elastic modulus of the pressure sensitive adhesive layer was 0.3 MPa.

[Preparation of Laminate 1]

The laminate 1B on the side of the light absorption anisotropic layer P1 and the surface protective layer H1 on the side of the support 1 were bonded to each other using a pressure sensitive adhesive SK2057 (manufactured by Soken Chemical & Engineering Co., Ltd., used as a pressure sensitive adhesive S1) as the first pressure sensitive adhesive layer. Thereafter, only the cellulose acylate film 1 was removed, and the surface from which the cellulose acylate film 1 had been removed and the pressure sensitive adhesive sheet N1 serving as the second pressure sensitive adhesive layer were bonded to each other, thereby obtaining a laminate 1.

Preparation Example 2

<Preparation of UV Adhesive S2>

The following UV adhesive S2 was prepared.
UV Adhesive S2

| |
|---|
| CEL2021P (manufactured by Daicel Corporation) shown below: 70 parts by mass |
| 1,4-Butanediol diglycidyl ether: 20 parts by mass |
| 2-Ethylhexyl glycidyl ether: 10 parts by mass |
| CPI-100P: 2.25 parts by mass |

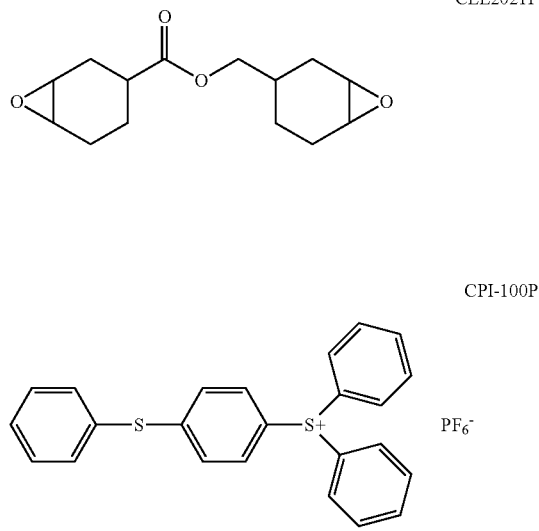

<Preparation of Laminate 2>

The laminate 1B on the side of the light absorption anisotropic layer P1 and the surface protective layer H1 on the side of the support 1 were bonded to each other using the UV adhesive S2 as the first pressure sensitive adhesive layer and exposed to light at an illuminance of 1000 ml to be cured. Thereafter, only the cellulose acylate film 1 was removed, and the surface from which the cellulose acylate film 1 had been removed and the pressure sensitive adhesive sheet N1 serving as the second pressure sensitive adhesive layer were bonded to each other, thereby obtaining a laminate 2.

Preparation Example 3

The laminate 1B on the side of the light absorption anisotropic layer P1 and the surface protective layer H1 on the side of the support 1 were bonded to each other using the UV adhesive S2 as the first pressure sensitive adhesive layer and cured such that the indentation elastic modulus of the first pressure sensitive adhesive layer reached the value listed in Table 2 by adjusting the UV irradiation conditions. Thereafter, only the cellulose acylate film 1 was removed, and the surface from which the cellulose acylate film 1 had been removed and the pressure sensitive adhesive sheet N1 serving as the second pressure sensitive adhesive layer were bonded to each other, thereby obtaining a laminate 3.

Preparation Example 4

<Preparation of Pressure Sensitive Adhesive Sheets N2 and N3>

An acrylate-based polymer A1 was prepared according to the following procedures.

95 parts by weight of butyl acrylate and 5 parts by weight of acrylic acid were polymerized by a solution polymerization method in a reaction container equipped with a cooling pipe, a nitrogen introduction pipe, a thermometer, and a stirrer, thereby obtaining an acrylate-based polymer A1 with an average molecular weight of 2000000 and a molecular weight distribution (Mw/Mn) of 3.0.

Next, an acrylate-based pressure sensitive adhesive was prepared with the compositions listed in Table 1 using the obtained acrylate-based polymer A1. Each separate film that had been subjected to a surface treatment with a silicone-based release agent was coated with the acrylate-based pressure sensitive adhesive using a die coater, dried in an environment of 90° C. for 1 minute, and irradiated with ultraviolet rays (UV) under the following conditions, thereby obtaining pressure sensitive adhesive sheets N2 and N3. Here, UV irradiation was not performed in the preparation of the pressure sensitive adhesive sheet N3. The composition of the acrylate-based pressure sensitive adhesive and the film thickness and the storage elastic modulus of the pressure sensitive adhesive sheet are listed in Table 1.

(UV Irradiation Conditions)

Electrodeless lamp H bulb (Fusion Co., Ltd.)

Illuminance of 600 mW/cm$^2$, light dose of 150 mJ/cm$^2$

The UV illuminance and the light dose were measured using "UVPF-36" (manufactured by Eye Graphics Co., Ltd.).

TABLE 1

| | Composition of acrylate-based pressure sensitive adhesive | | | | | | |
|---|---|---|---|---|---|---|---|
| | Acrylate-based polymer A1 | (A) Poly-functional acrylate-based monomer | (B) Photopoly-merization initiator | (C) Isocyanate-based crosslinking agent | (D) Silane coupling agent | Film thickness (μm) | Storage elastic modulus (MPa) |
| Pressure sensitive adhesive sheet N2 | 100 | 10 | 1 | 1 | 0.2 | 5 | 0.6 |
| Pressure sensitive adhesive sheet N3 | 100 | — | — | 1 | 0.2 | 5 | 0.1 |

(A) Polyfunctional acrylate-based monomer: tris(acryloyloxyethyl) isocyanurate, molecular weight = 423, trifunctional type (trade name, "ARONIX M-315", manufactured by Toagosei Co., Ltd.)
(B) Photopolymerization Initiator: mixture of benzophenone and 1-hydroxycyclohexyl phenyl ketone at mass ratio of 1:1, "IRGACURE 500" (manufactured by Ciba Specialty Chemicals Corp.)
(C) Isocyanate-based crosslinking agent: trimethylolpropane-modified tolylene diisocyanate ("CORONATE L", manufactured by Nippon Polyurethane Industry Co., Ltd.)
(D) Silane coupling agent: 3-glycidoxypropyltrimethoxysilane ("KBM-403", manufactured by Shin-Etsu Chemical Co., Ltd.)

<Preparation of Laminate 4>

The laminate 1B on the side of the light absorption anisotropic layer P1 and the surface protective layer H1 on the side of the support 1 were bonded to each other using the UV adhesive S2 as the first pressure sensitive adhesive layer and cured such that the indentation elastic modulus of the first pressure sensitive adhesive layer reached the value listed in Table 2 by adjusting the UV irradiation conditions. Thereafter, only the cellulose acylate film 1 was removed, and the surface from which the cellulose acylate film 1 had been removed and the pressure sensitive adhesive sheet N2 serving as the second pressure sensitive adhesive layer were bonded to each other, thereby obtaining a laminate 4.

Preparation Example 5

The laminate 1B on the side of the light absorption anisotropic layer P1 and the surface protective layer H1 on the side of the support 1 were bonded to each other using the UV adhesive S2 as the first pressure sensitive adhesive layer and cured such that the indentation elastic modulus of the first pressure sensitive adhesive layer reached the value listed in Table 2 by adjusting the UV irradiation conditions. Thereafter, only the cellulose acylate film 1 was removed, and the surface from which the cellulose acylate film 1 had been removed and the pressure sensitive adhesive sheet N2 serving as the second pressure sensitive adhesive layer were bonded to each other, thereby obtaining a laminate 5.

Preparation Example 6

(Preparation of PVA Adhesive S3)

20 parts by mass of methylol melamine with respect to 100 parts by mass of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition 30° C. to prepare an aqueous solution (PVA adhesive S3) in which the concentration of solid contents was adjusted to 3.7% by mass.

<Preparation of Laminate 6>

The laminate 1B on the side of the light absorption anisotropic layer P1 and the surface protective layer H1 on the side of the support 1 were bonded to each other using the PVA adhesive S3 as the first pressure sensitive adhesive layer. Thereafter, only the cellulose acylate film 1 was removed, and the surface from which the cellulose acylate film 1 had been removed and the pressure sensitive adhesive sheet N2 serving as the second pressure sensitive adhesive layer were bonded to each other, thereby obtaining a laminate 6.

Preparation Example 7

A laminate 7B was obtained by changing the composition P1 for forming a light absorption anisotropic layer to the following composition P2 for forming a light absorption anisotropic layer in the formation of the light absorption anisotropic layer of the laminated film 1B of Preparation Example 4. A laminate of Preparation Example 7 was obtained by the same method as in Preparation Example 4 except that the laminate 7B was used in place of the laminate 1B.

Composition of Composition P2 for Forming Light Absorption Anisotropic Layer

Dichroic substance D-5 shown below: 0.14 parts by mass
Dichroic substance D-2 shown above: 0.21 parts by mass
Dichroic substance D-6 shown below: 0.35 parts by mass
Polymer liquid crystal compound P-1 shown above: 4.07 parts by mass
Polymerization initiator
IRGACURE OXE-02 (manufactured by BASF SE): 0.200 parts by mass
Interface improver F-1 shown above: 0.026 parts by mass
Cyclopentanone: 45.00 parts by mass
Tetrahydrofuran: 45.00 parts by mass
Benzyl alcohol: 5.00 parts by mass

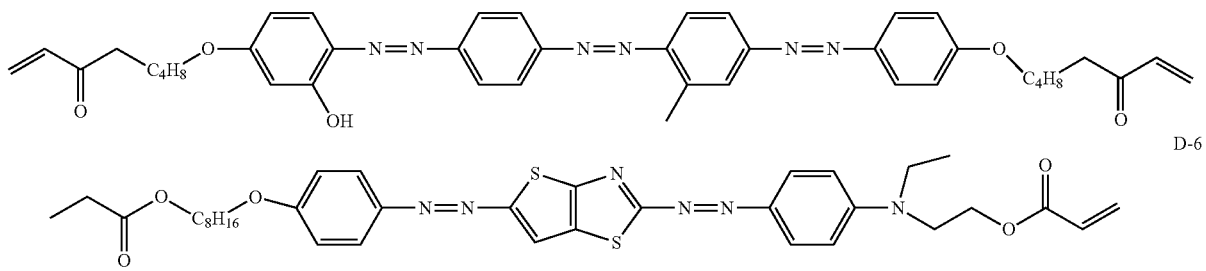

D-5

D-6

Preparation Example 8

[Preparation of Surface Protective Layer H2]

As described below, a surface protective layer H2 in which the support 1, the hard coat layer, the mixed layer, and the scratch resistant layer were formed in this order was prepared.

(Production of Polyimide Powder)

832 g of N,N-dimethylacetamide (DMAc) was added to a 1 L reactor equipped with a stirrer, a nitrogen injection device, a dropping funnel, a temperature controller, and a cooler under a nitrogen stream, and the temperature of the reactor was set to 25° C. 64.046 g (0.2 mol) of bistrifluoromethylbenzidine (TFDB) was added to the mixture and dissolved therein. 31.09 g (0.07 mol) of a 2,2-bis (3,4-dicarboxyphenyl) hexafluoropropane dianhydride (6FDA) and 8.83 g (0.03 mol) of a biphenyltetracarboxylic dianhydride (BPDA) were added to the obtained solution while the solution was maintained at 25° C., and the solution was stirred for a certain period of time and allowed to react. Thereafter, 20.302 g (0.1 mol) of terephthaloyl chloride (TPC) was added to the solution, thereby obtaining a polyamic acid solution having a concentration of solid contents of 13% by mass. Next, 25.6 g of pyridine and 33.1 g of acetic anhydride were added to the polyamic acid solution, and the resulting solution was stirred for 30 minutes, further stirred at 70° C. for 1 hour, and cooled to room temperature. 20 L of methanol was added thereto, and the precipitated solid content was filtered and crushed. Thereafter, the crushed solid content was dried in vacuum at 100° C. for 6 hours, thereby obtaining 111 g of polyimide powder.

<Preparation of Support 1>

100 g of the polyimide powder was dissolved in 670 g of N,N-dimethylacetamide (DMAc) to obtain a 13 mass % solution. The obtained solution was cast on a stainless steel plate and dried with hot air at 130° C. for 30 minutes. Thereafter, the film was peeled off from the stainless steel plate and fixed to a frame with a pin, and the frame to which the film was fixed was placed in a vacuum oven, heated for 2 hours while the heating temperature was gradually raised from 100° C. to 300° C., and gradually cooled. The cooled film was separated from the frame and further subjected to a heat treatment at 300° C. for 30 minutes as a final heat treatment step, thereby obtaining a support 1 consisting of a polyimide film and having a thickness of 30 μm.

<Synthesis of Polymerizable Polyorganosilsesquioxane>

(Synthesis of Compound (A))

297 mmol (73.2 g) of 2-(3,4-epoxycyclohexyl)ethyltrimethoxysilane, 3 mmol (409 mg) of methyltrimethoxysilane, 7.39 g of triethylamine, and 370 g of MIBK (methyl isobutyl ketone) were mixed in a 1000 mL flask (reaction container) provided with a thermometer, a stirrer, reflux condenser, and a nitrogen introduction pipe, and 73.9 g of pure water was added dropwise to the mixture over 30 minutes using a dropping funnel. The reaction solution was heated to 80° C., and the polycondensation reaction was carried out under a nitrogen stream for 10 hours.

Thereafter, the reaction solution was cooled, 300 g of 5 mass % saline was added thereto, and the organic layer was extracted. The organic layer was sequentially washed twice with 300 g of 5 mass % saline and 300 g of pure water and concentrated under the conditions of 1 mmHg and 50° C., thereby obtaining a methyl isobutyl ketone (MIRK) solution containing 59.0% by mass of a colorless and transparent product {(compound (A) which is polyorganosilsesquioxane containing an alicyclic epoxy group (compound in which Rb in Formula (1) represents a 2-(3,4-epoxycyclohexyl)ethyl group, Rc represents a methyl group, q represents 99, and r represents 1)} as a MIBK solution having a concentration of solid contents of 59.8% by mass.

(1)

The obtained compound (A) had a number average molecular weight (Mn) of 2310 and a dispersity (Mw/Mn) of 2.1.

In addition, 1 mmHg is about 133.322 Pa.

(Synthesis of Polymer (1-1))

A 200 mL three-neck flask provided with a stirrer, a thermometer, a reflux condenser, and a nitrogen gas introduction pipe was charged with 25.0 g of t-amyl alcohol and heated to 120° C. Next, a mixed solution consisting of 3.25 g (7.8 mmol) of 2-(perfluorohexyl)ethyl acrylate {corresponding to a monomer (K2)}, 2.26 g (4.7 mmol) of a compound (I-1) having the following structure {corresponding to a monomer (K1)}, 25.0 g of cyclohexanone, and 4.7 g of "V-601" (manufactured by FUJIFILM Wako Pure Chemical Corporation) was added dropwise thereto at a constant speed such that the addition dropwise was completed in 120 minutes. After the completion of the dropwise addition, the mixture was further stirred for 3.5 hours, thereby obtaining 5.5 g of a polymer (1-1) (in terms of solid content). The weight-average molecular weight (Mw) of the polymer was 1,600.

(I-1)

[Chemical structure of tris(2-acryloyloxyethyl) isocyanurate]

<Preparation of Composition for Forming Hard Coat Layer>
(Composition HC-1 for Forming Hard Coat Layer)

CPI-100P, the polymer (1-1), and methyl isobutyl ketone (MIBK) were added to a MIBK solution containing the compound (A), and the concentration of each component contained in the solution was adjusted to the following concentration, a mixing tank was charged with the solution, and the resulting solution was stirred. The obtained composition was filtered through a polypropylene filter having a pore diameter of 0.4 μm, thereby obtaining a composition HC-1 for forming a hard coat layer.

Compound (A): 98.6 parts by mass
  CPI-100P: 1.3 parts by mass
  Polymer (1-1): 0.1 parts by mass
  Methyl isobutyl ketone: 100.0 parts by mass Further, the compound used in the composition for forming a hard coat layer is as follows.

CPI-100P: Cationic photopolymerization initiator (manufactured by San-Apro Ltd.)

<Preparation of Composition for Forming Mixed Layer>
(Composition M-1 for Forming Mixed Layer)

The MIBK solution containing the compound (A) was substituted with a methyl ethyl ketone (MIX) solution, DPHA, CPI-100P, IRGACURE 127, a leveling agent-1, and MEK were added thereto, the concentration of each component contained in the solution was adjusted to the following concentration, a mixing tank was charged with the solution, and the solution was stirred. The obtained composition was filtered through a polypropylene filter having a pore diameter of 0.4 μm, thereby obtaining a composition M-1 for forming a mixed layer. In the composition M-1 for forming a mixed layer, the mixing ratio of the compound (A) and DPHA (compound (A)/DPHA) is 50% by mass/50% by mass.

Compound (A): 42.85 parts by mass
  DPHA: 42.85 parts by mass
  CPI-100P: 1.3 parts by mass
  IRGACURE 127: 5.0 parts by mass
  Leveling agent-1: 8.0 parts by mass
  Methyl ethyl ketone: 500.0 parts by mass Further, the compounds used in the composition for forming a mixed layer are as follows.

DPHA: mixture of dipentaerythritol pentaacrylate and dipentaerythritol hexaacrylate (manufactured by Nippon Kayaku Co., Ltd.)

IRGACURE 127: radical photopolymerization initiator (manufactured by BASF SE)

Leveling agent-1: polymer having the following structure (Mw=20000, the compositional ratio of the following repeating units is the mass ratio)

[Chemical structure of copolymer with repeating units, 90 units of $-CH_2-CH(COOCH_2(CF_2)_6H)-$ and 10 units of $-CH_2-CH(COO-)-$]

<Preparation of Composition for Forming Scratch Resistant Layer>
(Composition SR-1 for Forming Scratch Resistant Layer)

A mixing tank was charged with each component with the following composition, and the mixture was stirred and filtered through a polypropylene filter having a pore size of 0.4 μm, thereby obtaining a composition SR-1 for forming a scratch resistant layer.

DPHA: 96.2 parts by mass
  IRGACURE 127: 2.8 parts by mass
  RS-90: 1.0 part by mass
  Methyl ethyl ketone: 300.0 parts by mass Further, the compounds used in the composition for forming a scratch resistant layer are as follows.

RS-90: sliding agent (manufactured by DIC Corporation)

<Preparation of Surface Protective Layer H2>

The support 1 was coated with the composition HC-1 for forming a hard coat layer using a die water. The composition was dried at 120° C. for 1 minute and irradiated with ultraviolet rays at an illuminance of 18 mW/cm$^2$ and an irradiation amount of 10 mJ/cm$^2$ using an air-cooled mercury lamp under a temperature condition of 25° C., thereby semi-curing the hard coat layer.

A composition for forming a mixed layer was prepared by adding MEK to the composition M-1 and diluting the concentration of solid contents to 1/10, and the semi-cured hard coat layer was coated with the composition using a die coater. The composition was dried at 120° C. for 1 minute and irradiated with ultraviolet rays at an illuminance of 18 mW/cm$^2$ and an irradiation amount of 10 mJ/cm$^2$ using an air-cooled mercury lamp under conditions of 25° C. and an oxygen concentration of 1% to semi-cure the mixed layer, and the mixed layer was provided on the hard coat layer.

The semi-cured mixed layer was coated with the composition SR-1 for forming a scratch resistant layer using a die coater. The hard coat layer, the mixed layer, and the scratch resistant layer were completely cured by drying the composition at 120° C. for 1 minute, irradiating the composition with ultraviolet rays at an illuminance of 60 mW/cm$^2$ and an irradiation amount of 800 mJ/cm$^2$ using an air-cooled mercury lamp under conditions of 25° C. and an oxygen concentration of 100 ppm, and further irradiating the composition with ultraviolet rays at an illuminance of 60 mW/cm$^2$ and an irradiation amount of 800 mJ/cm$^2$ using an air-cooled mercury lamp under conditions of 80° C. and an oxygen concentration of 100 ppm. Thereafter, the obtained film was subjected to a heat treatment at 120° C. for 1 hour, thereby obtaining a surface protective layer H2 having a mixed layer with a thickness of 0.1 μm and a scratch resistant layer with a thickness of 1.0 μm on a hard coat layer with a thickness of 11.0 μm.

The laminate 1B on the side of the light absorption anisotropic layer P2 and the surface protective layer H2 on the side of the support were bonded to each other using the UV adhesive S2 as the first pressure sensitive adhesive layer and cured such that the indentation elastic modulus of the first pressure sensitive adhesive layer reached the value listed in Table 2 by adjusting the UV irradiation conditions. Thereafter, only the cellulose acylate film 1 was removed, and the surface from which the cellulose acylate film 1 had been removed and the pressure sensitive adhesive sheet N2 serving as the second pressure sensitive adhesive layer were bonded to each other, thereby obtaining a laminate 8.

Preparation Example 9

A laminate 9B was obtained by changing the composition P1 for forming a light absorption anisotropic layer to the following composition P3 for forming a light absorption anisotropic layer and changing the thickness thereof to 1.5 μm from 0.5 μm in the formation of the light absorption anisotropic layer of the laminated film 1B of Preparation Example 6. A laminate of Preparation Example 9 was obtained by the same method as in Preparation Example 6 except that the laminate 9B was used in place of the laminate 1B.

Composition of Composition P3 for Forming Light Absorption Anisotropic Layer

---

Dichroic substance D-1 shown above: 0.14 parts by mass
Dichroic substance D-4 shown below: 0.21 parts by mass
Dichroic substance D-3 shown above: 0.35 parts by mass
Polymer liquid crystal compound P-1 shown above: 2.97 parts by mass
Low-molecular-weight liquid crystal compound M-1 shown above: 1.10 parts by mass
Polymerization initiator
IRGACURE OXE-02 (manufactured by BASF SE): 0.200 parts by mass
Interface improver F-1 shown above: 0.026 parts by mass
Cyclopentanone: 46.00 parts by mass
Tetrahydrofuran: 46.00 parts by mass
Benzyl alcohol: 3.00 parts by mass

---

Preparation Example 10

A laminate of Preparation Example 10 was obtained by the same method as in Preparation Example 8 except that the laminate 9B was used in place of the laminate 1B in the formation of the light absorption anisotropic layer of the laminated film 1B of Preparation Example 8.

Preparation Example 11

A coating layer P4 was formed by continuously coating the photoalignment layer PA 1 with the following composition P4 for forming a light absorption anisotropic layer using a wire bar in the formation of the light absorption anisotropic layer of the laminated film 1B of Preparation Example 1.

Next, the coating layer P4 was heated at 120° C. for 60 seconds and cooled to room temperature (23° C.), thereby forming a dry film. In the dry film, the liquid crystal compound was a smectic B phase.

Thereafter, a laminate 11B was obtained by irradiating the film with an LED lamp (central wavelength of 365 nm) for 2 seconds under an irradiation condition of an illuminance of 200 mW/cm$^2$ to prepare the light absorption anisotropic layer P4 on the photoalignment layer PA1. The film thickness of the light absorption anisotropic layer P1 was 2.5 μm.

A laminate of Preparation Example 11 was obtained by the same method as in Preparation Example 8 except that the laminate 11B was used instead of the laminate 1B.

Composition of Composition P4 for Forming Light Absorption Anisotropic Layer

---

Dichroic substance D-7 shown below: 2.60 parts by mass
Dichroic substance D-8 shown below: 2.60 parts by mass
Dichroic substance D-9 shown below: 2.20 parts by mass
Liquid crystal compound M1 shown below: 100.00 parts by mass
Polymerization initiator
IRGACURE 369 (manufactured by BASF SE): 5.000 parts by mass
BYK361N (manufactured by Big Chemie Japan Co., Ltd.): 0.9 parts by mass
Cyclopentanone: 925.00 parts by mass

---

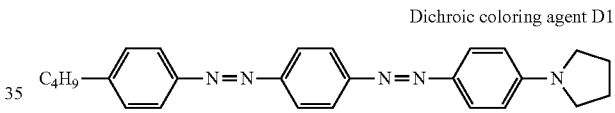

Dichroic coloring agent D1

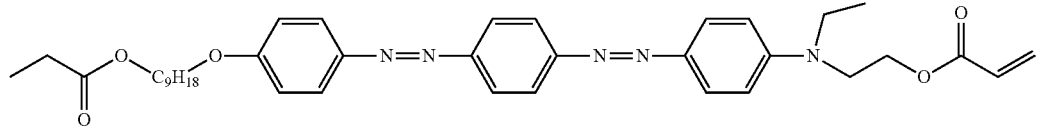

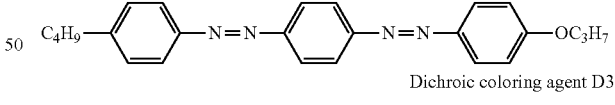

Dichroic coloring agent D2

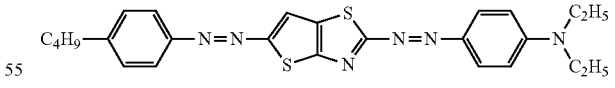

Dichroic coloring agent D3

Liquid Crystal Compound M1 (Compound a and Compound B were Mixed at Mixing Ratio of 75/25)

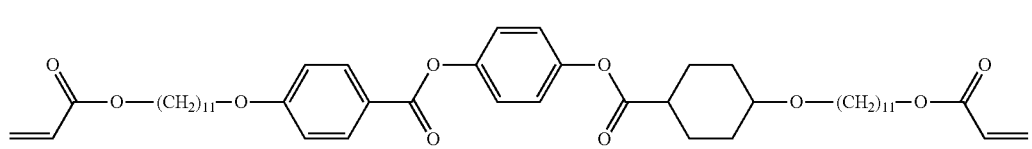

(Compound A)

-continued

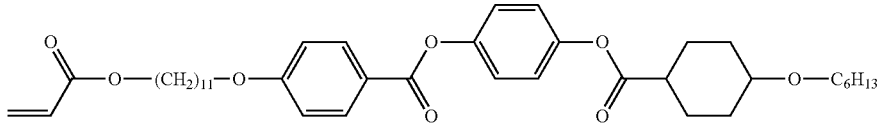
(Compound B)

Preparation Example 12

The laminate 11B on the side of the light absorption anisotropic layer P4 and the surface protective layer H1 on the side of the support were subjected to a corona treatment and bonded to each other using the PVA adhesive S3 as the first pressure sensitive adhesive layer. Thereafter, only the cellulose acylate film 1 was removed, and the surface from which the cellulose acylate film 1 had been removed and the pressure sensitive adhesive sheet N2 serving as the second pressure sensitive adhesive layer were bonded to each other, thereby obtaining a laminate 12.

[Indentation Elastic Modulus]

The indentation elastic modulus of each layer was measured by the method described above.

[Storage Elastic Modulus]

The storage elastic modulus of the second pressure sensitive adhesive layer was measured by the method described above.

substrate (Eagle XG, manufactured by Corning Inc.). The humidity of each laminate was controlled at a temperature of 25° C. and a humidity of 60% RH for 2 hours, and the surface on which the hard coat layer was laminated was scratched with a load of 4.9 N using a 2H test pencil. The laminate and the polarizing plate (trade name: HCL2-5618HCS, manufactured by Sanritz Co., Ltd.) were superimposed such that the absorption axes were disposed to be orthogonal to each other, the site scratched with the pencil was visually observed on a backlight, and evaluation was performed according to the following evaluation standards.

A: Light leakage was not observed
B: Light leakage was slightly observed
C: Light leakage was clearly observed The evaluation results are listed in Table 2.

In Table 2, "A/B" denotes the ratio (indentation elastic modulus of first pressure sensitive adhesive layer indentation elastic modulus of light absorption anisotropic layer) of the indentation elastic modulus of the first pressure sensitive adhesive layer to the indentation elastic modulus of the light absorption anisotropic layer.

TABLE 2

| | Second pressure sensitive adhesive layer | | Photo- alignment layer Thickness μm | Light absorption anisotropic layer | | | | First pressure sensitive adhesive layer | | | Surface protec- tive layer Type | A/B | Evalua- tion of resistance to pressure from surface |
|---|---|---|---|---|---|---|---|---|---|---|---|---|---|
| | Type | Thick- ness μm | Storage elastic modulus MPa | | Compo- sition | Thick- ness μm | Inden- tation elastic modulus B (Gpa) | Polymer- izable group mmol/g | Type | Inden- tation elastic modulus A (Gpa) | Thick- ness μm | | | |
| Preparation Example 1 | N1 | 5 | 0.3 | 0.3 | P1 | 0.5 | 2.5 | 1.23 | S1 | Less than 1 | 23 | H1 | Less than 0.4 | C |
| Preparation Example 2 | N1 | 5 | 0.3 | 0.3 | P1 | 0.5 | 2.5 | 1.23 | S2 | 6 | 1 | H1 | 2.4 | B |
| Preparation Example 3 | N1 | 5 | 0.3 | 0.3 | P1 | 0.5 | 2.5 | 1.23 | S2 | 1 | 1 | H1 | 0.4 | C |
| Preparation Example 4 | N2 | 5 | 0.6 | 0.3 | P1 | 0.5 | 2.5 | 1.23 | S2 | 6 | 1 | H1 | 2.4 | A |
| Preparation Example 5 | N2 | 5 | 0.6 | 0.3 | P1 | 0.5 | 2.5 | 1.23 | S2 | 3 | 1 | H1 | 1.2 | B |
| Preparation Example 6 | N2 | 5 | 0.6 | 0.3 | P1 | 0.5 | 2.5 | 1.23 | S3 | 4.5 | 0.1 | H1 | 1.8 | A |
| Preparation Example 7 | N2 | 5 | 0.6 | 0.3 | P2 | 0.5 | 2.5 | 0.51 | S2 | 6 | 1 | H1 | 2.4 | B |
| Preparation Example 8 | N2 | 5 | 0.6 | 0.3 | P1 | 0.5 | 2.5 | 1.23 | S2 | 6 | 1 | H2 | 2.4 | A |
| Preparation Example 9 | N2 | 5 | 0.6 | 0.3 | P3 | 1.5 | 2.5 | 1.05 | S3 | 4.5 | 0.1 | H1 | 1.8 | A |
| Preparation Example 10 | N2 | 5 | 0.6 | 0.3 | P3 | 1.5 | 2.5 | 1.05 | S2 | 6 | 1 | H2 | 2.4 | A |
| Preparation Example 11 | N2 | 5 | 0.6 | 0.3 | P4 | 2.5 | 1.5 | 1.95 | S2 | 6 | 1 | H2 | 4.0 | A |
| Preparation Example 12 | N2 | 5 | 0.6 | 0.3 | P4 | 2.5 | 1.5 | 1.95 | S3 | 4.5 | 0.1 | H1 | 3.0 | A |

[Evaluation of Resistance to Pressure from Surface]

The pencil hardness evaluation described in MS K-5400 was performed as an index of scratch resistance. Each of the obtained laminates 1 to 14 was cut into a size of 50 mm×50 mm, the separate film was peeled off, and the pressure sensitive adhesive layer 2 was pressure-bonded onto a glass As listed in Table 2, in the laminate having the surface protective layer, the first pressure sensitive adhesive layer, the light absorption anisotropic layer, and the second pressure sensitive adhesive layer in this order, it was found that the resistance to the pressure from the surface of the laminate was excellent in a case where the indentation elastic modulus of the first pressure sensitive adhesive layer was greater than the indentation elastic modulus of the light absorption anisotropic layer (Preparation Examples 2 and 4 to 12).

On the contrary, it was found that the resistance to the pressure from the surface of the laminate was degraded in a case where the indentation elastic modulus of the first pressure sensitive adhesive layer was less than or equal to the indentation elastic modulus of the light absorption anisotropic layer (Preparation Examples 1 and 3).

Based on the comparison between Preparation Example 2 and Preparation example 4, it was found that the resistance to the pressure from the surface of the laminate was excellent in a case where the storage elastic modulus of the second pressure sensitive adhesive layer was 0.5 MPa or greater (Preparation Example 4).

Based on the comparison between Preparation Example 4 and Preparation Example 7, it was found that the resistance to the pressure from the surface of the laminate was excellent in a case where the molar content of the radically polymerizable group in the compound contained in the composition for forming a light absorption anisotropic layer was 1.0 mmol/g or greater with respect to the total solid content of the composition for forming a light absorption anisotropic layer (Preparation Example 4).

Preparation Example 13

<Preparation of Optically Anisotropic Layer>
(Preparation of Positive A-Plate A1)

The cellulose acylate film 1 was continuously coated with a coating solution PA2 for forming an alignment layer described below with a wire bar. The support on which a coating film was formed was dried with hot air at 140° C. for 120 seconds, and the coating film was irradiated with polarized ultraviolet rays (10 mJ/cm², using an ultra-high pressure mercury lamp) to form a photoalignment layer PA2 having a thickness of 0.2 µm, thereby obtaining a TAC film provided with a photoalignment layer.

(Coating Solution PA2 for Forming Alignment Layer)

Polymer PA-2 shown below: 100.00 parts by mass
Acid generator PAG-1 shown below: 1.00 parts by mass
Isopropyl alcohol: 16.50 parts by mass
Butyl acetate: 1072.00 parts by mass
Methyl ethyl ketone: 268.00 parts by mass

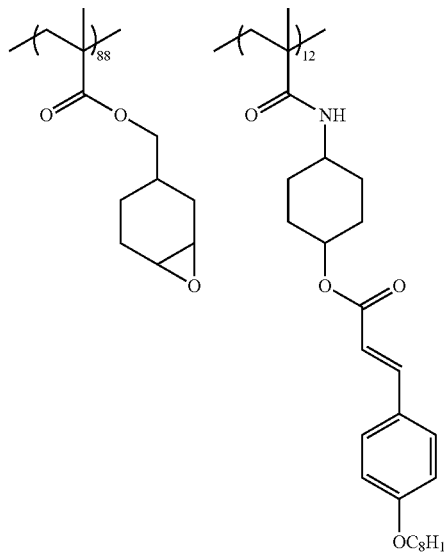

Polymer PA-2

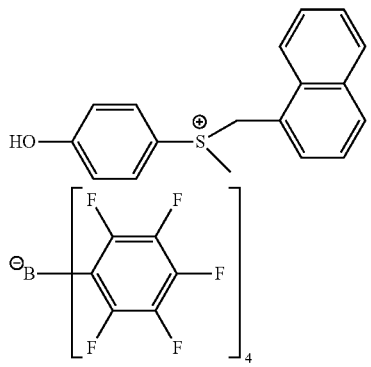

PAG-1

Acid generator

The photoalignment layer PA2 was coated with the composition A-1 having the composition described below using a bar coater. The coating film formed on the photoalignment layer PA2 was heated to 120° C. with hot air, cooled to 60° C., irradiated with ultraviolet rays at a wavelength of 365 nm with an illuminance of 100 mJ/cm² using a high-pressure mercury lamp in a nitrogen atmosphere, and continuously irradiated with ultraviolet rays with an illuminance of 500 mJ/cm² while being heated at 120° C. so that the alignment of the liquid crystal compound was fixed, thereby preparing a TAC film A1 having a positive A-plate A1.

The thickness of the positive A-plate A1 was 2.5 µm, and Re(550) was 144 nm. Further, the positive A-plate A1 satisfied the relationship of "Re(450)≤Re(550) S Re(650)". Re(450)/Re(550) was 0.82.

(Composition A1)

Polymerizable liquid crystal compound L-1 shown below: 43.50 parts by mass
Polymerizable liquid crystal compound L-2 shown below: 43.50 parts by mass
Polymerizable liquid crystal compound L-3 shown below: 8.00 parts by mass
Polymerizable liquid crystal compound L-4 shown below: 5.00 parts by mass
Polymerization initiator PI-1 shown below: 0.55 parts by mass -continued Leveling agent T-1: 0.20 parts by mass
Cyclopentanone: 235.00 parts by mass (Preparation of positive C-plate C1)

The above-described cellulose acylate film 1 was used as a temporary support.

The cellulose acylate film 1 was allowed to pass through a dielectric heating roll at a temperature of 60° C., the film compound L-1

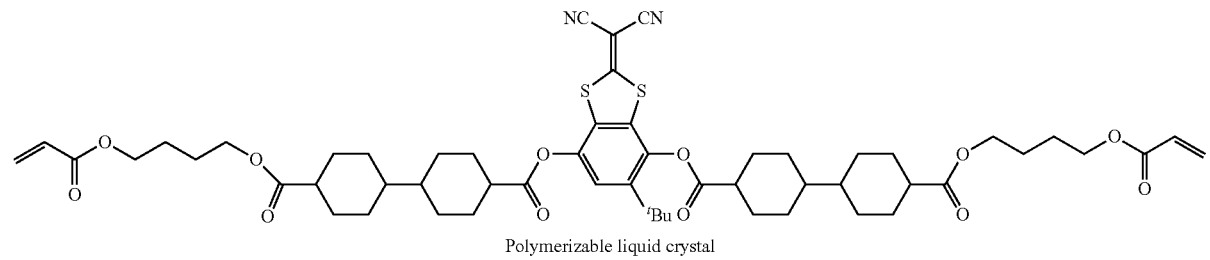
Polymerizable liquid crystal compound L-2

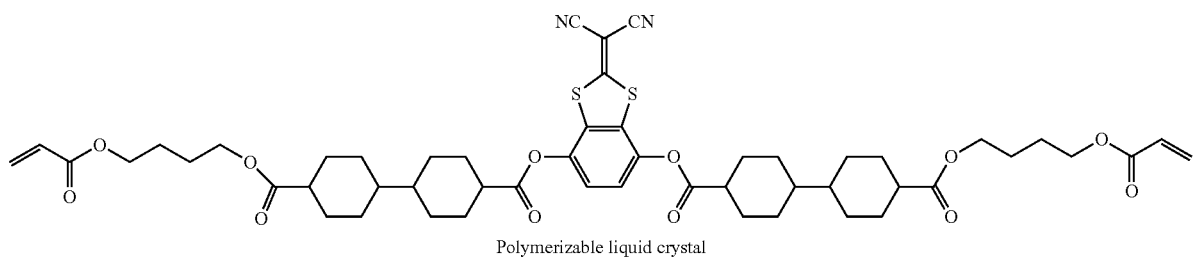
Polymerizable liquid crystal compound L-3

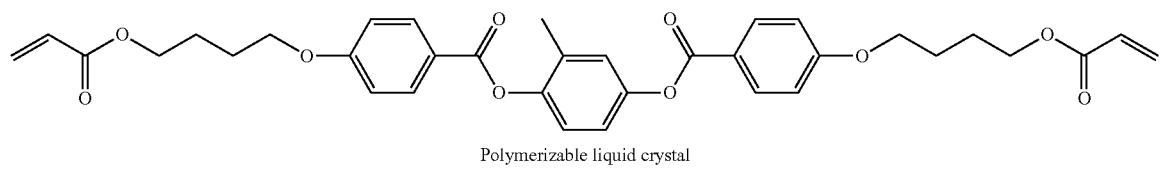
Polymerizable liquid crystal compound L-4

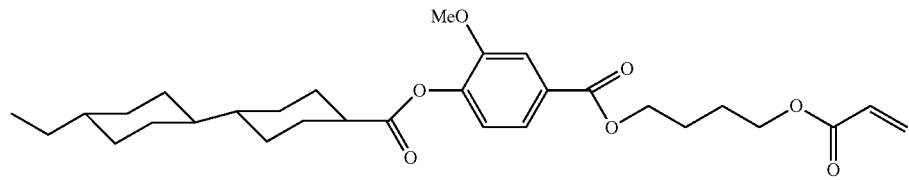
Polymerizable liquid crystal

PI-1

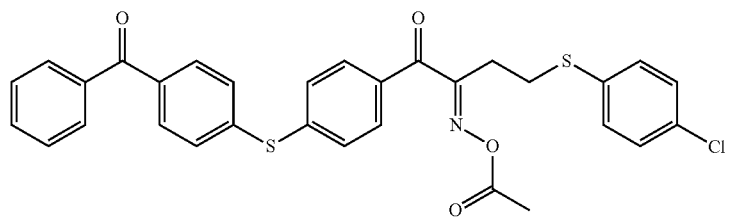
Polymerization initiator

T-1

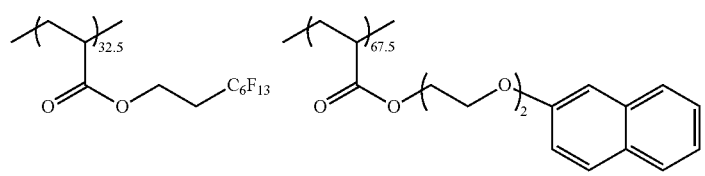
Leveling agent surface temperature was increased to 40° C., one surface of the film was coated with an alkaline solution having the following composition such that the coating amount reached 14 ml/m² using a bar coater and heated to 110° C., and the film was transported for 10 seconds under a steam-type far-infrared heater (manufactured by Noritake Co., Ltd.).

Next, the film was coated with pure water such that the coating amount reached 3 ml/m² using the same bar coater.

Next, the process of washing the film with water using a fountain coater and draining the film using an air knife was repeated three times, and the film was transported to a drying zone at 70° C. for 10 seconds and dried, thereby preparing a cellulose acylate film 1 which had been subjected to an alkali saponification treatment.

(Alkaline Solution)

---
Potassium hydroxide: 4.7 parts by mass

Water: 15.8 parts by mass

Isopropanol: 63.7 parts by mass

Fluorine-containing surfactant SF-1

($C_{14}H_{29}O(CH_2CH_2O)_{20}H$): 1.0 parts by mass

Propylene glycol: 14.8 parts by mass

---

The cellulose acylate film 1 that had been subjected to the alkali saponification treatment was continuously coated with a coating solution 3 for forming an alignment layer having the following composition using a #8 wire bar. The obtained film was dried with hot air at 60° C. for 60 seconds and further dried with hot air at 100° C. for 120 seconds, thereby forming an alignment layer.

(Coating Solution 3 for Forming Alignment Layer)

---
Polyvinyl alcohol (PVA103, manufactured by Kuraray Co., Ltd.): 2.4 parts by mass
isopropyl alcohol: 1.6 parts by mass
Methanol: 36 parts by mass
Water: 60 parts by mass

---

The alignment layer was coated with a coating solution C1 for forming a positive C-plate described below, the obtained coating film was aged at 60° C. for 60 seconds and irradiated with ultraviolet rays with an irradiation amount of 1000 mJ/cm² using an air-cooled metal halide lamp at an illuminance of 70 mW/cm² (manufactured by Eye Graphics Co., Ltd.) in the atmosphere, and the alignment state thereof was fixed to vertically align the liquid crystal compound, thereby preparing a positive C-plate C1 with a thickness of 0.5 μm.

The Rth (550) of the obtained positive C-plate was −60 nm.

(Coating Solution C1 for Forming Positive C-Plate)

---
Liquid crystal compound L-11 shown below: 80 parts by mass
Liquid crystal compound L-12 shown below: 20 parts by mass
Liquid crystal compound vertical alignment agent (S01): 1 part by mass
Ethylene oxide-modified trimethylolpropane triacrylate
(V #360, manufactured by Osaka Organic Chemical Industry Ltd.): 8 parts by mass
IRGACURE 907 (manufactured by BASF SE): 3 parts by mass
KAYACURE DETX (manufactured by Nippon Kayaku Co., Ltd.): 1 part by mass
Compound B03 shown below: 0.4 parts by mass
Methyl ethyl ketone: 170 parts by mass
Cyclohexanone: 30 parts by mass

---

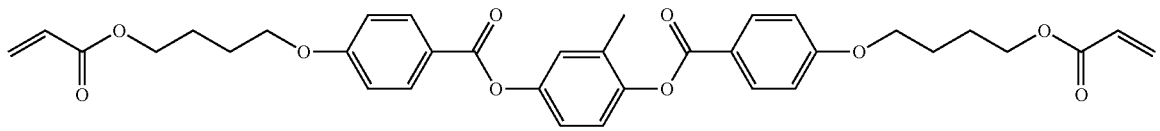

L-11

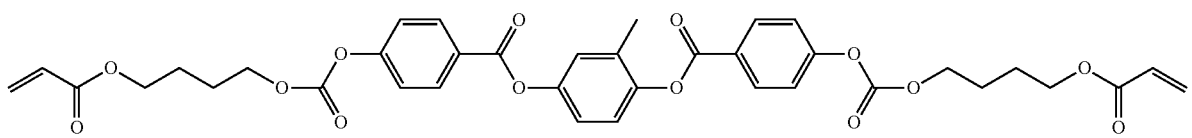

L-12

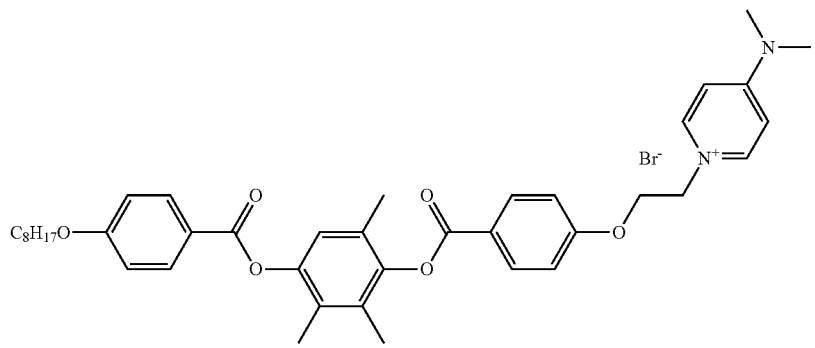

S01

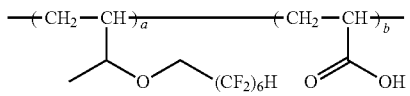

The a and b denote the content (% by mass) of each repeating unit with respect to all repeating units, a denotes 90% by mass, and b denotes 10% by mass.

<Preparation of Laminate of Preparation Example 13>

The second pressure sensitive adhesive layer and the positive A-plate A1 on the phase difference side were bonded to the laminate of Preparation Example 2.

Here, the bonding was made such that the angle between the absorption axis of the light absorption anisotropic layer and the slow axis of the positive A-plate A1 reached 45°.

Next, the alignment layer on the positive A-Plate side and the cellulose acylate film 1 were removed, and the surface from which the alignment layer and the cellulose acylate film 1 had been removed and the positive C-plate C1 on the phase difference side were subjected to a corona treatment and bonded to each other using the UV adhesive S2. The thickness of the UV adhesive layer was 1 μm.

Further, the alignment layer on the positive C-plate side and the cellulose acylate film 1 were removed, and the pressure sensitive adhesive sheet N3 was bonded to the surface from which the alignment layer and the cellulose acylate film 1 had been removed, thereby obtaining a laminate of Preparation Example 13.

<Preparation of Laminate of Preparation Examples 14 to 22>

Laminates of Preparation Examples 14 to 22 were prepared with respect to the laminated bodies of Production Examples 4 to 12 in the same manner as in Preparation Example 13.

<Preparation of Organic EL Display Device>

GALAXY S4 (manufactured by Samsung Electronics Co., Ltd.) equipped with an organic EL panel (organic EL display element) was disassembled, the touch panel provided with a circularly polarizing plate was peeled off from the organic EL display device, and the circularly polarizing plate was further peeled off from the touch panel so that the organic EL display element, the touch panel, and the circularly polarizing plate were isolated from each other. Next, the isolated touch panel was reattached to the organic EL display element, each of the above-described laminates of Preparation Examples 13 to 22 was further attached to the touch panel such that the pressure sensitive adhesive layer was on the panel side to prepare an organic EL display device, and the effects of the antireflection were confirmed to be seen.

EXPLANATION OF REFERENCES

10: surface protective layer
20: first pressure sensitive adhesive layer
30: light absorption anisotropic layer
40: second pressure sensitive adhesive layer
100: laminate

What is claimed is:

1. An optical laminate comprising in order:
a surface protective layer; a first pressure sensitive adhesive layer; a light absorption anisotropic layer; and a second pressure sensitive adhesive layer,
wherein an indentation elastic modulus of the first pressure sensitive adhesive layer is greater than an indentation elastic modulus of the light absorption anisotropic layer,
the light absorption anisotropic layer is a layer formed of a composition for forming a light absorption anisotropic layer containing a liquid crystal compound and a dichroic substance, and
a thickness of the light absorption anisotropic layer is less than 5 μm.

2. The optical laminate according to claim 1, wherein the thickness of the light absorption anisotropic layer is less than 3 μm.

3. The optical laminate according to claim 2, wherein the first pressure sensitive adhesive layer contains a polyvinyl alcohol-based adhesive.

4. The optical laminate according to claim 2, wherein the first pressure sensitive adhesive layer contains an ultraviolet curable adhesive.

5. The optical laminate according to claim 2, wherein a thickness of a layer disposed between the first pressure sensitive adhesive layer and the second pressure sensitive adhesive layer is 10 μm or less.

6. The optical laminate according to claim 2, wherein a storage elastic modulus of the second pressure sensitive adhesive layer is 0.5 MPa or greater.

7. The optical laminate according to claim 2, wherein a molar content of a radically polymerizable group in the composition for forming a light absorption anisotropic layer is 1.0 mmol/g or greater with respect to a total solid content of the composition for forming a light absorption anisotropic layer.

8. The optical laminate according to claim 2, further comprising:
a photoalignment layer which contains a polymer having a repeating unit containing a radically polymerizable group,
wherein the photoalignment layer is disposed to be in contact with a surface of the light absorption anisotropic layer.

9. The optical laminate according to claim 2, wherein an average visible light transmittance of the light absorption anisotropic layer is 45% or greater.

10. A display device comprising:
the optical laminate according to claim 2.

11. The optical laminate according to claim 1, wherein the first pressure sensitive adhesive layer contains a polyvinyl alcohol-based adhesive.

12. The optical laminate according to claim 11, wherein a thickness of a layer disposed between the first pressure sensitive adhesive layer and the second pressure sensitive adhesive layer is 10 μm or less.

13. The optical laminate according to claim 11, wherein a storage elastic modulus of the second pressure sensitive adhesive layer is 0.5 MPa or greater.

14. The optical laminate according to claim 1, wherein the first pressure sensitive adhesive layer contains an ultraviolet curable adhesive.

15. The optical laminate according to claim 1,
wherein a thickness of a layer disposed between the first pressure sensitive adhesive layer and the second pressure sensitive adhesive layer is 10 μm or less.

16. The optical laminate according to claim 1,
wherein a storage elastic modulus of the second pressure sensitive adhesive layer is 0.5 MPa or greater.

17. The optical laminate according to claim 1,
wherein a molar content of a radically polymerizable group in the composition for forming a light absorption anisotropic layer is 1.0 mmol/g or greater with respect to a total solid content of the composition for forming a light absorption anisotropic layer.

18. The optical laminate according to claim 1, further comprising:
a photoalignment layer which contains a polymer having a repeating unit containing a radically polymerizable group,
wherein the photoalignment layer is disposed to be in contact with a surface of the light absorption anisotropic layer.

19. The optical laminate according to claim 1,
wherein an average visible light transmittance of the light absorption anisotropic layer is 45% or greater.

20. A display device comprising:
the optical laminate according to claim 1.

\* \* \* \* \*